US00RE50544E

(19) United States
(12) Reissued Patent
Noh et al.

(10) Patent Number: US RE50,544 E
(45) Date of Reissued Patent: Aug. 19, 2025

(54) ADAPTIVE RETRANSMISSION METHOD AND DEVICE FOR DELAY REDUCTION IN WIRELESS CELLULAR COMMUNICATION SYSTEM

(71) Applicant: Samsung Electronics Co., Ltd., Gyeonggi-do (KR)

(72) Inventors: Hoondong Noh, Gyeonggi-do (KR); Jinyoung Oh, Seoul (KR); Sungjin Park, Incheon (KR); Cheolkyu Shin, Gyeonggi-do (KR); Jeongho Yeo, Gyeonggi-do (KR); Seunghoon Choi, Gyeonggi-do (KR); Youngwoo Kwak, Gyeonggi-do (KR); Younsun Kim, Gyeonggi-do (KR); Taehyoung Kim, Gyeonggi-do (KR); Heedon Gha, Gyeonggi-do (KR)

(73) Assignee: Samsung Electronics Co., Ltd (KR)

(21) Appl. No.: 17/988,400

(22) Filed: Nov. 16, 2022

Related U.S. Patent Documents

Reissue of:
(64) Patent No.: 10,841,944
Issued: Nov. 17, 2020
Appl. No.: 16/347,710
PCT Filed: Nov. 2, 2017
PCT No.: PCT/KR2017/012325
§ 371 (c)(1),
(2) Date: May 6, 2019
PCT Pub. No.: WO2018/084595
PCT Pub. Date: May 11, 2018

(30) Foreign Application Priority Data

Nov. 4, 2016 (KR) ..... 10-2016-0147015
Dec. 6, 2016 (KR) ..... 10-2016-0164819

(51) Int. Cl.
*H04L 5/00* (2006.01)
*H04B 17/318* (2015.01)
(Continued)

(52) U.S. Cl.
CPC ..... *H04W 72/0446* (2013.01); *H04B 17/318* (2015.01); *H04L 1/08* (2013.01);
(Continued)

(58) Field of Classification Search
CPC .... H04B 17/318; H04W 76/27; H04L 1/1822; H04L 1/1819; H04L 1/1864;
(Continued)

(56) References Cited

U.S. PATENT DOCUMENTS 9,287,942 B2 3/2016 Kang et al.
2010/0020771 A1* 1/2010 Ji ..... H04L 1/001 370/336
(Continued)

FOREIGN PATENT DOCUMENTS

CN 104205669 12/2014
CN 104365045 2/2015
(Continued)

OTHER PUBLICATIONS

LG Electronics, "Handling URLLC in new Rat", R1-166886, 3GPP TSG RAN WG1 Meeting #86, Aug. 22-26, 2016, 5 pages.
(Continued)

*Primary Examiner* — Matthew E Heneghan
(74) *Attorney, Agent, or Firm* — The Farrell Law Firm, P.C.

(57) ABSTRACT

Disclosed are a communication method for merging, with IoT technology, a 5G communication system for supporting a data transmission rate higher than that of a 4G system, and a system therefor. The disclosure can be applied to intelligent services (for example, smart home, smart building, smart city, smart car or connected car, healthcare, digital education, retail, security and safety-related services, and the like) on the basis of a 5G communication technology and IoT-related technology. In addition, disclosed in the speci-
(Continued)

fication are: an adaptive retransmission method and device for delay reduction; a method and a device for selecting radio resource allocation and data size; and a method and a device for performing setting so as to enable different channels to share DMRS with each other.

16 Claims, 48 Drawing Sheets

(51) Int. Cl.

| | |
|---|---|
| ***H04L 1/08*** | (2006.01) |
| ***H04L 1/18*** | (2023.01) |
| ***H04L 1/1812*** | (2023.01) |
| ***H04L 1/1822*** | (2023.01) |
| ***H04L 1/1829*** | (2023.01) |
| ***H04L 1/1867*** | (2023.01) |
| ***H04W 72/04*** | (2023.01) |
| ***H04W 72/044*** | (2023.01) |
| ***H04W 72/0446*** | (2023.01) |
| ***H04W 72/12*** | (2023.01) |
| ***H04W 72/23*** | (2023.01) |
| ***H04W 76/27*** | (2018.01) |
| *H04W 88/02* | (2009.01) |
| *H04W 88/08* | (2009.01) |

(52) U.S. Cl.
CPC ..... *H04L 1/18* (2013.01); *H04L 1/1819* (2013.01); *H04L 1/1822* (2013.01); *H04L 1/1864* (2013.01); *H04L 1/1896* (2013.01); *H04L 5/00* (2013.01); *H04L 5/0048* (2013.01); *H04L 5/0051* (2013.01); *H04L 5/0094* (2013.01); *H04W 72/044* (2013.01); *H04W 72/23* (2023.01); *H04W 76/27* (2018.02); *H04W 88/02* (2013.01); *H04W 88/08* (2013.01)

(58) Field of Classification Search
CPC . H04L 1/1896; H04L 1/08; H04L 1/18; H04L 5/0048; H04L 5/0051; H04L 5/00; H04L 5/0094
See application file for complete search history.

(56) References Cited

U.S. PATENT DOCUMENTS

| | | | | |
|---|---|---|---|---|
| 2010/0322100 | A1* | 12/2010 | Wan | H04B 7/0413 370/252 |
| 2012/0057566 | A1* | 3/2012 | Ahmadi | H04L 12/5692 370/331 |
| 2013/0188558 | A1 | 7/2013 | Nam et al. | |
| 2013/0343299 | A1 | 12/2013 | Sayana et al. | |
| 2014/0293957 | A1 | 10/2014 | Chun et al. | |
| 2014/0301238 | A1 | 10/2014 | Chun et al. | |
| 2014/0362793 | A1 | 12/2014 | Chai et al. | |
| 2015/0078285 | A1 | 3/2015 | Kim et al. | |
| 2015/0181573 | A1 | 6/2015 | Takeda et al. | |
| 2015/0270939 | A1 | 9/2015 | Ro et al. | |
| 2017/0188391 | A1 | 6/2017 | Rajagopal et al. | |
| 2018/0014283 | A1 | 1/2018 | You et al. | |
| 2018/0102822 | A1 | 4/2018 | Noh et al. | |
| 2018/0255550 | A1 | 9/2018 | Takeda et al. | |
| 2019/0261383 | A1 | 8/2019 | Kwak et al. | |
| 2020/0022115 | A1 | 1/2020 | Park et al. | |
| 2020/0029312 | A1 | 1/2020 | Falahati et al. | |
| 2020/0037350 | A1 | 1/2020 | Park et al. | |

FOREIGN PATENT DOCUMENTS

| | | |
|---|---|---|
| CN | 105306134 | 2/2016 |
| CN | 105656607 | 6/2016 |
| WO | WO 2013077661 | 5/2013 |
| WO | WO 2017038895 | 3/2017 |

OTHER PUBLICATIONS

NTT DOCOMO, "Multiplexing Mechanism for eMBB and URLLC", R1-1610082, 3GPP TSG RAN WG1 Meeting #86bis, Oct. 10-14, 2016, 6 pages.
Chinese Office Action dated Jun. 28, 2021 issued in counterpart application No. 201780068163.5, 15 pages.
Indian Examination Report dated Dec. 8, 2021 issued in counterpart application No. 201937017148, 5 pages.
Korean Office Action dated Apr. 4, 2022 issued in counterpart application No. 10-2017-0114149, 12 pages.
U.S. Office Action dated Sep. 24, 2024 issued in counterpart U.S. Appl. No. 17/989,267, 19 pages.
PCT/ISA/210 Search Report issued on PCT/KR2017/012325, pp. 5.
PCT/ISA/237 Written Opinion issued on PCT/KR2017/012325, pp. 6.
International Search Report issued in application No. PCT/KR2018/010419, p. 5.
LG Electronics, 3GPP TSG RAN WG1 Meeting #86bis, R1-1609259, Lisbon, Portugal, Oct. 1, 2016, DMRS Design Issues in NR, pp. 10.
CATT, 3GPP TSG RAN WG1 Meeting #86bis, R1-1608746, Lisbon, Portugal, Oct. 1, 2016, DMRS design for sPUSCH, pp. 11.
Huawei, HiSilicon, 3GPP TSG RAN WG1 Meeting #86b, R1-1608816, Lisbon, Portugal, Oct. 1, 2016, Principles for DL Reference Signal Design and QCL Assumptions, pp. 8.
Qualcomm Incorporated, 3GPP TSG RAN WG1 #90, R1-1713442, Prague, Czech Republic, Aug. 12, 2017, Discussion on TB size determination, pp. 5.
Intel Corporation, 3GPP TSG RAN WG1 Meeting #90, R1-1714087, Prague, P.R. Czechia, Aug. 12, 2017, TBS determination, pp. 5.
Ericsson, 3GPP TSG RAN WG1 #90, R1-1714433, Prague, Czech Republic, Aug. 12, 2017, On Transport Block Size Determination, pp. 16.
U.S. Notice of Allowance dated Jun. 22, 2020 issued in counterpart U.S. Appl. No. 16/347,474, 13 pages.

* cited by examiner

FIG. 2C
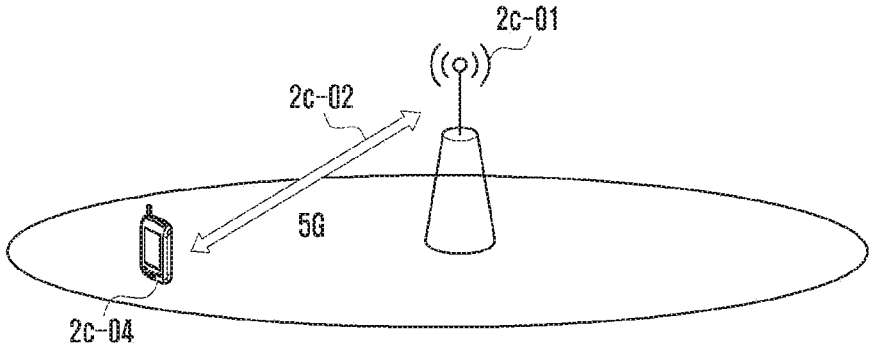
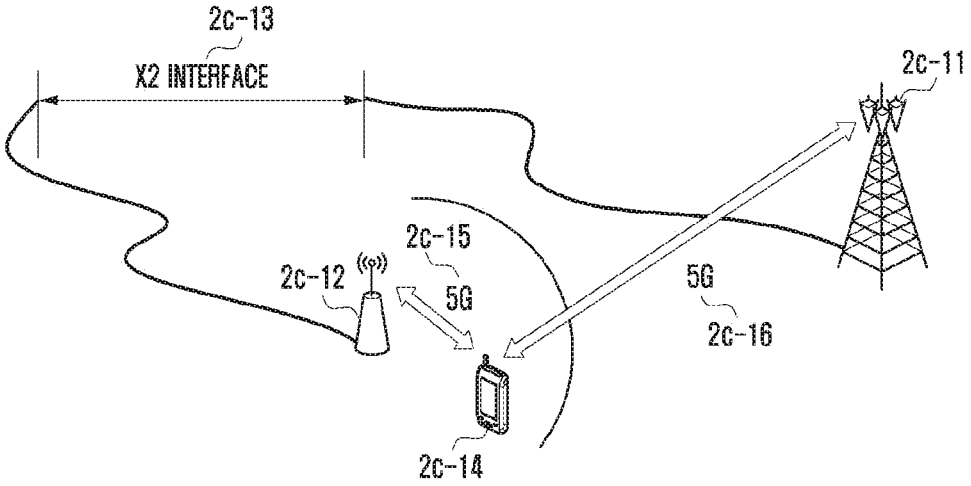

FIG. 2D
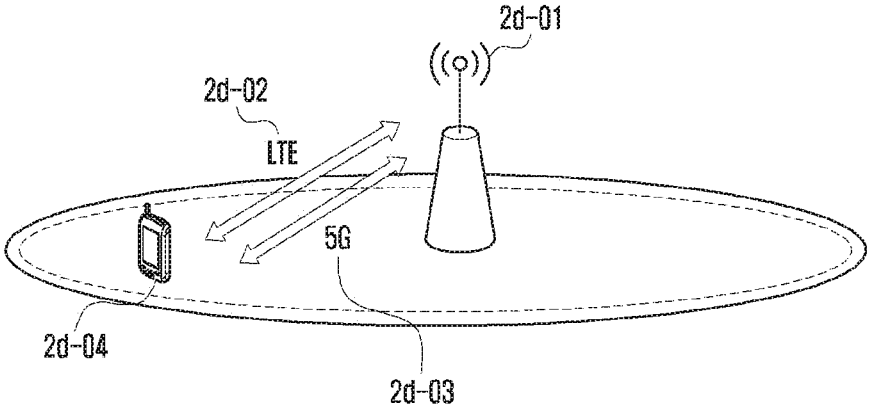
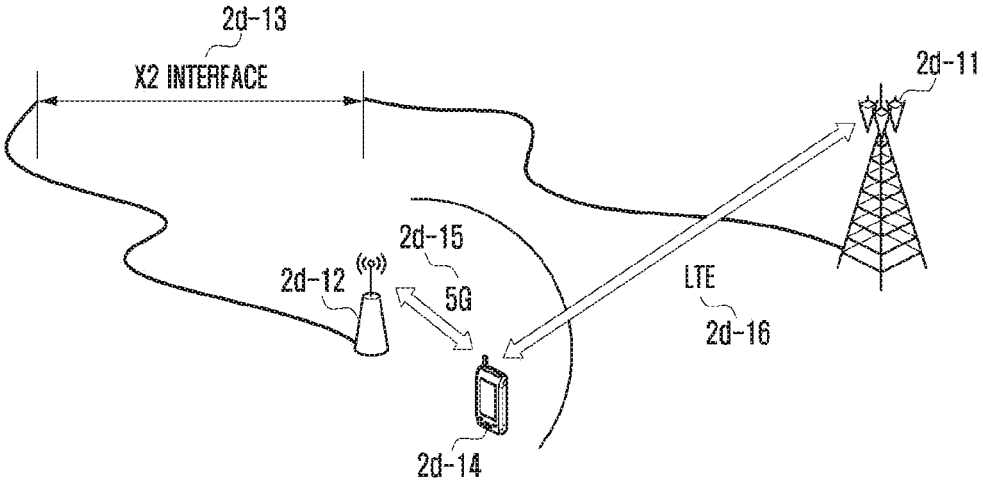

ADAPTIVE RETRANSMISSION METHOD AND DEVICE FOR DELAY REDUCTION IN WIRELESS CELLULAR COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

This application is a National Phase Entry of PCT International Application No. PCT/KR2017/012325 which was filed on Nov. 2, 2017, and claims priority to Korean Patent Application Nos. 10-2016-0147015 and 10-2016-0164819, which were filed on Nov. 4, 2016 and Dec. 6, 2016, respectively, the content of each of which is incorporated herein by reference.

TECHNICAL FIELD

The disclosure relates to a wireless communication system, and relates to a method and a device for smoothly providing a service in a communication system. More particularly, the disclosure relates to an adaptive retransmission method and device for delay reduction, a method and a device for selecting radio resource allocation and data sizes, and a method and a device for configuration to use a demodulation reference signal (DMRS) on different channels.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'beyond 4G Network' or a 'post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine Type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

In the communication system, there is a need for a method and a device for smoother signal transmission and reception.

DISCLOSURE OF INVENTION

Technical Problem

The disclosure has been made in order to solve the above-described problems, and an aspect of the disclosure provides an adaptive retransmission method to satisfy an adaptive transmission time requirement. An aspect of the disclosure provides a method and a device for determining whether to support retransmission and supporting the retransmission through a search for a retransmission type indicator or an implicit retransmission type of a reception end.

Further, the disclosure has been made in order to solve the above-described problems, and another aspect of the disclosure provides a method and a device for efficiently providing communication between a base station and a terminal or between terminals by providing a method by terminals for determining one or more time-frequency radio resource regions and a method for determining a size of data transmitted or received in the determined radio resource regions when the base station or a network intends to use the radio resource regions in order to support different systems, services, or terminals.

Further, an aspect of the disclosure provides a method and a device for configuration to enable a terminal to use a reference signal on different channels in a wireless communication system.

Solution to Problem

In accordance with an aspect of the disclosure to solve the above-described problems, a method by a terminal includes receiving, from a base station, information indicating that a plurality of channels share a reference signal; receiving the reference signal on a first channel; and performing channel measurement of a second channel different from the first channel using the reference signal received on the first channel.

In accordance with another aspect of the disclosure to solve the above-described problems, a terminal includes a transceiver configured to transmit and receive signals; and a controller configured to receive, from a base station, information indicating that a plurality of channels share a reference signal, receive the reference signal on a first channel, and perform channel measurement of a second channel different from the first channel using the reference signal received on the first channel.

In accordance with still another aspect of the disclosure to solve the above-described problems, a method by a base station includes transmitting, to a terminal, information indicating that a plurality of channels share a reference signal; and transmitting the reference signal to the terminal on a first channel, wherein the reference signal transmitted on the first channel is used for channel measurement of a second channel different from the first channel.

In accordance with yet still another aspect of the disclosure to solve the above-described problems, a base station includes a transceiver configured to transmit and receive signals; and a controller configured to transmit, to a terminal, information indicating that a plurality of channels share a reference signal, and transmit the reference signal to the terminal on a first channel, wherein the reference signal transmitted on the first channel is used for channel measurement of a second channel different from the first channel.

Advantageous Effects of Invention

According to the aspect of the disclosure, data can be effectively transmitted using different types of service in the communication system. Further, according to the aspect of the disclosure, data transmission delay time can be reduced through the adaptive retransmission support method.

Further, according to the aspect of the disclosure, it is possible to efficiently use at least one of frequency-time and space resources and transmission power by providing the method for radio resource region allocation and data size selection when it is intended to use one or more frequency-time radio resource regions in order to support different systems, services, or terminals in the communication system.

Further, as described above, the disclosure provides the method by a terminal for performing channel estimation using sharing of a demodulation reference signal (DMRS) on different channels. This can improve the performance of the 5G wireless communication system through improvement of the channel estimation performance. Further, through the DMRS transmission configuration, it is possible to minimize an overhead of the reference signal and to efficiently transmit the radio resources.

BRIEF DESCRIPTION OF DRAWINGS

FIG. 1I is a diagram illustrating a base station operation according to a (1-1)-th embodiment;

FIG. 1O is a diagram illustrating a terminal operation according to a (1-3)-th embodiment;

FIGS. 2C and 2D are diagrams illustrating a communication system to which an embodiment of the disclosure is applied;

FIG. 3O is a block diagram illustrating the structure of a base station according to (3-1)-th to (3-3)-th embodiments of the disclosure.

MODE FOR THE INVENTION

Figure 1A:
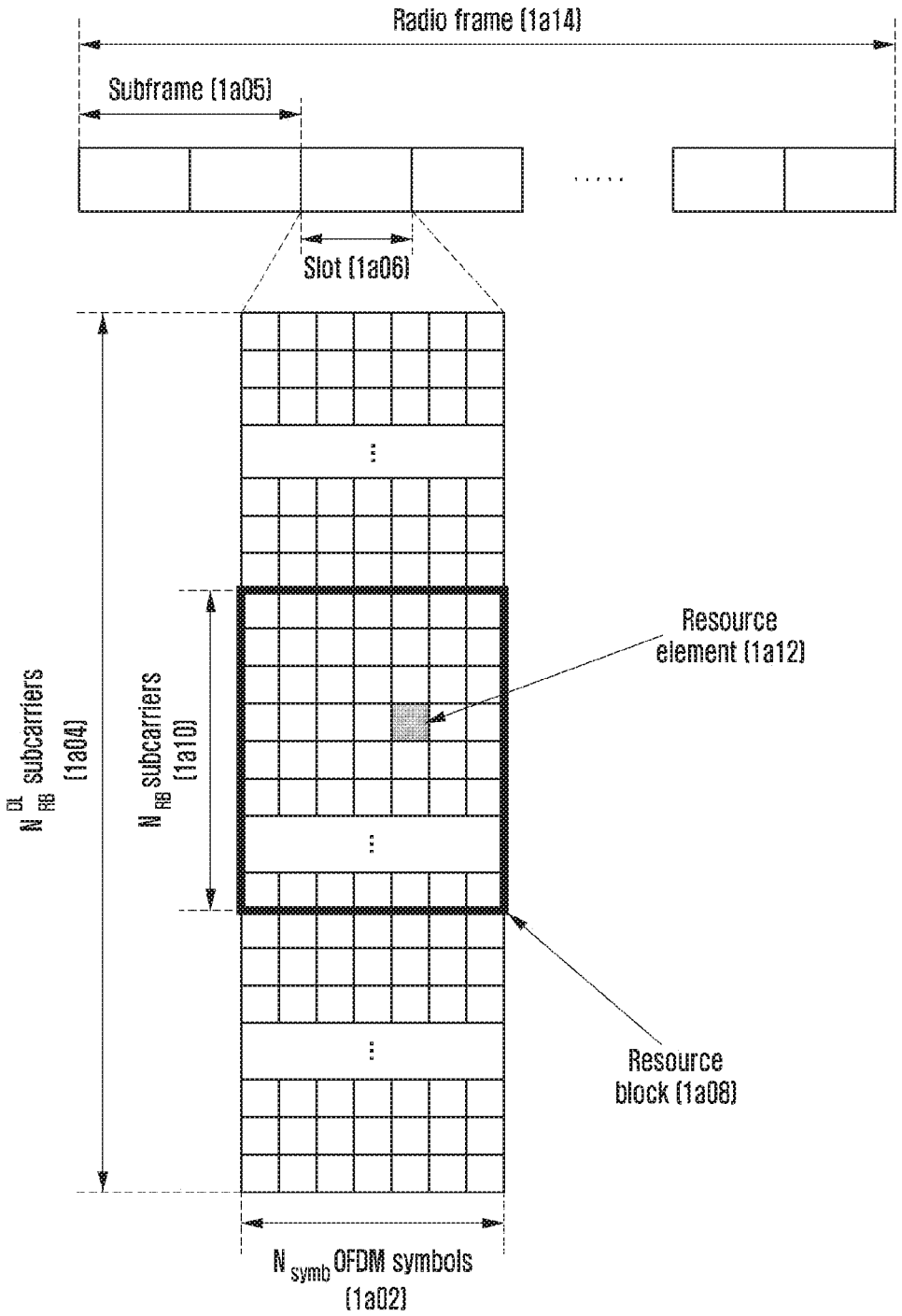
FIG. 1A is a diagram illustrating a downlink time-frequency domain transmission structure of an LTE or LTE-A system.

Hereinafter, embodiments of the disclosure will be described in detail with reference to the accompanying drawings.

In explaining the embodiments, explanation of technical contents which are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e. Further, as the 5th generation wireless communication system, 5G or new radio (NR) communication standards have been made.

In the wireless communication system including the 5th generation as described above, at least one service of enhanced mobile broadband (eMBB), massive machine type communications (mMTC), and ultra-reliable and low-latency communications (URLLC) may be provided to a terminal. The above-described services may be provided to the same terminal during the same time period. In an embodiment, among the above-described services, eMBB may take aim at high-speed transmission of high-capacity data, mMTC may take aim at minimization of a terminal power and connection among plural terminals, and URLLC may take aim at high reliability and low delay, but are not limited thereto. The three kinds of services as described above may be primary scenarios in an LTE system or post-LTE 5G/new radio or next radio (NR) systems. In an embodiment, a coexistence method between eMBB and URLLC or between mMTC and URLLC, and an apparatus using the method will be described.

If a situation in which a base station should transmit URLLC data in a specific transmission time interval (TTI) occurs in a state where the base station is scheduled to transmit data that corresponds to an eMBB service to a certain terminal in the TTI, the base station may not transmit a part of the eMBB data in a frequency band in which the eMBB data has already been scheduled and transmitted, but may transmit the generated URLLC data in the frequency band. The eMBB-scheduled terminal and the URLLC-scheduled terminal may be the same terminals or different terminals. In this case, since a part of the eMBB data that has already been scheduled and transmitted may not be transmitted, a possibility that the eMBB data is damaged is increased. Accordingly, it is necessary to determine a method for processing a signal that is received from the eMBB-scheduled terminal or the URLLC-scheduled terminal and a method for receiving the signal. In an embodiment, a coexistence method between different services will be described, which can transmit information according to the respective services if information according to the eMBB and the URLLC is scheduled through sharing of a part or the whole of the frequency band, if information according to the mMTC and the URLLC is simultaneously scheduled, if information according to the mMTC and the eMBB is simultaneously scheduled, or if information according to the eMBB, the URLLC, and the mMTC is simultaneously scheduled.

Hereinafter, exemplary embodiments of the disclosure will be described in detail with reference to the accompanying drawings. In describing the disclosure, a detailed description of related functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined on the basis of the contents of the whole description of the disclosure. Hereinafter, the base station is the subject that performs resource allocation to the terminal, and may be at least one of an eNode B, Node B, base station (BS), radio connection unit, base station controller, and node on a network. The terminal may include user equipment (UE), mobile station (MS), cellular phone, smart phone, computer, or a multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station. Hereinafter, although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technology (5G, new radio, or NR) that is developed after LTE-A may be included therein. Further, the embodiment of the disclosure may also be applied to other communication systems through partial modifications thereof in a range that does not greatly deviate from the scope of the disclosure by the judgment of those skilled in the art.

In the LTE system that is a representative example of the broadband wireless communication systems, the downlink (DL) adopts an orthogonal frequency division multiplexing (OFDM) scheme, and the uplink (UL) adopts a single carrier frequency division multiple access (SC-FDMA) scheme. The uplink means a radio link in which a terminal (or user equipment (UE)) or a mobile station (MS) transmits data or a control signal to a base station (BS) (or eNode B), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARQ) scheme in which a physical layer retransmits the corresponding data if decoding failure occurs during initial data transmission. According to the HARQ scheme, a receiver may transmit information (negative acknowledgement (NACK)) for notifying a transmitter of the decoding failure if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

Embodiment 1

FIG. 1A is a diagram illustrating the basic structure of a time-frequency domain that is a radio resource region in which data or a control channel is transmitted on a downlink in an LTE system or a system that is similar to the LTE system.

Referring to FIG. 1A, a horizontal axis represents a time domain, and a vertical axis represents a frequency domain.

In the time domain, the minimum transmission unit is an OFDM symbol, and $N_{symb}$ OFDM symbols 1a02 constitute one slot 1a06, and two slots constitute one subframe 1a05. The length of the slot is 0.5 ms, and the length of the subframe is 1.0 ms. Further, a radio frame 1a14 is a time domain region that is composed of 10 subframes. In the frequency domain, the minimum transmission unit is a subcarrier, and the transmission bandwidth of the whole system is composed of $N_{BW}$ subcarriers 1a04 in total. However, such numerical values may be variably applied.

In the time-frequency domain, the basic unit of resources is a resource element (RE) 1a12 that may be expressed by an OFDM symbol index and a subcarrier index. A resource block (RB) (or physical resource block (PRB)) 1a08 may be defined by $N_y$, successive OFDM symbols 1a02 in the time domain and $N_{RB}$ successive subcarriers 1a10 in the frequency domain. Accordingly, in one slot, one RB 1a08 may include $N_{symb} \times N_{RB}$ REs 1a12. In general, the minimum allocation unit of the frequency domain of data is the RB, and in the LTE system, $N_{symb}=7$, $N_{RB}=12$, and $N_{BW}$ and $N_{RB}$ may be in proportion to the bandwidth of the system transmission band. The data rate is increased in proportion to the number of RBs that are scheduled to the terminal. The LTE system may define and operate 6 transmission bandwidths. In case of an FDD system that operates to discriminate a downlink and an uplink from each other by means of frequency, the downlink transmission bandwidth and the uplink transmission bandwidth may differ from each other. A channel bandwidth represents an RF bandwidth corresponding to the system transmission bandwidth. Table 1 below presents the corresponding relationship between the system transmission bandwidth defined by the LTE system and the channel bandwidth. For example, the LTE system having 10 MHz channel bandwidth may have the transmission bandwidth that is composed of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of the control information to be transmitted to the current subframe, the N value may be variably applied to each subframe. The control information being transmitted may include a control channel transmission period indicator indicating how many OFDM symbols the control information is transmitted through, scheduling information on downlink data or uplink data, and information on HARQ ACK/NACK.

In the LTE system, the scheduling information on the downlink data or the uplink data is transferred from the base station to the terminal through downlink control information (DCI). The DCI may be defined in accordance with various formats, and may indicate whether the DCI is scheduling information on the uplink data (UL grant) or scheduling information on the downlink data (DL grant) according to the respective formats, whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) may include at least one of the following control information.

- Resource allocation type 0/1 flag: This indicates whether a resource allocation scheme is of type 0 or type 1. The type 0 allocates resources in the unit of resource block group (RBG) through application of a bitmap scheme. In the LTE system, the basic unit of scheduling is an RB that is expressed as a time and frequency domain resource, and the RBG is composed of a plurality of RBs, and becomes the basic unit of scheduling in the type 0 scheme. The type 1 allocates a specific RB in the RBG.
- Resource block assignment: This indicates an RB allocated for data transmission. An expressed resource is determined in accordance with the system bandwidth and the resource allocation scheme.
- Modulation and coding scheme (MCS): This indicates a modulation scheme used for data transmission and the size of a transport block (TB) that is data to be transmitted.
- HARQ process number: This indicates a process number of a HARQ.
- New data indicator: This indicates whether a HARQ is initially transmitted or retransmitted.
- Redundancy version: This indicates a redundancy version of a HARQ.
- Transmission power control (TCP) command for a physical uplink control channel (PUCCH): This indicates a transmission power control command for a PUCCH that is an uplink control channel.

The DCI may pass through a channel coding and modulation process, and may be transmitted on a physical downlink control channel (PUCCH) that is a downlink physical control channel (or control information, hereinafter they are mixedly used) or an enhanced PDCCH (EPDCCH) (or enhanced control information, hereinafter they are mixedly used).

In general, the DCI is scrambled with a specific radio network temporary identifier (RNTI) (or terminal identifier), independently with respect to each terminal, is added with a cyclic redundancy check (CRC), is channel-coded, and then is configured and transmitted on each independent PDCCH. In the time domain, the PDCCH is mapped and transmitted during the control channel transmission period. The frequency domain mapping location of the PDCCH may be determined by an Identifier (ID) of each terminal, and may be spread to the whole system transmission band to be transmitted.

The downlink data may be transmitted on a physical downlink shared channel (PDSCH) that is a physical channel for transmitting the downlink data. The PDSCH may be transmitted after the control channel transmission period, and scheduling information, such as a detailed mapping location in the frequency domain and the modulation scheme, is determined based on the DCI being transmitted through the PDCCH.

Through an MCS in the control information constituting the DCI, the base station notifies the terminal of the modulation scheme that is applied to the PDSCH to be transmitted and the transport block size (TBS) of the data to be transmitted. In an embodiment, the MCS may be composed of 5 bits or more or less. The TBS corresponds to the size before channel coding for error correction is applied to the data transport block (TB) intended to be transmitted by the base station.

The modulation scheme that is supported by the LTE system may be quadrature phase shift keying (QPSK), 16 quadrature amplitude modulation (16QAM), and 64QAM, and respective modulation orders Qm correspond to 2, 4, and 6. That is, in case of QPSK modulation, 2 bits per symbol may be transmitted, and in case of 16QAM, 4 bits per symbol may be transmitted. Further, in case of 64QAM, 6 bits per symbol may be transmitted. Further, in accordance with the system modification, the modulation scheme of 256QAM or more may be used.

Figure 1B:
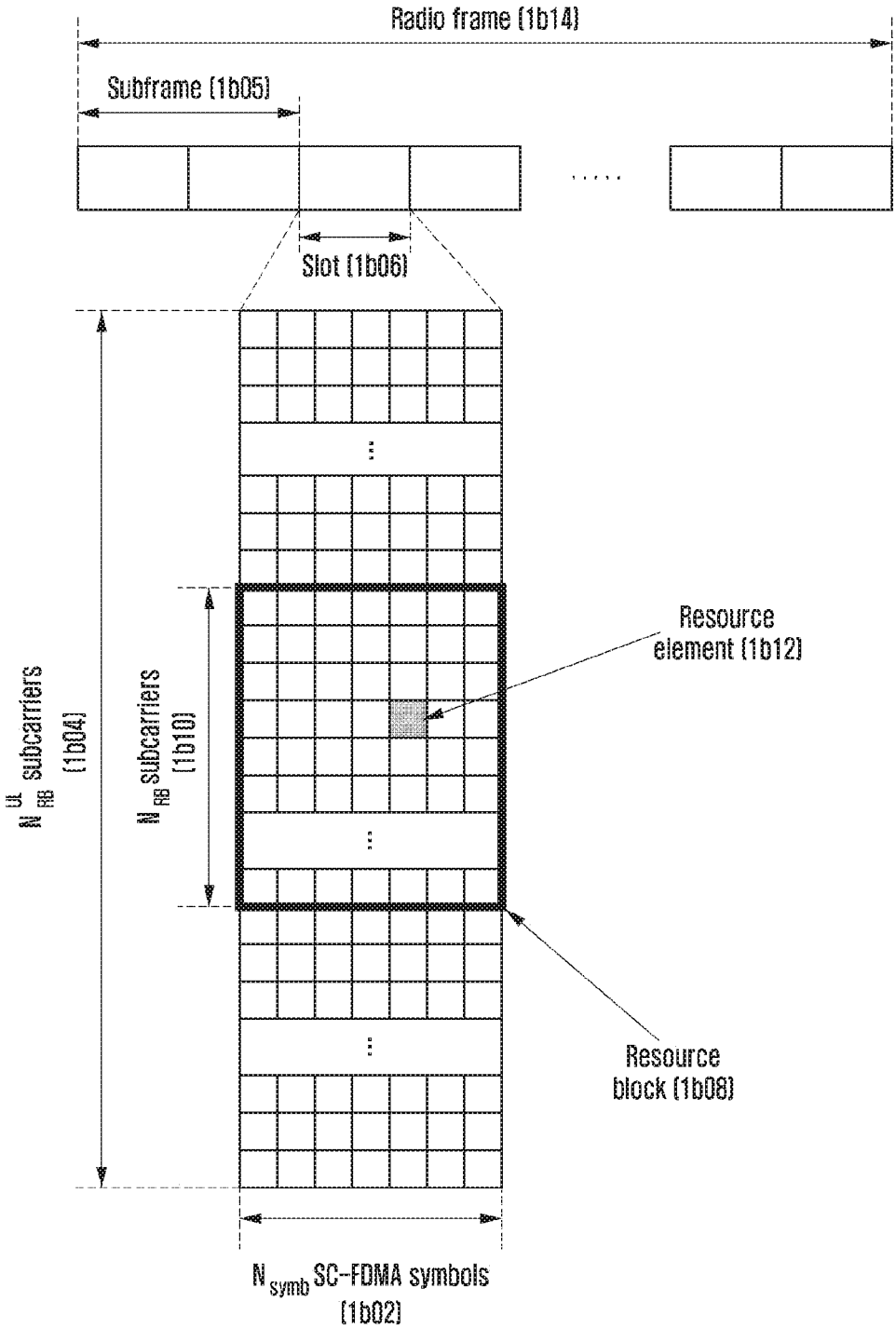
FIG. 1B is a diagram illustrating an uplink time-frequency domain transmission structure of an LTE or LTE-A system.

FIG. 1B is a diagram illustrating the basic structure of a time-frequency domain that is a radio resource region in which data or a control channel is transmitted on an uplink in an LTE-A system.

Referring to FIG. 1B, a horizontal axis represents a time domain, and a vertical axis represents a frequency domain. In the time domain, the minimum transmission unit is an SC-FDMA symbol 1b02, and $N_{symb}^{UL}$ SC-FDMA symbols may constitute one slot 1b06. Further, two slots constitute one subframe 1b05. In the frequency domain, the minimum transmission unit is a subcarrier, and the transmission bandwidth 1b04 of the whole system is composed of $N_{BW}$ subcarriers in total. $N_{BW}$ may have a value that is in proportion to the system transmission bandwidth.

In the time-frequency domain, the basic unit of resources is a resource element (RE) 1b12 that may be defined by an SC-FDMA symbol index and a subcarrier index. A resource block pair (RB pair) 1b08 may be defined by $N_{symb}^{UL}$ successive SC-FDMA symbols in the time domain and $N_{scRB}$ successive subcarriers in the frequency domain. Accordingly, one RB may be composed of $N_{symb}^{UL} \times N_{scRB}$ REs. In general, the minimum transmission unit of data or control information is an RB unit. The PUCCH is mapped to the frequency domain corresponding to 1 RB, and is transmitted for one subframe.

In the LTE system, the timing relationship may be defined between a PDSCH that is a physical channel for transmitting downlink data and a PUCCH or PUSCH that is an uplink physical channel on which HARQ ACK/NACK corresponding to PDCCH/EPDDCH including a semi-persistent scheduling release (SPS release) is transmitted. As an example, In the LTE system that operates as a frequency division duplex (FDD), the PDSCH that is transmitted in the (n−4)-th subframe or the HARQ ACK/NACK corresponding to the PDCCH/EPDCCH including the SPS release may be transmitted to the PUCCH or PUSCH in the n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data transmitted by the base station, the base station freely determines the transmission time of the retransmission data by a scheduling operation. The terminal may perform buffering of data that is determined as an error as the result of decoding the received data for the HARQ operation, and then perform combining of the error data with next retransmission data.

If the PDSCH that includes the downlink data transmitted from the base station in subframe n is received, the terminal transmits the uplink control information including HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in case of an FDD LTE system, "k" is fixed to "4". On the other hand, in case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a physical uplink shared channel (PUSCH) that is a physical channel for transmitting uplink data, a PDCCH that is a preceding downlink control channel, and a physical hybrid indicator channel (PHICH) that is a physical channel on which a downlink HARQ ACK/NACK corresponding to the PUSCH is transmitted may be transmitted or received in accordance with the following rules.

If the terminal receives the PDCCH including uplink scheduling control information that is transmitted from the base station in subframe n or the PHICH on which the downlink HARQ ACK/NACK is transmitted, the terminal transmits uplink data corresponding to the control information on the PUSCH in subframe n+k. In this case, "k" may be differently defined in accordance with the FDD or time division duplex (TDD) of the LTE system and the configuration thereof. As an example, in case of the FDD LTE system, "k" may be fixed to "4". On the other hand, in case of the TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives the PHICH including information related to the downlink HARQ ACK/NACK from the base station in subframe i, the PHICH corresponds to the PUSCH transmitted by the terminal in subframe i-k. In this case, "k" may be differently defined in accordance with the FDD or TDD of the LTE system and the configuration thereof. As an example, in case of the FDD LTE system, "k" is fixed to "4". On the other hand, in case of the TDD LTE system, "k" may be changed in accordance with the subframe configuration and the subframe number. Further, during data transmission through a plurality of carriers, the k value may be differently applied in accordance with the TDD configuration of each carrier.

As described above, the wireless communication system has been described based on the LTE system, and the contents of the disclosure are not limited to the LTE system, but may be applied to various wireless communication systems, such as NR and 5G. Further, in an embodiment, in case of applying the disclosure to a different wireless communication system, the k value may be changed and applied even to a system using a modulation scheme corresponding to the FDD.

Figure 1C:
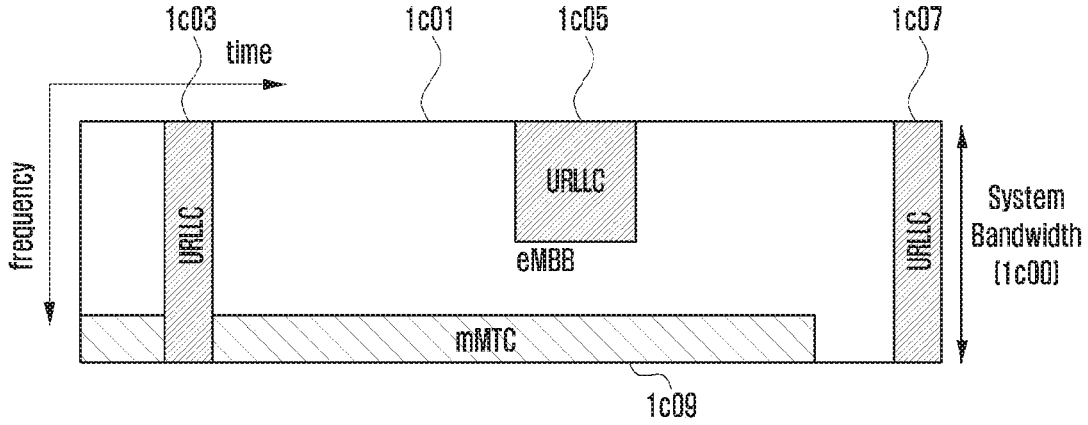
FIG. 1C is a diagram illustrating data for eMBB, URLLC, and mMTC allocated in frequency-time resources in a communication system.
Figure 1D:
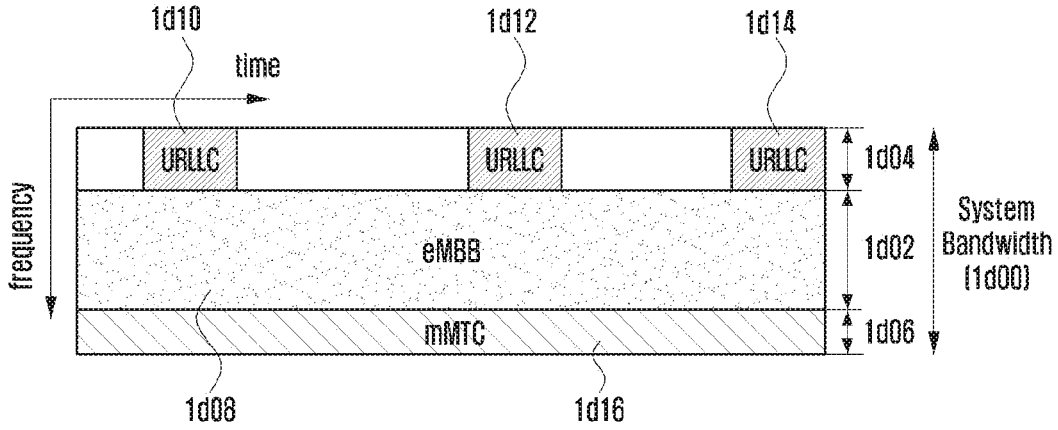
FIG. 1D is a diagram illustrating data for eMBB, URLLC, and mMTC allocated in frequency-time resources in a communication system.

FIGS. 1C and 1D are diagrams illustrating a state where data for eMBB, URLLC, and mMTC, which are services being considered in a 5G or NR system, are allocated in frequency-time resources.

Referring to FIGS. 1C and 1D, it can be seen that frequency and time resources are allocated for information transmission in each system.

First, FIG. 1C illustrates that data for eMBB, URLLC, and mMTC are allocated in the whole system frequency bandwidth 1c00. If URLLC data 1c03, 1c05, and 1c07 are generated and transmission of the generated data is necessary while eMBB 1c01 and mMTC 1c09 are allocated and transmitted in a specific frequency bandwidth, it is possible to transmit the URLLC data 1c03, 1c05, and 1c07 without emptying a portion in which the eMBB 301 and the mMTC 309 have already been allocated or without transmitting the eMBB 1c01 and the mMTC 1c09. Since it is necessary to reduce a delay time of the URLLC during the service, the URLLC data 1c03, 1c05, and 1c07 may be allocated and transmitted to a portion of an eMBB-allocated resource 1c01. Of course, if the URLLC is additionally allocated and transmitted in the eMBB-allocated resource, eMBB data may not be transmitted in the redundant frequency-time resources, and thus transmission performance of the eMBB data may be lowered. That is, in the above-described case, an eMBB data transmission failure due to the URLLC allocation may occur.

In FIG. 1D, respective subbands 1d02, 1d04, and 1d06 obtained through division of the whole system frequency bandwidth 1d00 may be used for the purpose of transmitting services and data. The information related to subband configuration may be predetermined, and this information may be transmitted from the base station to the terminal through higher layer signaling. Further, the information related to the subband may be optionally divided by the base station or a network node, and services may be provided to the terminal without transmission of separate subband configuration information to the terminal. FIG. 1D illustrates a state where subband 1d02 is used to transmit eMBB data, subband 1d04 is used to transmit URLLC data, and subband 1d06 is used to transmit mMTC data.

In the whole embodiment, the length of a transmission time interval (TTI) used for the URLLC transmission may be shorter than the length of the TTI that is used to transmit the eMBB or mMTC. Further, a response to the information related to the URLLC may be transmitted earlier than that of the eMBB or the mMTC, and thus the information can be transmitted and received with a low delay.

Hereinafter, an eMBB service is called a first type service, and eMBB data is called first type data. The first type service or the first type data is not limited to the eMBB, but may correspond to even a case where high-speed data transmission is required or broadband transmission is performed. Further, an URLLC service is called a second type service, and URLLC data is called second type data. The second type service or the second type data is not limited to the URLLC, but may correspond to a case where low latency is required or high-reliable transmission is necessary, or another system that requires both low latency and high reliability. Further, an mMTC service is called a third type service, and mMTC data is called third type data. The third type service or the third type data is not limited to the mMTC, but may correspond to a case where low speed or wide coverage, or low power is required. Further, in explaining an embodiment, it may be understood that the first type service includes or does not include the third type service.

In order to transmit the three kinds of services or data as described above, physical layer channel structures that are used by types may differ from each other. For example, at least one of transmission time interval (TTI) lengths, frequency resource allocation units, control channel structures, and data mapping methods may differ from each other.

Although three kinds of services and three kinds of data have been described, more kinds of services and the corresponding data may exist, and even in this case, the contents of the disclosure can be applied.

The terms "physical channel" and "signal" in the LTE or LTE-A system in the related art may be used to explain a method and a device proposed in an embodiment. However, the contents of the disclosure may be applied to a wireless communication system that is not the LTE or LTE-A system.

As described above, an embodiment proposes a detailed method for defining transmission/reception operations of a terminal and a base station for transmission of first, second, and third type services or data, and operating terminals, in which different types of services or data are scheduled, together in the same system. In the disclosure, first, second, and third type terminals indicate terminals in which first, second, and third type services or data are scheduled. In an embodiment, the first, second, and third type terminals may be the same terminals or different terminals.

Hereinafter, in an embodiment, at least one of an uplink scheduling grant signal and a downlink data signal is called a first signal. Further, in the disclosure, at least one of an uplink data signal for the uplink scheduling grant and an HARQ ACK/NACK for the downlink data signal is called a second signal. In an embodiment, among signals that a base station transmits to a terminal, a signal that expects a response from the terminal may be the first signal, and a response signal of the terminal that corresponds to the first signal may be the second signal. Further, in an embodiment, the service type of the first signal may be at least one of eMBB, URLLC, and mMTC, and the second signal may also correspond to at least one of the above-described services.

Hereinafter, in an embodiment, the TTI length of the first signal is a time value related to transmission of the first signal, and may indicate the length of time in which the first signal is transmitted. Further, in the disclosure, the TTI length of the second signal is a time value related to transmission of the second signal, and may indicate the length of time in which the second signal is transmitted. The TTI length of the third signal is a time value related to transmission of the third signal, and may indicate the length of time in which the third signal is transmitted. Further, in the disclosure, the second signal transmission timing may be information on when the terminal transmits the second signal and when the base station receives the second signal, and may be called the second signal transmission/reception timing.

The contents of the disclosure are applicable to the FDD and TDD systems, and the contents described from the viewpoint of a downlink on which data is transmitted from the base station to the terminal are applicable from the viewpoint of an uplink that the terminal transmits to the base station. Hereinafter, in the disclosure, higher layer signaling may be a signal transfer method in which the base station transfers a signal to the terminal using a downlink data channel of a physical layer, or the terminal transfers a signal to the base station using an uplink data channel of the physical layer, and may be mentioned as RRC signaling, PDCP signaling, or a MAC control element (MAC CE).

In the disclosure, first of all, the URLLC or a service similar to the URLLC is a service requiring high reliability and low latency, and thus there may exist a situation where the transmission result report and retransmission performing are required or are not required. In such a situation, in case of receiving an initial transmission from the base station, the terminal can grasp in advance the corresponding transmission result report and whether retransmission reception is possible. In the disclosure, this is called a retransmission type indicator, which includes four cases in total: a case of supporting (single transmission and) retransmission, a case of non-supporting (single transmission and) retransmission, a case of supporting repeated transmission and retransmission, and a case of non-supporting the repeated transmission and retransmission. The base station may provide the corresponding retransmission type indicator information that is explicit bit information to the terminal through a control region, or may implicitly provide the retransmission type indicator information to the terminal through one of elements constituting downlink control information (DCI) for notifying of a data region of the terminal in the control region, for example, an HARQ process number, a new data indicator (NDI), or redundancy version (RV). For example, a specific number of the HARQ operation number may be used to indicate one of four kinds of operations as described above. Further, a specific number of NDI or RV may also be used as the number indicating one of the four kinds of operations. Further, one of the four kinds of operations as described above can be indicated by a combination of several values constituting the DCI rather than one value. Further, one of the four kinds of operations as described above can be indicated by a specific DCI format itself. Further, as channels for transferring explicit information, a physical channel, a logical channel, and a higher layer, such as RRC, may transfer the corresponding information to the terminal. Further, the corresponding information may be transferred from the base station to the terminal through one or more of several steps, such as RRC, SIB, MAC CE, and PHY. Further, the corresponding information may be transferred to the terminal on at least one channel. The corresponding information can be commonly applied to each terminal, or can be transferred to a partial terminal group or individual terminals. The above-described operation can be applied as a method for supporting downlink feedback reception for uplink transmission of the terminal in addition to a method for supporting uplink feedback transmission for downlink data reception of the terminal. That is, the terminal receives determination on whether to transmit the uplink feedback for the downlink data reception transferred from the base station through the above-described explicit/implicit method. Further, the terminal can receive determination on whether to receive the uplink feedback for the uplink data transmission transferred from the base station through the above-described explicit/implicit method, or can determine the same through a method for requesting the uplink transmission. The terminal can transmit the uplink data through the uplink transmission request or without the uplink transmission request. The uplink data transmission through the uplink transmission request includes uplink data transmission with a transmission grant from the base station and uplink data transmission without the transmission grant. Here, if there is not the transmission grant from the base station, the terminal may perform uplink data transmission in a predetermined transmission format, or there may be a control region for notifying of a separate uplink data transmission format when the terminal transmits the uplink data. Here, whether to support the downlink feedback for the uplink data transmission may be determined through information configuration of the control region. Further, one of the four methods as described above may be applied in the same manner.

Further, in case where the terminal transfers the uplink data transmission scheme to the base station together with a preamble, one of the four kinds of methods as described above may be determined as the corresponding preamble specific format (sequence characteristic and the like). It is also possible to consider a situation where a similar operation is additionally configured in addition to the four methods as described above, or only partial operations of the four kinds of methods are supported. Further, in case where the terminal receives the transmission grant from the base station and transmits the uplink data, it is equal or similar to the method for determining a retransmission type indicator that is performed during the downlink data reception.

Further, it is possible to notify of the retransmission type indicator information through a reference signal (RS) in addition to the above-described notification through the control region. The terminal preferentially performs decoding/demodulation of the reference signal for data decoding/demodulation, and in this case, it is possible to implicitly notify of one or a combination of retransmission type indicator types in accordance with the characteristic of the received value or reception location.

Further, it is possible to implicitly associate and transfer the retransmission type indicator in accordance with the corresponding applied coding/modulation type. For example, if coding/modulation type a is selected, the corresponding transmission can operate as the first retransmission type indicator. Accordingly, the terminal can indirectly receive the retransmission type indicator type transferred from the base station through decoding/demodulation of the corresponding data.

Figure 1E:
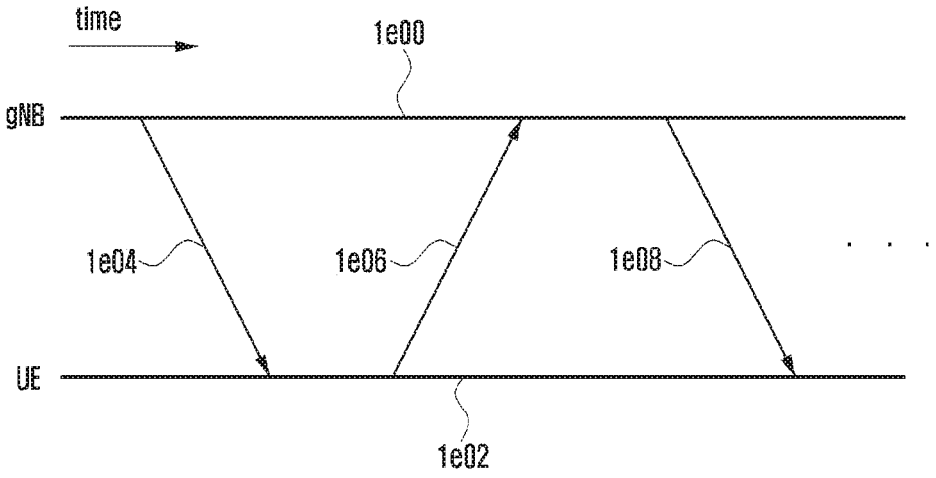
FIG. 1E is a diagram illustrating an initial transmission and retransmission method in accordance with a retransmission request in a communication system.

FIG. 1E is a diagram illustrating an initial transmission and retransmission method in accordance with a retransmission request in a communication system.

FIG. 1E shows a data and feedback exchange process between a base station (gNB) 1e00 and a terminal (UE) 1e02. First, if data to be sent to the terminal exists, the base station notifies the corresponding terminal of a transmission resource and a format through a control region, and performs initial transmission (1e04) of the corresponding data to the terminal through a data region. Simultaneously with reception of the corresponding data, the terminal reports (1e06) to the base station the result of the corresponding initially transmitted data demodulation/decoding success through an uplink resource indicated through the control region. The base station determines whether to retransmit the data through the report result received from the corresponding terminal. If the initial transmission has failed, the base station retransmits (1e08) the data through a newly allocated resource region or a predetermined resource between the terminal and the base station. The terminal reports whether the data demodulation/decoding has succeeded through the corresponding retransmission reception. The corresponding process is repeated in accordance with the total number of possible retransmission supports allocated to the corresponding terminal. As an example, if the number of retransmissions allocated to one terminal is 2, the total number of possible reports whether the data demodulation/decoding has succeeded in the terminal is 2, and the total number of the possible data transmissions including the initial transmission is 3. In the disclosure, the above-described method is considered as a case where the retransmission type indicator supports (single transmission and) retransmission.

Figure 1F:
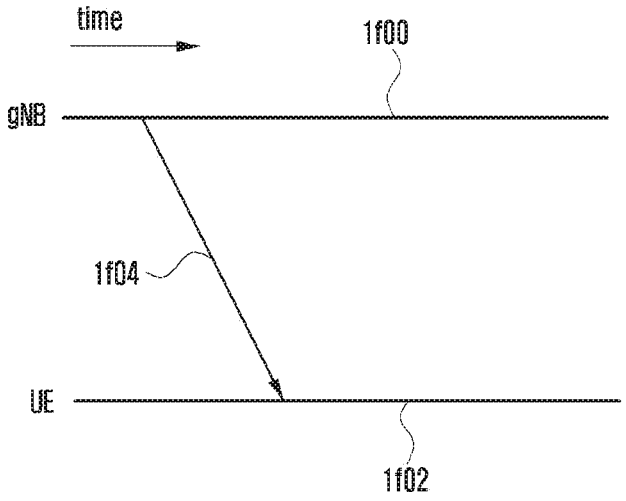
FIG. 1F is a diagram illustrating an initial transmission method in a communication system.

FIG. 1F is a diagram illustrating an initial transmission method in a communication system.

In FIG. 1F, if a delay time requirement for data transmitted to a corresponding terminal 1f02 requires a short time to the extent that it is not possible through the transmission result report and retransmission, a base station 1f00 may perform single transmission to the terminal. In FIG. 1F, the base station notifies the terminal of a resource region and a transmission format to be transmitted to the terminal through a control region and a data region. Further, the base station performs single transmission (1f04) of the data to the terminal through the data region. In the disclosure, the above-described method is considered as a case where the retransmission type indicator does not support (single transmission and) retransmission.

Figure 1G:
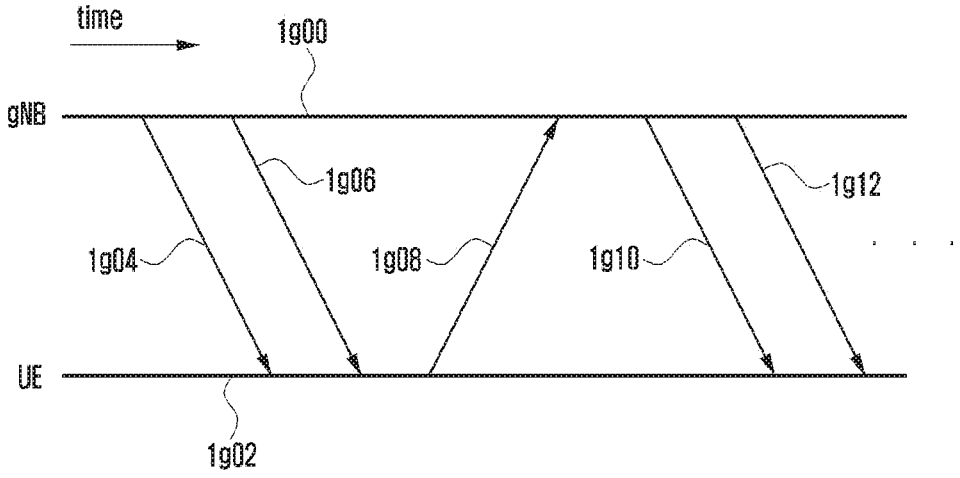
FIG. 1G is a diagram illustrating an initial repeated transmission and repeated retransmission in accordance with a retransmission request in a communication system.

FIG. 1G is a diagram illustrating an initial repeated transmission and repeated retransmission in accordance with a retransmission request in a communication system.

FIG. 1G illustrates that a base station 1g00 transmits (1g04 and 1g06) data to a terminal in a predetermined number of repetitions during an initial transmission. In this case, the repeated data may be the same data or different data. In case of the repeated transmission, the base station transmits data, such as initially transmitted data, to the terminal 1g02 through a predetermined resource region, and the terminal receives the same data through the corresponding resource to heighten the result of decoding/demodulation success. FIG. 1G shows a case where the total number of initial repeated transmissions is 2. The terminal receives the initial repeated transmission in the predetermined number of repetitions, and transmits (1g08) the demodulation/decoding result to the base station. In this case, as the result being transmitted, the terminal transmits, to the base station, the whole result of the repeated initial transmission (reception success or failure) or individual results of the repeated transmission (reception success or failure). If the terminal cannot properly receive the initial repeated transmission after reception (1g08) of the corresponding result report, the base station performs repeated retransmission (1g10 and 1g12). In this case, if the report of the initial transmission result is composed of one bit only, the base station transmits the same data to the terminal by retransmitting the data as many as the number of initial repeated transmissions during the retransmission, whereas if the report is composed of two or more bits, the base station can transmit the corresponding non-received data or a partial data group to the terminal during individual selection and retransmission of the non-received transmission to the terminal. In FIG. 1G, it is assumed that the terminal performs retransmission of the twice initial transmissions. In the disclosure, the above-described method is considered as a case where the retransmission type indicator supports the repeated transmission and retransmission.

Figure 1H:
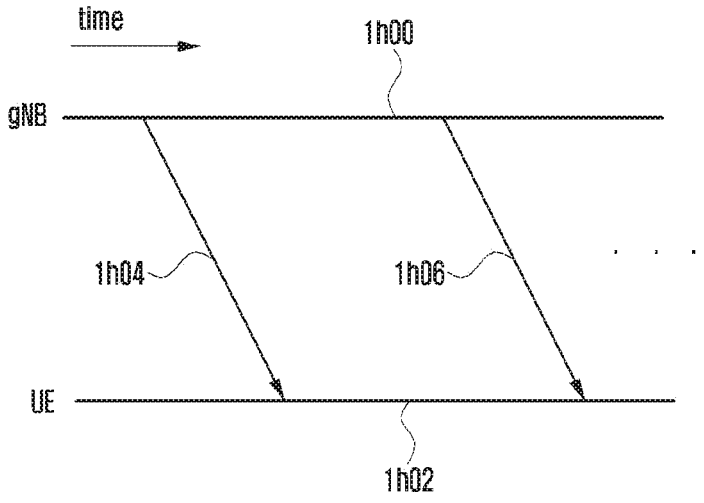
FIG. 1H is a diagram illustrating an initial repeated transmission method in a communication system.
Figure 11:
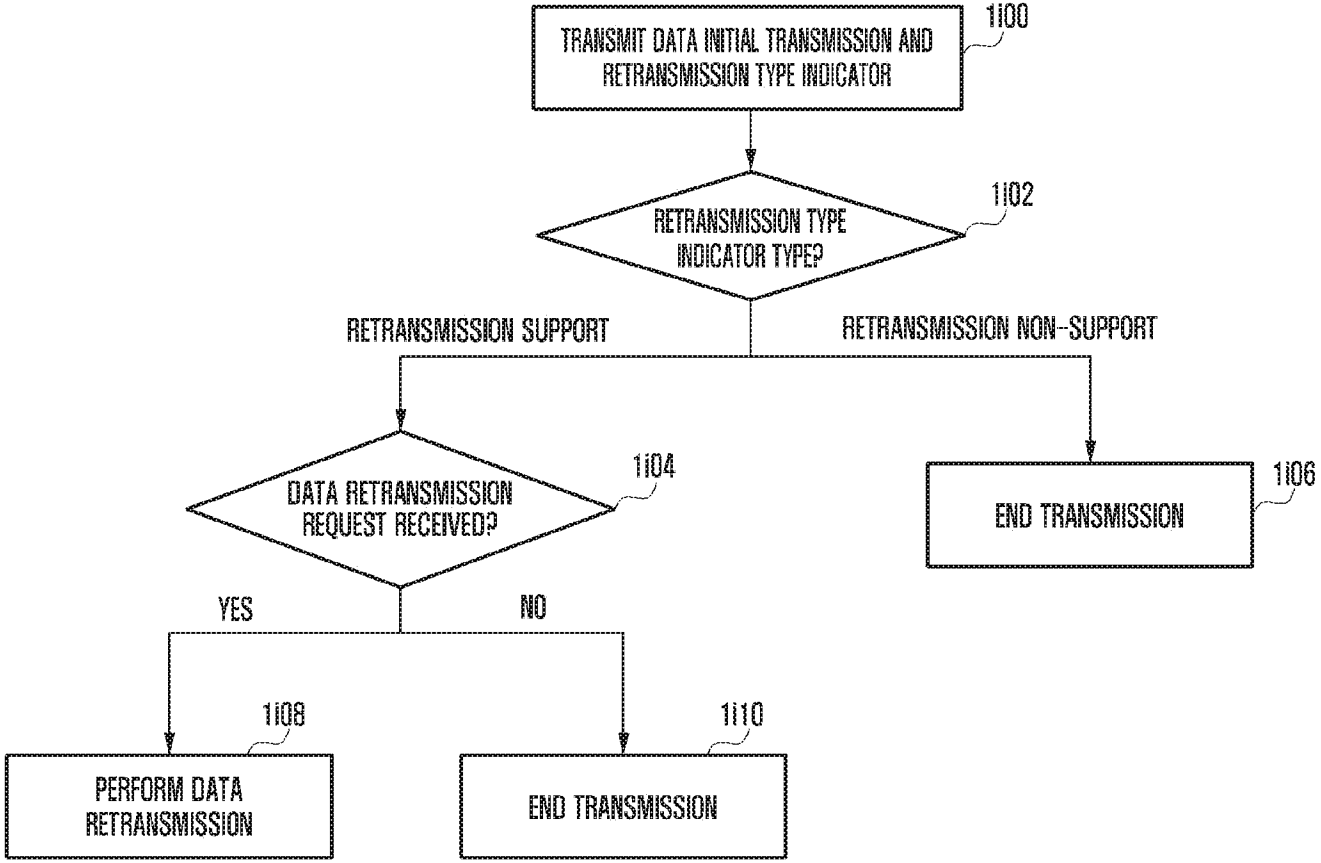

FIG. 1H is a diagram illustrating an initial repeated transmission method in a communication system.

Referring to FIG. 1H, a base station 1h00 retransmits (1h04 and 1h06) corresponding data in a predetermined number of repetitions without any report of the transmission result from a terminal 1h02, or transmits different data in the predetermined number of repetitions (1h04 and 1h06). In case of the repeated transmission, the base station transmits data, such as the initially transmitted data, to the terminal through a predetermined resource region, and the terminal receives the same data through the corresponding resource to heighten the result of the decoding/demodulation success. Further, the base station may transmit different data, rather than the same data, through the predetermined resource region. Further, it is also possible to perform a method in which the two methods as described above are combined with each other. That is, it is possible to perform transmission four times in total by respectively transmitting two pieces of data twice. In the disclosure, the above-described method is considered as a case where the retransmission type indicator does not support the repeated transmission and retransmission.

The retransmission type indicators may add explicit bit information as one of elements constituting the DCI in the control region and may transfer the same to the terminal. The (1-1)-th to (1-4)-th embodiments to be described below are related to four types of operations including support of (single transmission and) retransmission that is an operation considered by the retransmission type indicator from the viewpoint of the base station, non-support of (single transmission and) retransmission, support of repeated transmission and retransmission, and non-support of repeated transmission and retransmission, and a method for notifying of the four types of operations in different states will be described. Specifically, the (1-1)-th to (1-3)-th embodiments respectively provide methods for notifying of two of three types of operations including support of (single transmission and) retransmission that is the operation considered by the retransmission type indicator, non-support of (single transmission and) retransmission, and non-support of repeated transmission and retransmission, and the (1-4)-th embodiment provides the four types of operations including support of three types and repeated transmission and retransmission.

A terminal supporting the whole or a part of the above-described operation and an additional operation to be described later may be applied to all or parts of terminals for at least one specific service. Further, only at least one terminal having a specific channel situation value with respect to a specific base station can receive the corresponding service. Further, the base station may optionally transfer the terminal supporting the above-described operation through different physical/logical channels by terminals.

FIG. 1I is a diagram illustrating a base station operation according to a (1-1)-th embodiment.

FIG. 1I illustrates a base station operation that is possible in case where a retransmission type indicator that can be configured by a base station supports (single transmission and) retransmission and in case where the retransmission type indicator does not support the (single transmission and) retransmission. The base station transmits (1i00), to a terminal, corresponding data and the retransmission type indicator for the corresponding data transmission in a control region. If the retransmission type indicator 1i02 supports (single transmission and) retransmission, the base station receives (1i04) a report of an initial transmission result from the terminal in a corresponding configured resource region. If the initial transmission has succeeded through the report result, the base station ends (1i10) the transmission of the corresponding data, whereas if the initial transmission has failed, the base station retransmits (1i08) the corresponding data. Here, if the initial transmission has succeeded, the base station can consider that the base station does not receive a data retransmission request, whereas if the initial transmission has failed, the base station can consider that the base station receives the data retransmission request. If the retransmission type indicator 1i02 does not support the (single transmission and) retransmission, the base station performs the initial transmission only through the corresponding configured resource region, and automatically ends (1i06) the transmission of the corresponding data.

Figure 1J:
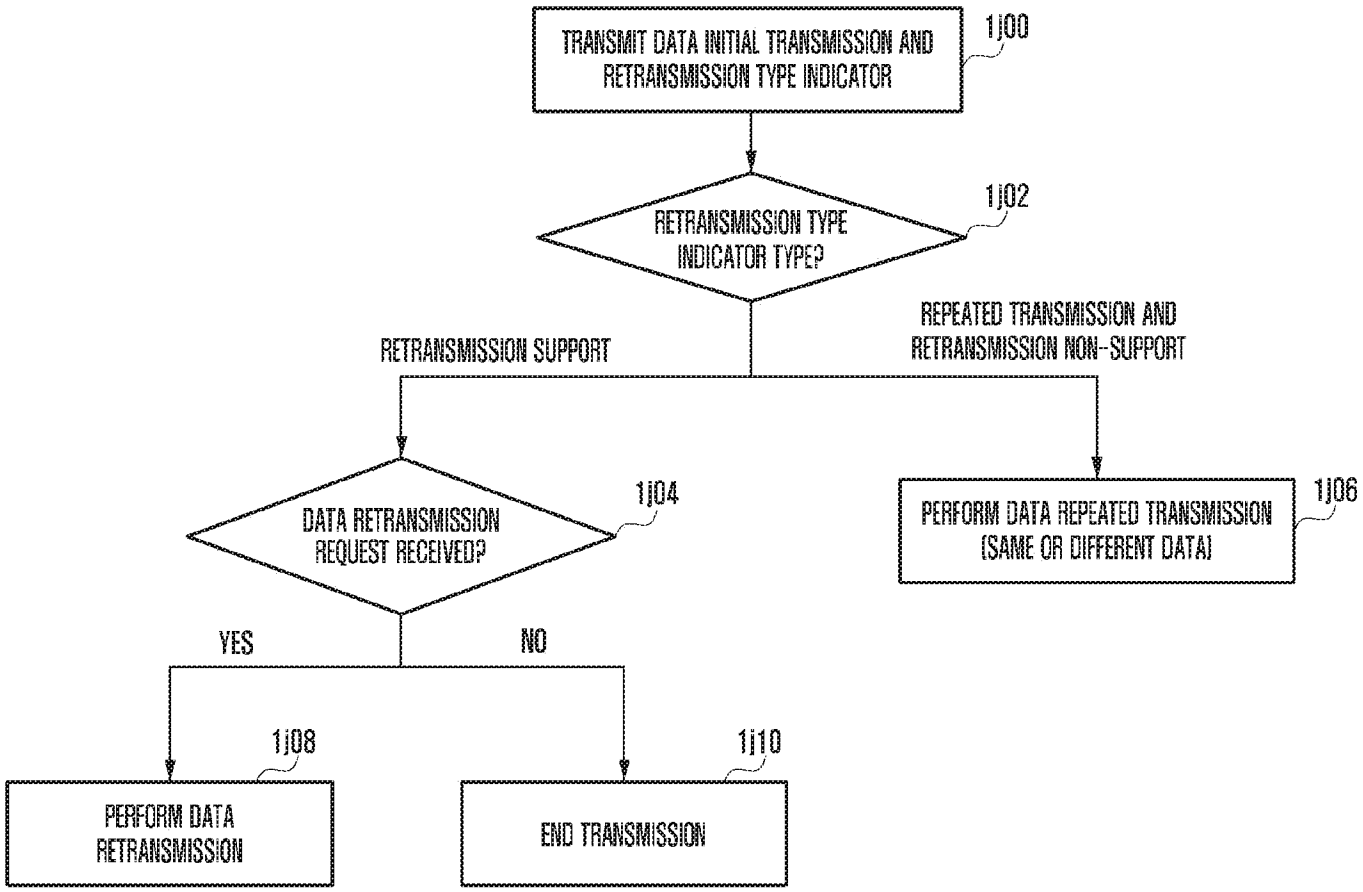
FIG. 1J is a diagram illustrating a base station operation according to a (1-2)-th embodiment.

FIG. 1J is a diagram illustrating a base station operation according to a (1-2)-th embodiment.

FIG. 1J illustrates a base station operation that is possible in case where a retransmission type indicator that can be configured by a base station supports (single transmission and) retransmission and in case where the retransmission type indicator does not support repeated transmission and retransmission. The base station transmits (1j00), to a terminal, corresponding data and the retransmission type indicator for the corresponding data transmission in a control region. If the retransmission type indicator 1j02 supports (single transmission and) retransmission, the base station receives (1j04) a report of an initial transmission result from the terminal in a corresponding configured resource region. If the initial transmission has succeeded through the report result, the base station ends (1j10) the transmission of the corresponding data, whereas if the initial transmission has failed, the base station retransmits (1j08) the corresponding data. If the retransmission type indicator 1j02 does not support the repeated transmission and retransmission, the base station performs (1j06) repeated retransmission of the same data or different data through the corresponding configured resource region.

Figure 1K:
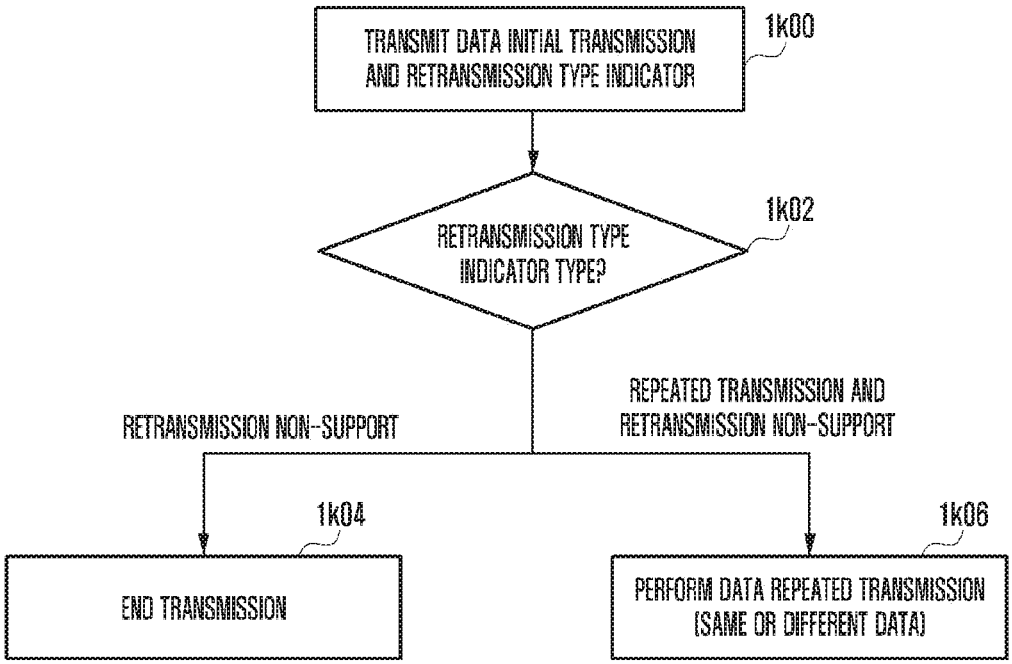
FIG. 1K is a diagram illustrating a base station operation according to a (1-3)-th embodiment.

FIG. 1K is a diagram illustrating a base station operation according to a (1-3)-th embodiment.

FIG. 1K illustrates a base station operation that is possible in case where a retransmission type indicator that can be configured by a base station does not support (single transmission and) retransmission and in case where the retransmission type indicator does not support repeated transmission and retransmission. The base station transmits (1k00), to a terminal, corresponding data and the retransmission type indicator for the corresponding data transmission in a control region. If the retransmission type indicator 1k02 does not support the (single transmission and) retransmission, the base station performs the initial transmission only through the corresponding configured resource region, and automatically ends (1k04) the transmission of the corresponding data. If the retransmission type indicator 1k02 does not support the repeated transmission and retransmission, the base station performs (1k06) repeated retransmission of the same data or different data through the corresponding configured resource region.

Figure 1L:
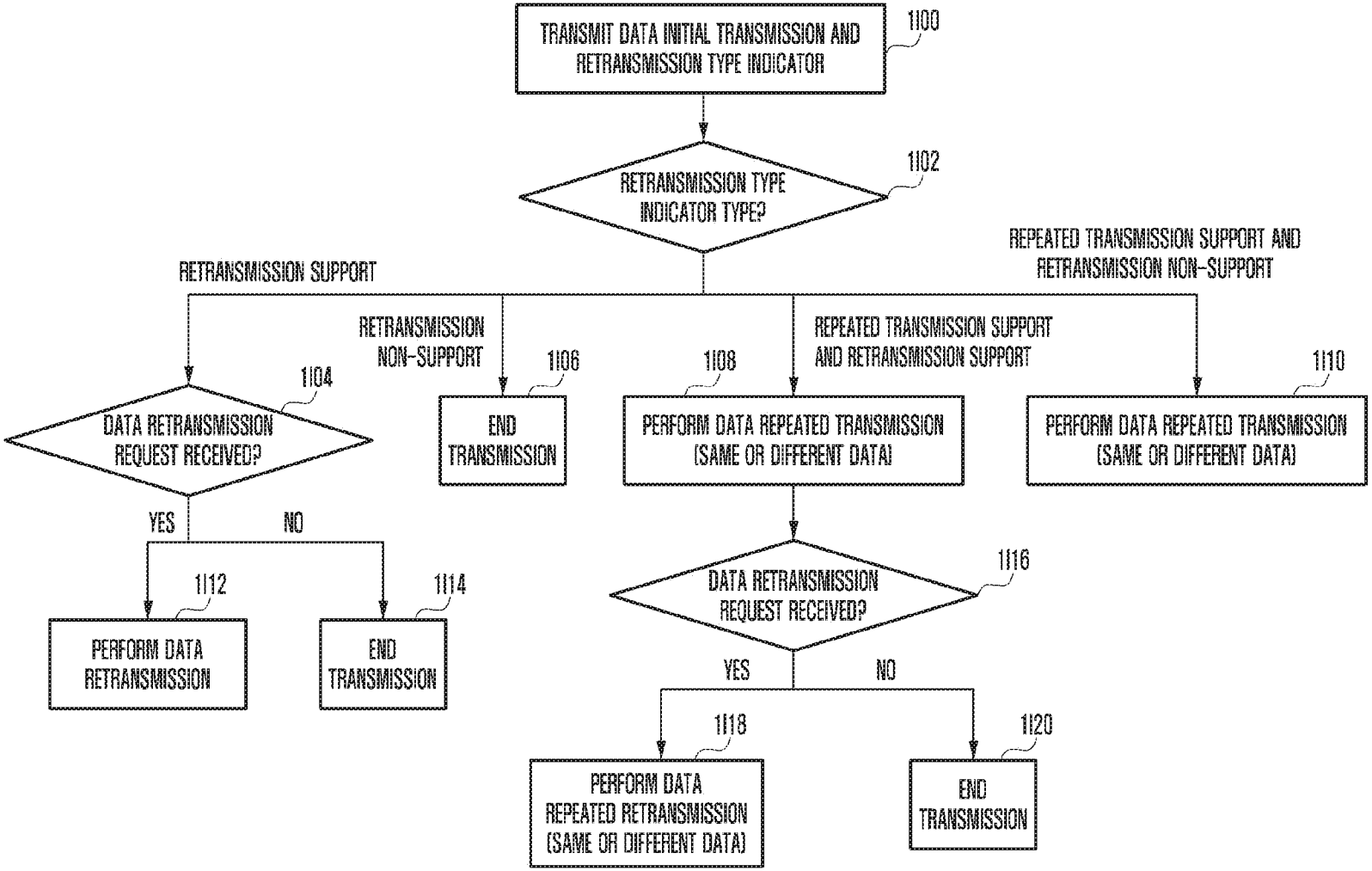
FIG. 1L is a diagram illustrating a base station operation according to a (1-4)-th embodiment.

FIG. 1L is a diagram illustrating a base station operation according to a (1-4)-th embodiment.

Referring to FIG. 1L, in contrast with the (1-1)-th to (1-3)-th embodiments, four kinds of retransmission type indicator types are considered, which include support of (single transmission and) retransmission, non-support of (single transmission and) retransmission, support of repeated transmission and retransmission, and non-support of repeated transmission and retransmission. Accordingly, information for notifying of the retransmission type indicator information is additionally necessary. That is, such information may be composed of 2 bits. If the retransmission type indicator 1l02 supports (single transmission and) retransmission, a base station receives (1l04) a report of an initial transmission result from a terminal in a corresponding configured resource region. If the initial transmission has succeeded through the report result, the base station ends (1l14) the transmission of the corresponding data, whereas if the initial transmission has failed, the base station retransmits (1l12) the corresponding data. If the retransmission type indicator 1l02 does not support the (single transmission and) retransmission, the base station performs the initial transmission only through the corresponding configured resource region, and automatically ends (1l06) the transmission of the corresponding data. If the retransmission type indicator 1l02 does not support the repeated transmission and retransmission, the base station performs (1l10) repeated retransmission of the same data or different data through the corresponding configured resource region. If the retransmission type indicator 1l02 supports the repeated transmission and retransmission, the base station performs (1l08) repeated retransmission of the same data or different data through the corresponding configured resource region, and then receives (1l16) a retransmission request from the terminal. If the retransmission request is received, the terminal may retransmit all data used for the initial repeated transmission, or may retransmit (1l18) only partial data of which the initial transmission has failed. If the retransmission request is not received, the base station ends the transmission (1l20) of the corresponding data.

Next, embodiments of terminal operations will be described. First, the (1-1)-th to (1-4)-th embodiments are examples in which the operations in the (1-1)-th to (1-4)-th embodiments from the viewpoint of the base station are exemplified from the viewpoint of a terminal. Further, the (1-5)-th to (1-9)-th embodiments do not consider a method for explicitly notifying of specific retransmission type indicator information, but consider a method for transferring information to be implicitly notified through a retransmission type indicator using information used in other control regions. First, as a method by the terminal for implicitly acquiring the information, there is a method for using configuration information for a data region transferred from the base station through a control region. Data can be implicitly transferred to the terminal using all configuration information related to the data, such as the size of a resource region to which the corresponding data is allocated, data modulation and coding scheme, and allocated symbol length. For example, if the data-allocated symbol length is equal to or larger than a predetermined threshold value, the terminal may determine that retransmission is not supported, whereas if the data-allocated symbol length is smaller than the predetermined threshold value, the terminal may determine that the retransmission is supported. Further, the corresponding terminal operations may be effective in opposite situations. In summary, one of possible retransmission type indicators is determined in accordance with the data configuration type. As another method, if slots having values that are equal to or larger than the predetermined threshold value are simultaneously scheduled to initial transmission in a situation where a scheduling transmission unit is a slot, the terminal can consider that the terminal does not report the result of the corresponding initial transmission. In contrast, if slots having values that are smaller than the predetermined threshold value are simultaneously scheduled to the initial transmission, the terminal can consider that the terminal receives the result report for the corresponding initial transmission and retransmission according to the result. As still another method, the terminal can perform implicit indication by means of the kind of a resource region that is searched for in a control region section. The terminal searches for information to be received in its own data region by searching for some partial sections of the control region, and in this case, by dividing a search region, it becomes possible to implicitly transfer information used for the retransmission type indicator to the terminal. For example, in a situation where the search region is briefly divided into A and B, the terminal may consider that the retransmission is not supported if a search for its own data configuration information has succeeded in the control region A. In contrast, if a search for its own data configuration information has succeeded in the control region B, the terminal may consider that the retransmission is supported. The corresponding region can be considered as a common search region, a search region for each user, or a search region for each group. In summary, one of possible retransmission type indicators is determined in accordance with the control information search type.

Figure 1M:
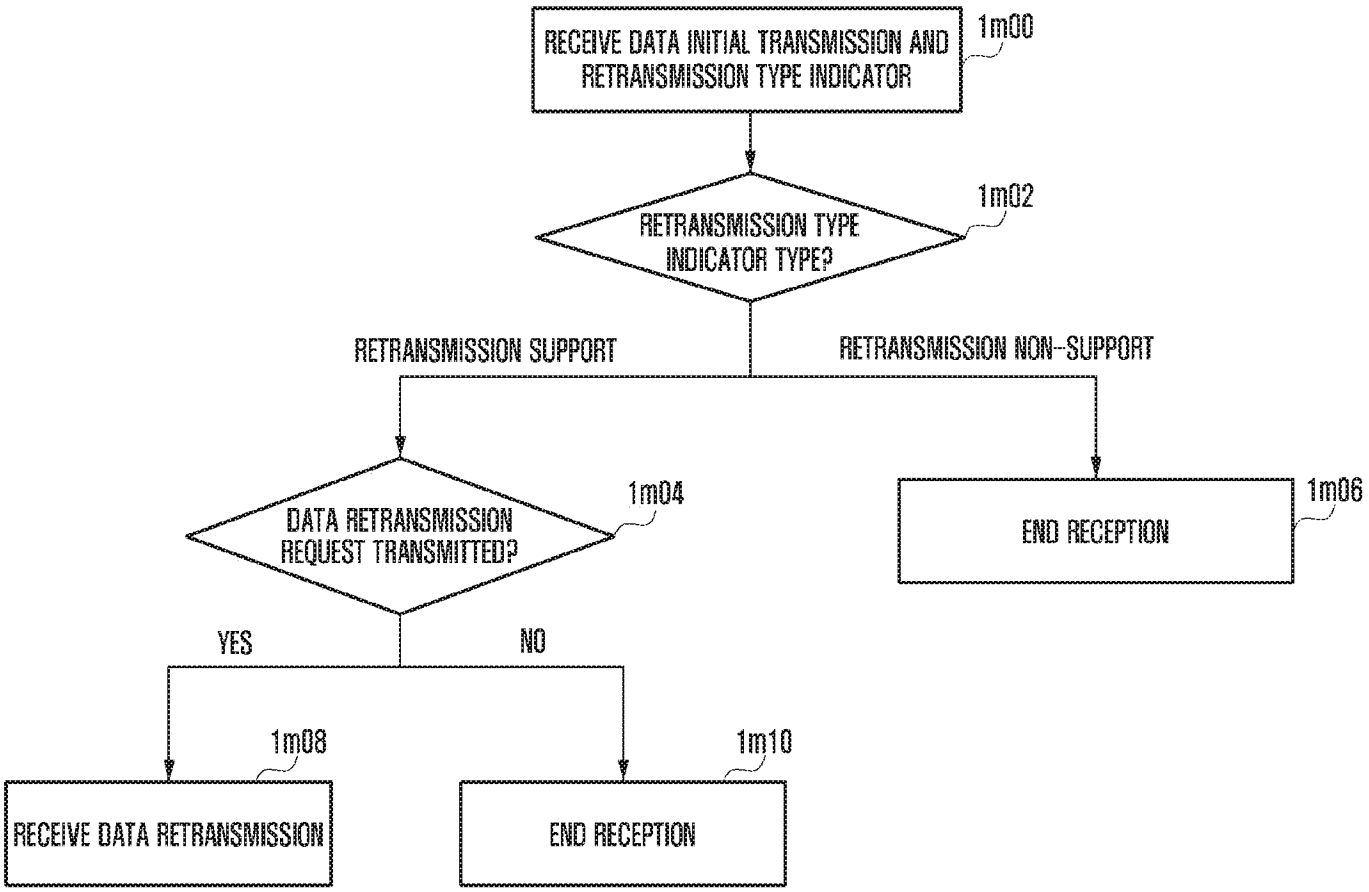
FIG. 1M is a diagram illustrating a terminal operation according to a (1-1)-th embodiment.

FIG. 1M is a diagram illustrating a terminal operation according to a (1-1)-th embodiment.

FIG. 1M illustrates a terminal operation that is possible in case where a retransmission type indicator that can be configured by a base station supports (single transmission and) retransmission and in case where the retransmission type indicator does not support the (single transmission and) retransmission. The terminal receives (1m00) corresponding data and the retransmission type indicator for the corresponding data transmission in a control region. If the retransmission type indicator 1m02 supports (single transmission and) retransmission, the terminal transmits (1m04) a report of an initial transmission result in a corresponding configured resource region. If the initial transmission has succeeded through the report result, the terminal ends (1m10) the reception of the corresponding transmitted data, whereas if the initial transmission has failed, the terminal receives (1m08) the corresponding data. Here, if the initial transmission has succeeded, the terminal can consider that the terminal does not transmit a retransmission request, whereas if the initial transmission has failed, the terminal can consider that the terminal transmits the retransmission request. If the retransmission type indicator 1m02 does not support the (single transmission and) retransmission, the terminal receives the initial transmission only through the corresponding configured resource region, and automatically ends (1m06) the reception of the corresponding data.

Figure 1N:
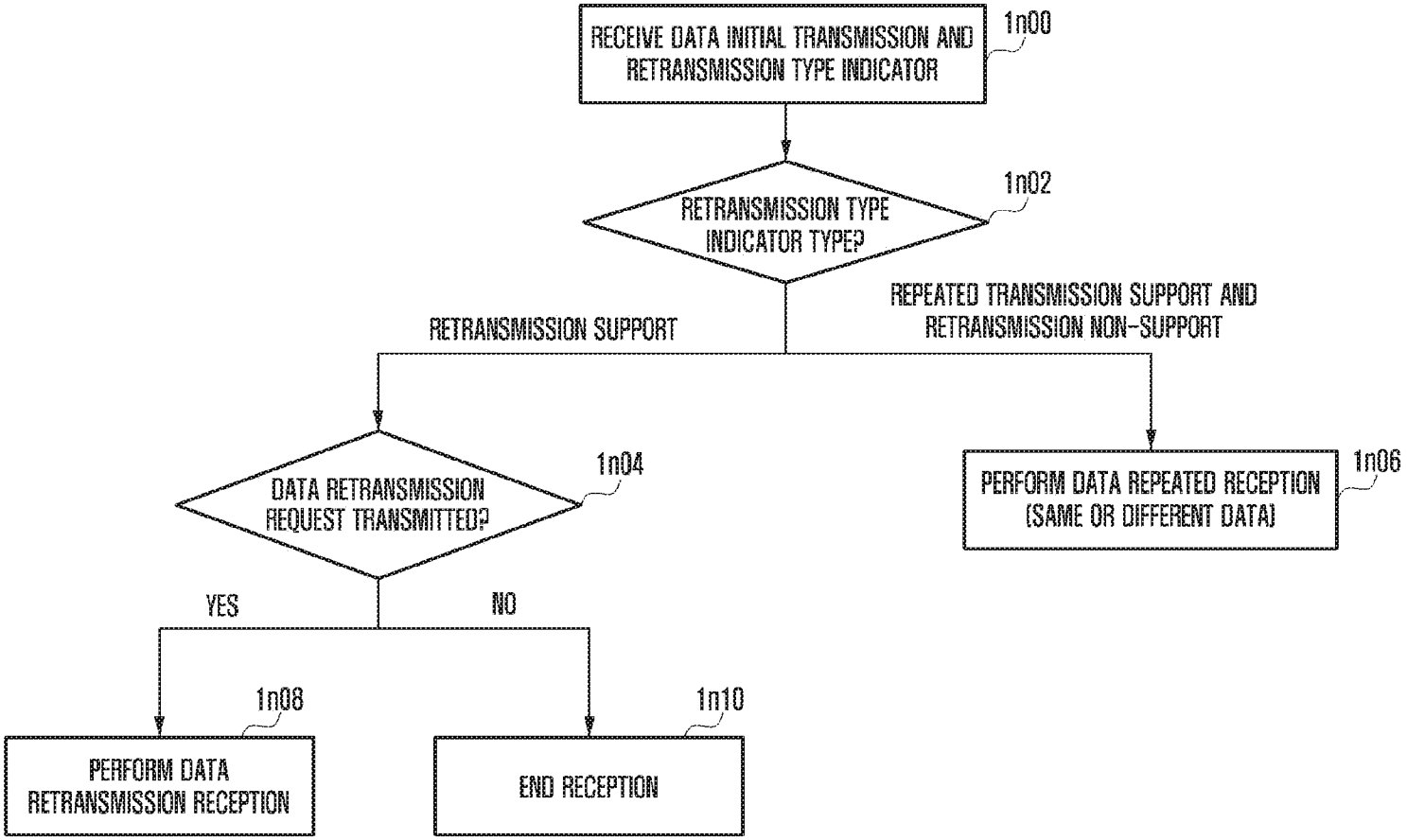
FIG. 1N is a diagram illustrating a terminal operation according to a (1-2)-th embodiment.
Figure 10:
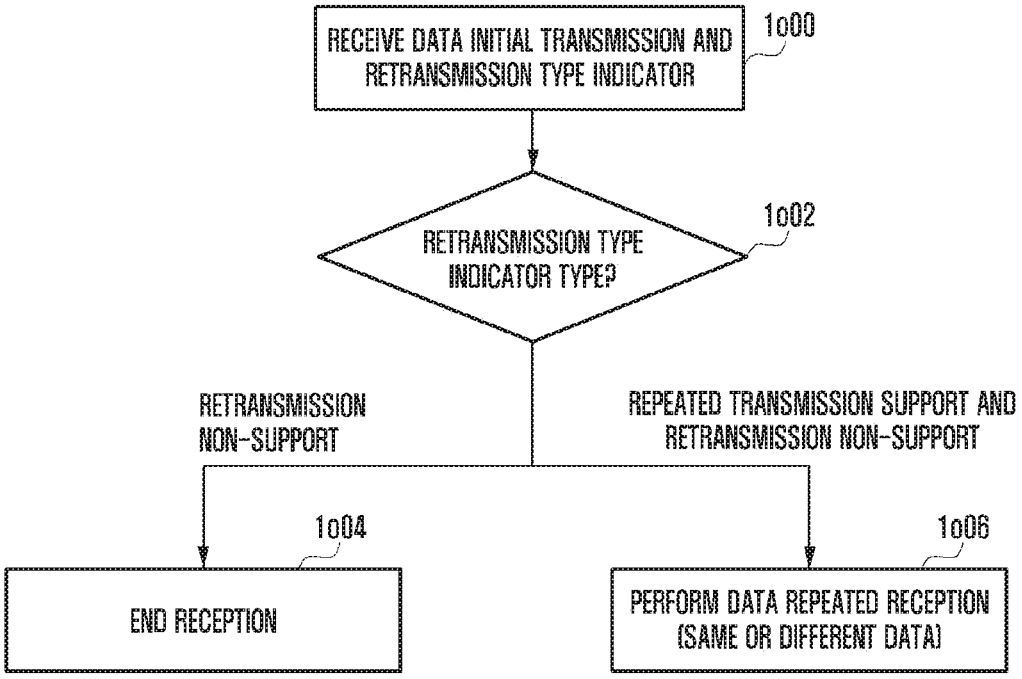

FIG. 1N is a diagram illustrating a terminal operation according to a (1-2)-th embodiment.

FIG. 1N illustrates a terminal operation that is possible in case where a retransmission type indicator that can be configured by a base station supports (single transmission and) retransmission and in case where the retransmission type indicator does not support repeated transmission and retransmission. The terminal receives (1n00) corresponding data and the retransmission type indicator for the corresponding data transmission in a control region. If the retransmission type indicator 1n02 supports (single transmission and) retransmission, the terminal transmits (1n04) a report of an initial transmission result in a corresponding configured resource region. If the initial transmission has succeeded through the report result, the terminal ends (1n10) the reception of the corresponding data, whereas if the initial transmission has failed, the terminal rereceives (1n08) the corresponding data. If the retransmission type indicator 1n02 does not support the repeated transmission and retransmission, the terminal receives the initial transmission through the corresponding configured resource region, and then additionally receives data, such as the initial transmission, without receiving additional control information through a predetermined resource region or receives (1n06) next new data.

FIG. 1O is a diagram illustrating a terminal operation according to a (1-3)-th embodiment.

FIG. 1O illustrates a terminal operation that is possible in case where a retransmission type indicator that can be configured by a base station does not support (single transmission and) retransmission and in case where the retransmission type indicator does not support repeated transmission and retransmission. The terminal receives (1o00) corresponding data and the retransmission type indicator for the corresponding data transmission in a control region. If the retransmission type indicator 1o02 does not support the (single transmission and) retransmission, the terminal receives the initial transmission only through the corresponding configured resource region, and automatically ends (1o04) the reception of the corresponding data. If the retransmission type indicator 1o02 does not support the repeated transmission and retransmission, the terminal receives the initial transmission through the corresponding configured resource region, and then additionally receives data, such as the initial transmission, without receiving additional control information through a predetermined resource region or receives (1o06) next new data.

Figure 1P:
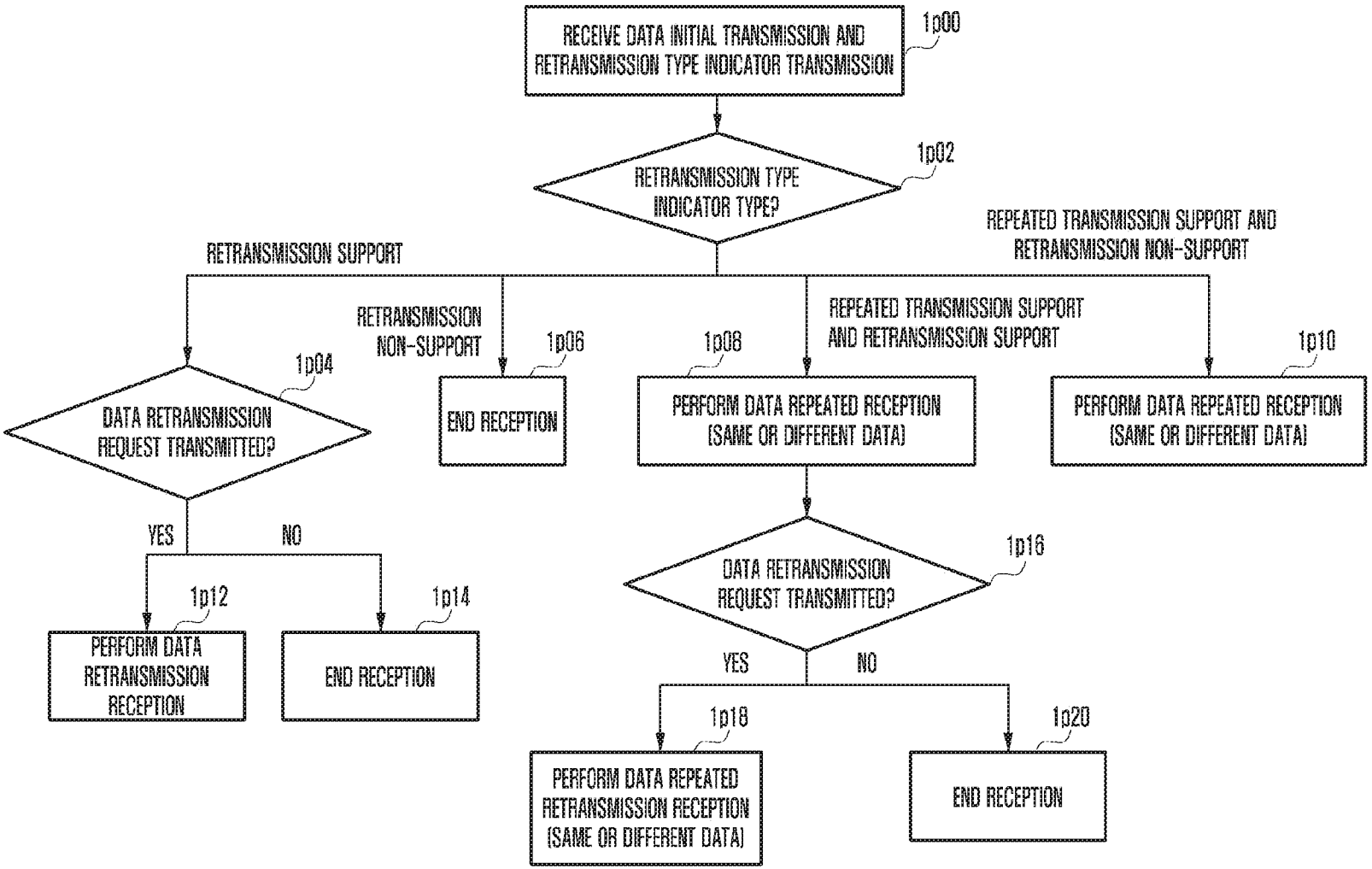
FIG. 1P is a diagram illustrating a terminal operation according to a (1-4)-th embodiment.

FIG. 1P is a diagram illustrating a terminal operation according to a (1-4)-th embodiment.

FIG. 1P illustrates a terminal operation that is possible in four cases including a case where a retransmission type indicator that can be configured by a base station supports (single transmission and) retransmission, a case where the retransmission type indicator does not support (single transmission and) retransmission, a case where the retransmission type indicator supports repeated transmission and retransmission, and a case where the retransmission type indicator does not support repeated transmission and retransmission. The terminal transmits the corresponding data and receives (1p00) the retransmission type indicator for the corresponding data transmission in a control region. If the retransmission type indicator 1p02 supports (single transmission and) retransmission, the terminal transmits (1p04) a report of an initial transmission result in a corresponding configured resource region. If the initial transmission has succeeded through the report result, the terminal ends (1p14) the reception of the corresponding data, whereas if the initial transmission has failed, the terminal rereceives (1p12) the corresponding data. If the retransmission type indicator 1p02 does not support the retransmission, the terminal receives the initial transmission only through the corresponding configured resource region, and automatically ends (1p06) the reception of the corresponding data. If the retransmission type indicator 1p02 does not support the repeated transmission and retransmission, the terminal receives the initial transmission through the corresponding configured resource region, and then additionally receives data, such as the initial transmission, without receiving additional control information through a predetermined resource region or receives (1p06) next new data. If the retransmission type indicator 1p02 supports the repeated transmission and retransmission, the terminal performs (1p08) repeated retransmission of the same data or different data through the corresponding configured resource region, and then transmits (1p16) a retransmission request to the base station. If the retransmission request is transmitted, the terminal may rereceive all data used for the initial repeated transmission, or may separately rereceive (1p18) only partial data of which the initial transmission has failed. If the retransmission request is not transmitted, the terminal ends the reception (1p20) of the corresponding data.

In the (1-1)-th to (1-4)-th embodiments as described above, the retransmission type indicator information is transferred as a part of DCI information in a control region of a physical channel, and the terminal can determine whether to perform the subsequent operation by identifying the part. For example, in the (1-1)-th embodiment, if the 1-bit retransmission type indicator value is 1, it means a retransmission support operation. In this case, the terminal transmits, to the base station, a message indicating whether to request retransmission in the timing determined with the base station or in the timing that can be newly configured, and accordingly, the base station retransmits the corresponding data in the predetermined timing or in the timing that can be newly configured if the terminal requires a retransmission reception request. As still another method, if the retransmission type indicator information is transferred to the terminal as RRC information, the terminal acquires this information, and then performs a configured operation before radio resource control (RRC) information is newly changed after acquisition of the information. For example, in the (1-1)-th embodiment, if the retransmission type indicator value is 1 through RRC signaling, an operation supporting the retransmission is performed, whereas if the retransmission type indicator value is 0, an operation having no retransmission is performed. As still another method, the retransmission type indicator may be transferred to the terminal through system information broadcasting (SIB) or medium access channel (MAC) control element (CE). As still another method, the (1-1)-th to (1-4)-the embodiments as described above may be simultaneously implemented in one system rather than separate independent operations. For example, through the RRC information, it is notified that one of the (1-1)-th to (1-4)-the embodiments is applied to the terminal, and through the control region of the physical channel, the retransmission type indicator used in the corresponding embodiment is notified to the terminal. Further, the retransmission type indicator applied to the individual embodiments may be transmitted to the terminal on only one channel, or may be transmitted to the terminal as part of the whole information on several channels. As still another method, there may exist a method in which both 1-bit retransmission type indicators 0 and 1 are mapped to operations defined in the respective retransmission type indicators, respectively, or the retransmission type indicators may be notified to the terminal in a toggling manner in which values are changed. For example, if the retransmission type indicator is changed from 0 to 1 or from 1 to 0 in a retransmission operation mode in a situation where the retransmission type indicator is applied as retransmission support and retransmission non-support applied in the (1-1)-th embodiment, the basic transmission mode may be considered as a method for switchover to a non-retransmission mode. Here, the basic transmission mode may be configured as one mode of the retransmission type indicators applied to other embodiments. When the retransmission type indicator value is toggled, an applied operation may also be one of modes notified by the retransmission type indicator as described above in the (1-1)-th to (1-4)-th embodiments.

The (1-5)-th to (1-8)-th embodiments to be described below are related to a method for mapping at least one of information included in a control region transferred on a physical channel that the terminal receives from the base station, information transferred from a logical channel, and control information for communication transferred from an RRC step to a retransmission type indicator and transmitting the information to the terminal. The terminal can grasp one mode of the retransmission type indicator in accordance with the resource allocation among elements constituting DCI information configured for data allocation in a control region. As an example, if a data scheduling unit allocated to the terminal for initial transmission is one or is smaller than a predetermined threshold value, the terminal can indirectly be aware of the existence of retransmission request message transmission according to the corresponding transmission and subsequent retransmission reception operation. In contrast, if the data scheduling unit is larger than one or is equal to or larger than a predetermined threshold value, the terminal determines that there is not the retransmission operation according to the corresponding transmission, receives only the corresponding initial transmission (or repeated transmission), and ends the reception.

Figure 1Q:
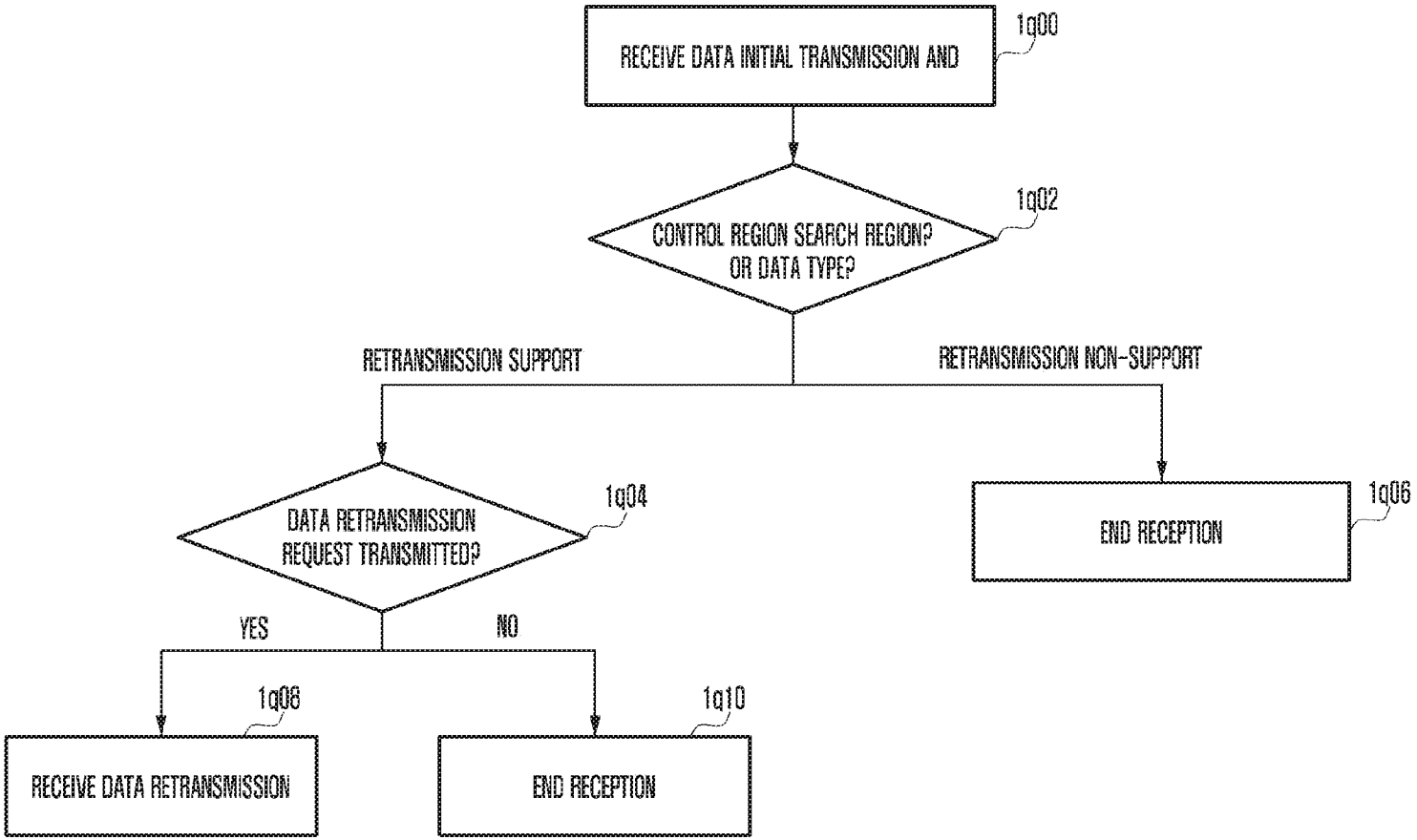
FIG. 1Q is a diagram illustrating a terminal operation according to a (1-5)-th embodiment.

FIG. 1Q is a diagram illustrating a terminal operation according to a (1-5)-th embodiment.

FIG. 1Q illustrates a terminal operation that is possible in case where a retransmission type indicator that can be configured by a base station supports (single transmission and) retransmission and in case where the retransmission type indicator does not support the (single transmission and) retransmission. The terminal receives (1q00) corresponding data and control information notifying of data configuration information. In case where (single transmission and) retransmission is supported with the result that the terminal implicitly receives (1q02) a search region type of a control region (whether the control information for the corresponding terminal is detected from control region A or control region B) or a data type configured through the control region (resource region size, symbol length, and demodulation/modulation type), the terminal transmits (1q04) a report of an initial transmission result in a corresponding configured resource region. If the initial transmission has succeeded through the report result, the terminal ends (1q10) the reception of the corresponding transmitted data, whereas if the initial transmission has failed, the terminal rereceives (1q08) the corresponding data. Here, if the initial transmission has succeeded, the terminal can consider that the terminal does not transmit a retransmission request, whereas if the initial transmission has failed, the terminal can consider that the terminal transmits the retransmission request. If the (single transmission and) retransmission is not supported with the result that the terminal implicitly receives (1q02) the search region type of the control region (whether the control information for the corresponding terminal is detected from control region A or control region B) or the data type configured through the control region (resource region size, symbol length, and demodulation/modulation type), the terminal receives the initial transmission only through the corresponding configured resource region, and automatically ends (1q06) the reception of the corresponding data.

Figure 1R:
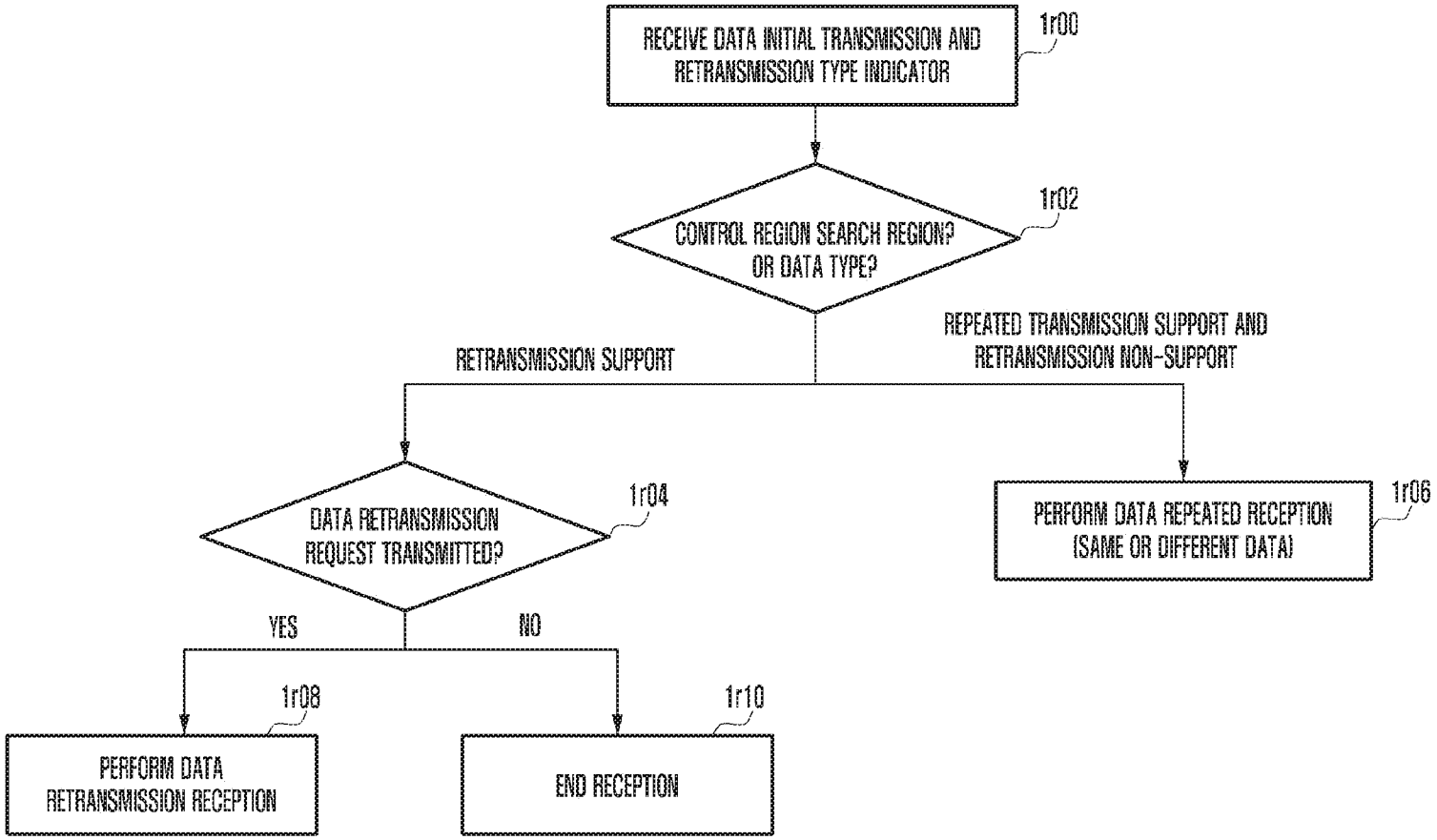
FIG. 1R is a diagram illustrating a terminal operation according to a (1-6)-th embodiment.

FIG. 1R is a diagram illustrating a terminal operation according to a (1-6)-th embodiment.

FIG. 1R illustrates a terminal operation that is possible in case where a retransmission type indicator that can be configured by a base station supports (single transmission and) retransmission and in case where the retransmission type indicator does not support repeated transmission and retransmission. The terminal receives (1r00) corresponding data and control information notifying of data configuration information. In case where the retransmission is supported with the result that the terminal implicitly receives (1r02) a search region type of a control region (whether the control information for the corresponding terminal is detected from control region A or control region B) or a data type configured through the control region (resource region size, symbol length, and demodulation/modulation type), the terminal transmits (1r04) a report of an initial transmission result in a corresponding configured resource region. If the initial transmission has succeeded through the report result, the terminal ends (1r10) the reception of the corresponding transmitted data, whereas if the initial transmission has failed, the terminal rereceives (1r08) the corresponding data. If the repeated transmission is supported with the result that the terminal implicitly receives (1r02) the search region type of the control region (whether the control information for the corresponding terminal is detected from control region A or control region B) or the data type configured through the control region (resource region size, symbol length, and demodulation/modulation type), the terminal receives the initial transmission through the corresponding configured resource region, and then additionally receives data, such as the initial transmission, without receiving additional control information through a predetermined resource region or receives (1r06) next new data.

Figure 1S:
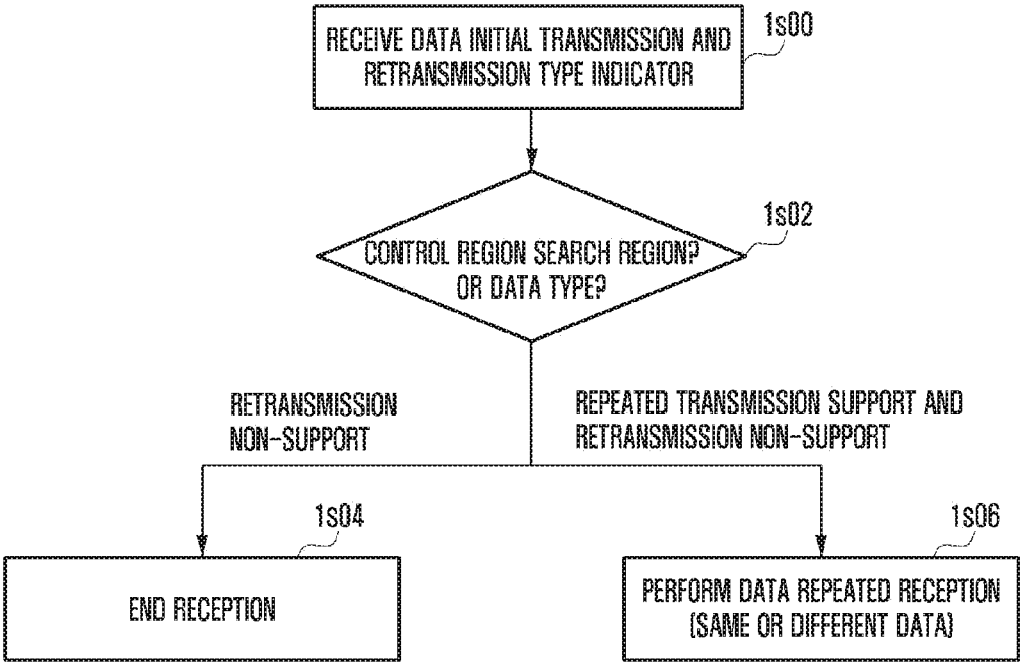
FIG. 1S is a diagram illustrating a terminal operation according to a (1-7)-th embodiment.

FIG. 1S is a diagram illustrating a terminal operation according to a (1-7)-th embodiment.

FIG. 1S illustrates a terminal operation that is possible in case where a retransmission type indicator that can be configured by a base station does not support (single transmission and) retransmission and in case where the retransmission type indicator does not support repeated transmission and retransmission. The terminal receives (1s00) corresponding data and control information notifying of data configuration information. In case where the indicator does not support (single transmission and) retransmission with the result that the terminal implicitly receives (1s02) a search region type of a control region (whether the control information for the corresponding terminal is detected from control region A or control region B) or a data type configured through the control region (resource region size, symbol length, and demodulation/modulation type), the terminal receives the initial transmission only through the corresponding configured resource region, and automatically ends (1s04) the reception of the corresponding data. If the repeated transmission and retransmission are not supported with the result that the terminal implicitly receives (1s02) the search region type of the control region (whether the control information for the corresponding terminal is detected from control region A or control region B) or the data type configured through the control region (resource region size, symbol length, and demodulation/modulation type), the terminal receives the initial transmission through the corresponding configured resource region, and then additionally receives data, such as the initial transmission, without receiving additional control information through a predetermined resource region or receives (1s06) next new data.

Figure 1T:
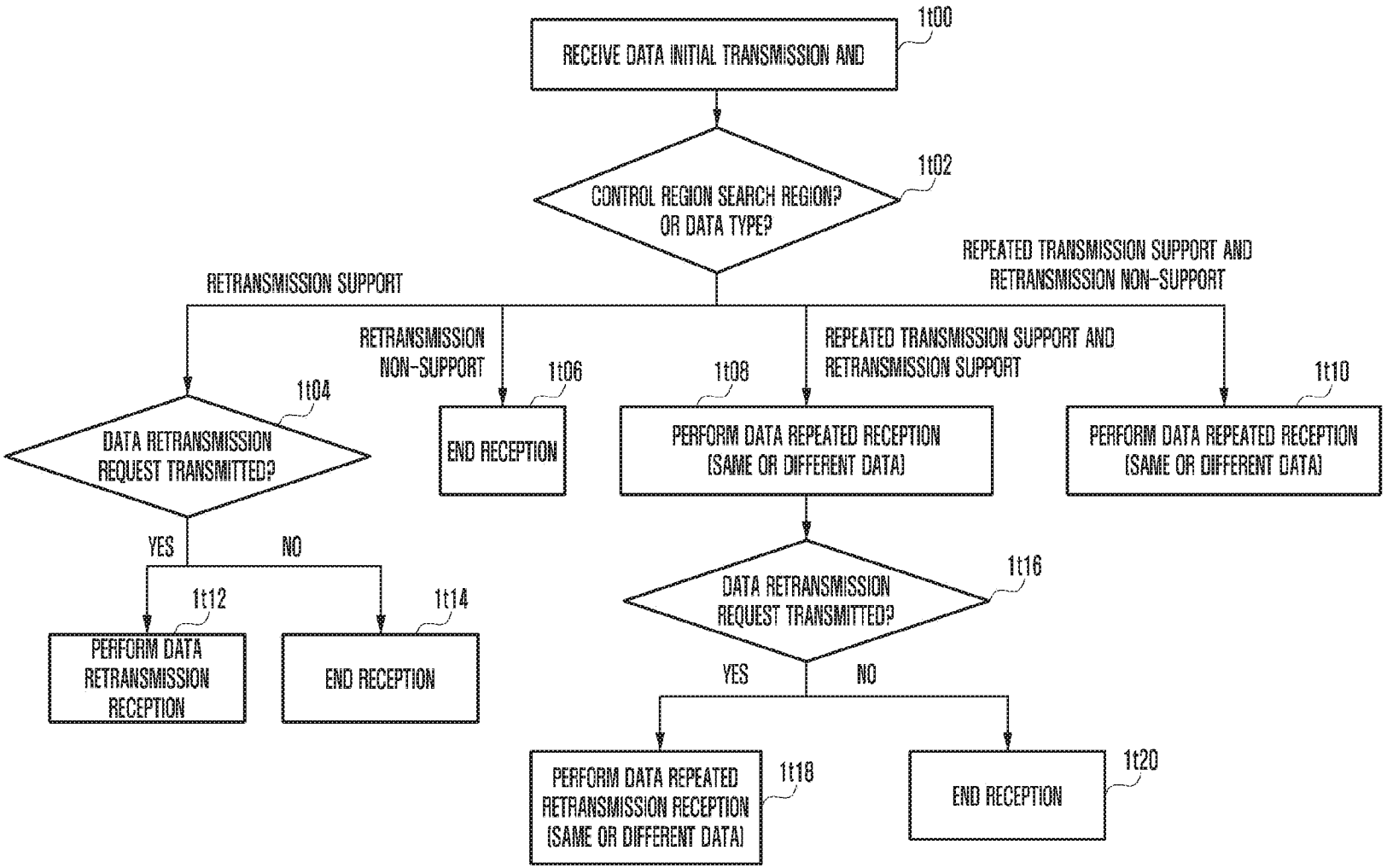
FIG. 1T is a diagram illustrating a terminal operation according to a (1-8)-th embodiment.

FIG. 1T is a diagram illustrating a terminal operation according to a (1-8)-th embodiment.

FIG. 1T illustrates a terminal operation that is possible in four cases including a case where a retransmission type indicator that can be configured by a base station supports (single transmission and) retransmission, a case where the retransmission type indicator does not support (single transmission and) retransmission, a case where the retransmission type indicator supports repeated transmission and retransmission, and a case where the retransmission type indicator does not support repeated transmission and retransmission. The terminal receives (1t00) corresponding data and control information notifying of data configuration information. In case where the indicator supports (single transmission and) retransmission with the result that the terminal implicitly receives (1t02) a search region type of a control region (whether the control information for the corresponding terminal is detected from control region A or control region B) or a data type configured through the control region (resource region size, symbol length, and demodulation/modulation type), the terminal transmits (1t04) a report of an initial transmission result in a corresponding configured resource region. If the initial transmission has succeeded through the report result, the terminal ends (1t14) the reception of the corresponding data, whereas if the initial transmission has failed, the terminal rereceives (1t12) the corresponding data. If the repeated transmission and retransmission are not supported with the result that the terminal implicitly receives (1t02) the search region type of the control region (whether the control information for the corresponding terminal is detected from control region A or control region B) or the data type configured through the control region (resource region size, symbol length, and demodulation/modulation type), the terminal receives the initial transmission through the corresponding configured resource region, and then additionally receives data, such as the initial transmission, without receiving additional control information through a predetermined resource region or receives (1t10) next new data. If the repeated transmission and retransmission are supported with the result that the terminal implicitly receives (1t02) the search region type of the control region (whether the control information for the corresponding terminal is detected from control region A or control region B) or the data type configured through the control region (resource region size, symbol length, and demodulation/modulation type), the terminal performs (1t08) repeated rereception of the same data or different data through the corresponding configured resource region, and then transmits (1t16) a retransmission request to the base station. If the retransmission request is transmitted, the terminal may rereceive all data used for the initial repeated transmission, or may separately rereceive (1t18) only partial data of which the initial transmission has failed. If the retransmission request is not transmitted, the terminal ends the reception (1t20) of the corresponding data.

Figure 1U:
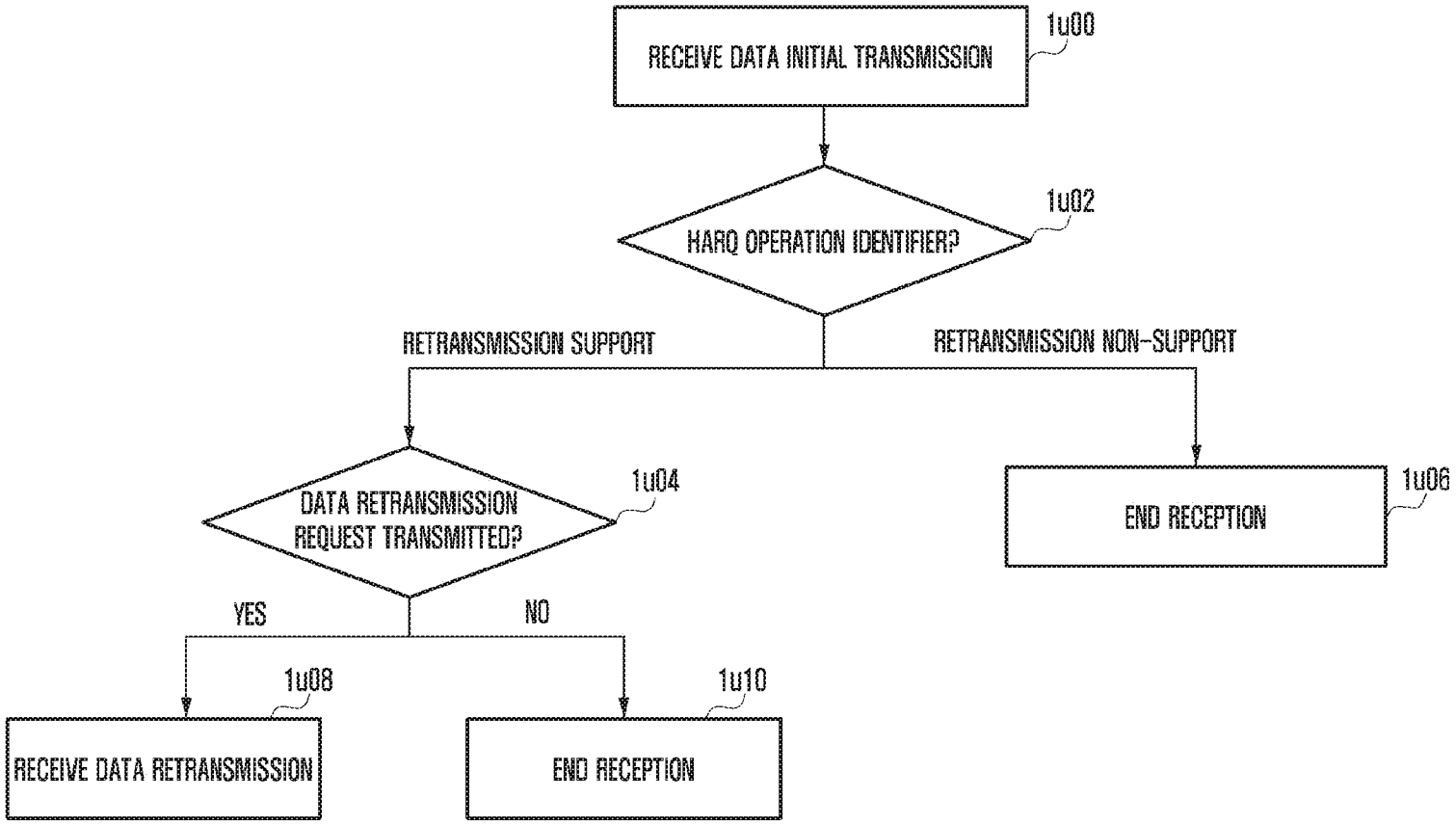
FIG. 1U is a diagram illustrating a terminal operation according to a (1-9)-th embodiment.

FIG. 1U is a diagram illustrating a terminal operation according to a (1-9)-th embodiment.

FIG. 1U illustrates a method for notifying a value notifying of an HARQ process identity of retransmission type indicator information in order for a base station to notify a terminal of the type of data transmitted in a corresponding data region. If at least one value can be configured as a non-retransmission operation in a situation where the total number of HARQ process identities is N, the terminal determines the non-retransmission operation through this, and does not perform the retransmission request and retransmission reception. In case where at least one value of the HARQ process identities is mapped to the retransmission non-support operation, the terminal and the base station may predefine this, or the base station may notify the terminal as RRC or MAC CE information. In the above-described situation, the terminal receives the HARQ process identity from the base station, and determines whether to support the HARQ operation. For example, if the total number of bits used for the HARQ process identities is 3, one or more numbers may include the retransmission type indicator information as described above. In case where "000" that is one of HARQ process identities is a retransmission non-support value predefined between the base station and the terminal, the terminal can consider that the retransmission is not supported in case of receiving the corresponding identity "000". Further, as another method, "000" that is the HARQ process identity for the retransmission non-support may be allocated by the base station for each terminal or for each terminal group, may notify the terminal that one or more values correspond to HARQ process identities operating for retransmission non-support, or may be values that can be changed to other values (e.g., "001" or "010") in accordance with the time and frequency through the RRC or MAC CE. In the above-described process, the terminal receives (1u02) the HARQ process identity included in control information notifying of the initially transmitted data region information. In this case, if the at least one HARQ process identity value is a value predefined by the terminal and the base station or an inherent value allocated for each terminal or terminal group, and this value means a value supporting the retransmission, the terminal requests (1u04) the retransmission when receiving this value. In case where the terminal makes the retransmission request, it rereceives (1u08) the corresponding data of which the transmission has failed through a data resource newly allocated to the base station or a pre-engaged data resource, and if the terminal does not request the retransmission, it ends (1u10) the reception. If the HARQ process identity value means a retransmission non-support value, the terminal receives the initial transmission only through the configured resource region, and automatically ends (1u06) the reception of the data.

Figure 1V:
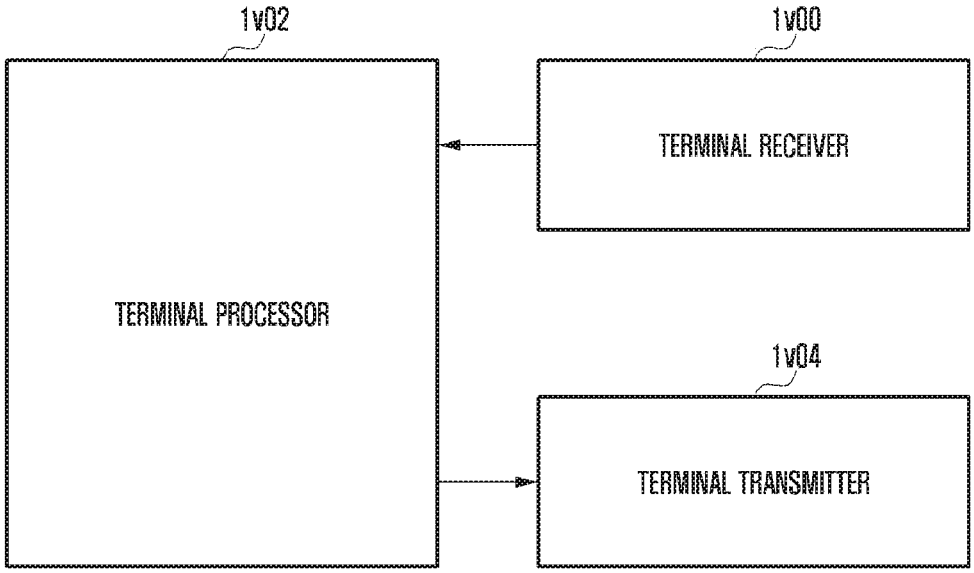
FIG. 1V is a block diagram illustrating the structure of a terminal according to embodiments.

FIG. 1V is a block diagram illustrating the structure of a terminal according to embodiments.

Referring to FIG. 1V, a terminal according to embodiments of the disclosure may include a terminal receiver 1v00, a terminal transmitter 1v04, and a terminal processor 1v02. In an embodiment, the terminal receiver 1v00 and the terminal transmitter 1v04 may be commonly called a transceiver unit. The transceiver unit may transmit/receive a signal with a base station. The signal may include control information and data. For this, the transceiver unit may be composed of an RF transmitter for up-converting and amplifying the frequency of a transmitted signal, and an RF receiver for low-noise-amplifying and down-converting the frequency of a received signal. Further, the transceiver unit may receive a signal through a radio channel, and may output the received signal to the terminal processor 1v02. The transceiver unit may also transmit the signal that is output from the terminal processor 1v02 through the radio channel. The terminal processor 1v02 may control a series of processes so as to operate according to the above-described embodiments. For example, the terminal receiver 1v00 may operate to receive a signal that includes second signal transmission timing information from the base station, and the terminal processor 1v02 may operate to analyze the second signal transmission timing. Thereafter, the terminal transmitter 1v04 may transmit the second signal in the above-described timing.

Figure 1W:
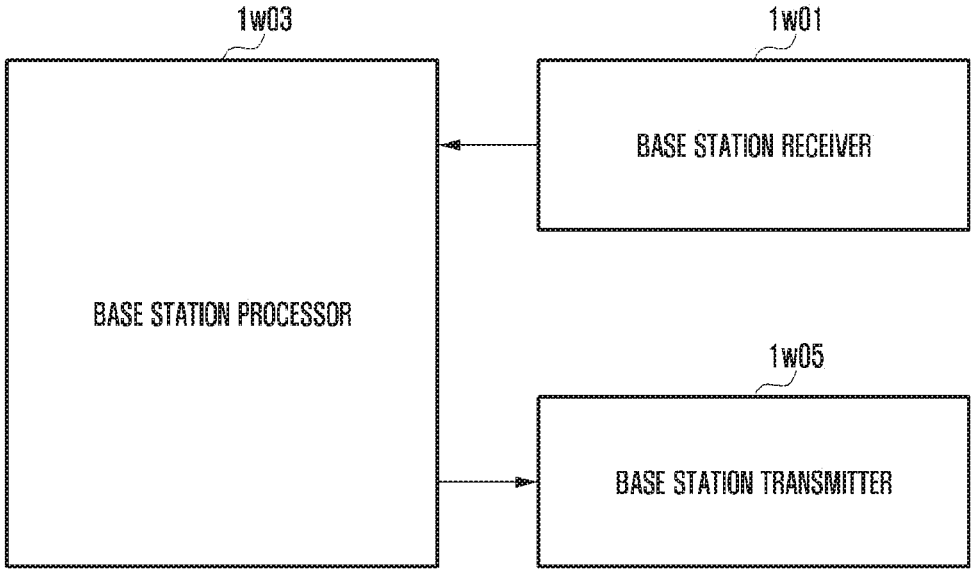
FIG. 1W is a block diagram illustrating the structure of a base station according to an embodiments.

FIG. 1W is a block diagram illustrating the structure of a base station according to embodiments.

Referring to FIG. 1W, a base station according to embodiments of the disclosure may include at least one of a base station receiver 1w01, a base station transmitter 1w05, and a base station processor 1w03. In an embodiment of the disclosure, the base station receiver 1w01 and the base station transmitter 1w05 may be commonly called a transceiver unit. The transceiver unit may transmit/receive a signal with a terminal. The signal may include control information and data. For this, the transceiver unit may be composed of an RF transmitter for up-converting and amplifying the frequency of a transmitted signal, and an RF receiver for low-noise-amplifying and down-converting the frequency of a received signal. Further, the transceiver unit may receive a signal through a radio channel, and may output the received signal to the base station processor 1w03. The transceiver unit may also transmit the signal that is output from the base station processor 1w03 through the radio channel. The base station processor 1w03 may control a series of processes so as to operate according to the above-described embodiments. For example, the base station processor 1w03 may operate to determine the second signal transmission timing, and to generate the second signal transmission timing information to be transferred to the terminal. Thereafter, the base station transmitter 1w05 may transfer the timing information to the terminal, and the base station receiver 1w01 may receive the second signal in the above-described timing.

Further, according to an embodiment of the disclosure, the base station processor 1w03 may operate to generate Downlink Control Information (DCI) that includes the second signal transmission timing information. In this case, the DCI may indicate the second signal transmission timing information.

The embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the first, second, and third embodiments of the disclosure may be combined with each other to operate the base station and the terminal. Further, although the above-described embodiments have been proposed on the basis of an NR system, other modified examples based on the technical idea of the above-described embodiments may be embodied in other systems, such as FDD and TDD LTE systems.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure in addition to the embodiments disclosed herein.

Embodiment 2

Further, according to embodiments of the disclosure, when a base station or a network intends to use one or more time-frequency radio resource regions in order to support different systems, services, or terminals, a method by terminals for determining the radio resource regions, a method for determining the size of data transmitted or received in the determined radio resource regions, and a device using the above-described methods may be provided.

Figure 2A:
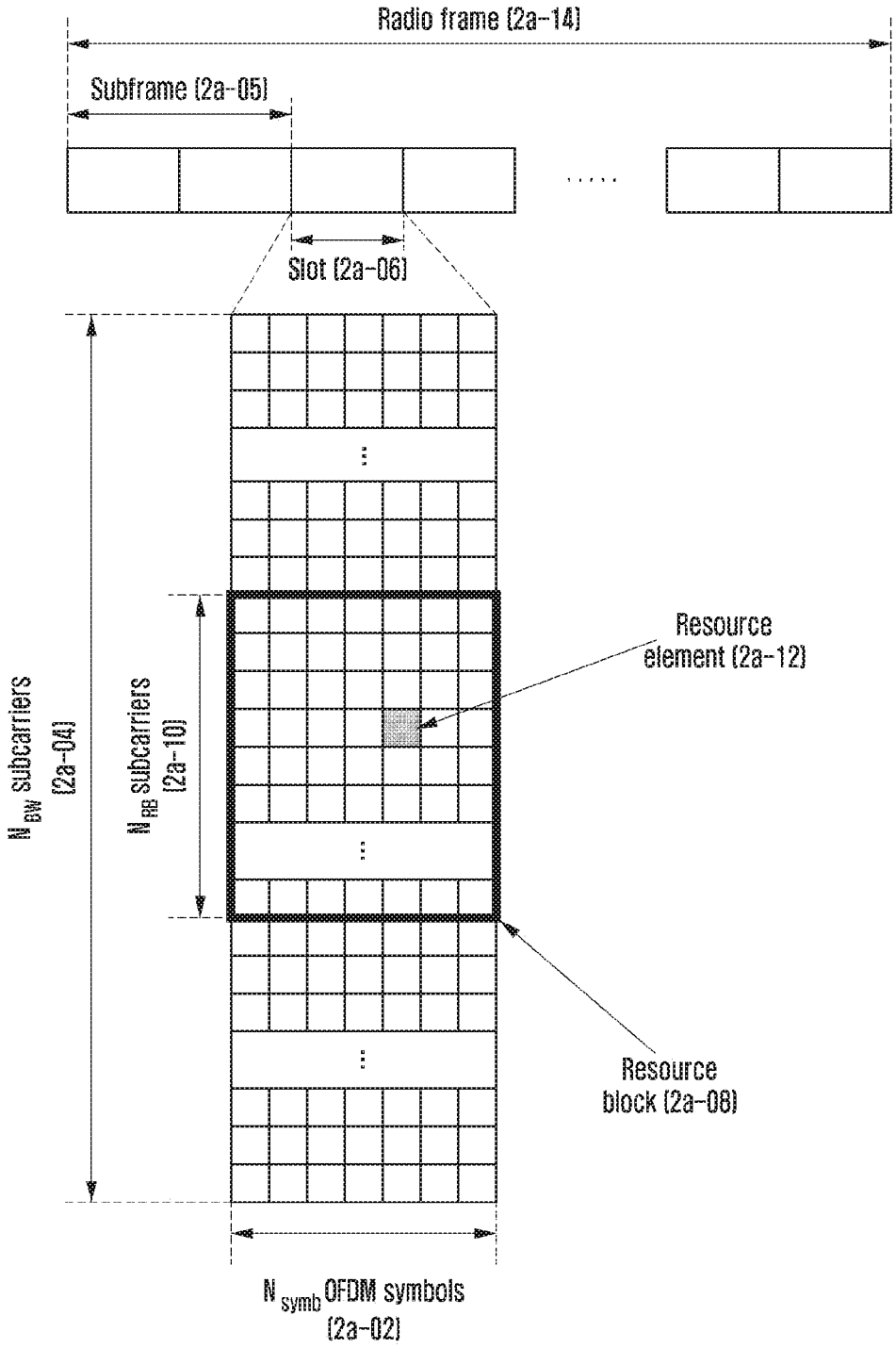
FIG. 2A is a diagram illustrating the basic structure of a time-frequency domain that is a radio resource region in which data or a control channel is transmitted on a downlink in an LTE system or a system similar to the LTE system.

FIG. 2A is a diagram illustrating the basic structure of a time-frequency domain that is a radio resource region in which data or a control channel is transmitted on a downlink in an LTE system.

Referring to FIG. 2A, a horizontal axis represents a time domain, and a vertical axis represents a frequency domain. In the time domain, the minimum transmission unit is an OFDM symbol, and $N_{symb}$ OFDM symbols 2a-02 constitute one slot 2a-06, and two slots constitute one subframe 2a-05. The length of the slot is 0.5 ms, and the length of the subframe is 1.0 ms. Further, a radio frame 2a-14 is a time domain region that is composed of 10 subframes. In the frequency domain, the minimum transmission unit is a subcarrier, and the transmission bandwidth of the whole system is composed of $N_{BW}$ subcarriers 2a-04 in total.

In the time-frequency domain, the basic unit of resources is a resource element (RE) 2a-12 that may be expressed by an OFDM symbol index and a subcarrier index. A resource block (RB) (or physical resource block (PRB)) 2a-08 is defined by $N_{symb}$ successive OFDM symbols 2a-02 in the time domain and $N_{RB}$ successive subcarriers 2a-10 in the frequency domain. Accordingly, one RB 2a-08 is composed of $N_{symb} \times N_{RB}$ REs 2a-12. In general, the minimum transmission unit of data is the RB unit. In the LTE system, it is general that $N_{symb}=7$ and $N_{RB}=12$, and $N_{BW}$ and $N_{RB}$ is in proportion to the bandwidth of the system transmission band. The data rate is increased in proportion to the number of RBs that are scheduled to the terminal. The LTE system defines and operates 6 transmission bandwidths. In case of an FDD system that operates to discriminate a downlink and an uplink from each other by means of frequency, the downlink transmission bandwidth and the uplink transmission bandwidth may differ from each other. A channel bandwidth represents an RF bandwidth corresponding to the system transmission bandwidth. Table 2-1 below presents the corresponding relationship between the system transmission bandwidth defined by the LTE system and the channel bandwidth. For example, the LTE system having 10 MHz channel bandwidth has the transmission bandwidth that is composed of 50 RBs.

TABLE 2-1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within initial N OFDM symbols in the subframe. In an embodiment, in general, N={1, 2, 3}. Accordingly, in accordance with the amount of control information to be transmitted to the current subframe, the value N is varied for each subframe. The control information includes a control channel transmission interval indicator indicating how many OFDM symbols the control information is transmitted through, scheduling information on downlink data or uplink data, and HARQ ACK/NACK signal.

In the LTE system, the scheduling information on the downlink data or the uplink data is transferred from the base station to the terminal through downlink control information (DCI). The uplink (UL) means a radio link on which the terminal transmits data or a control signal to the base station, and the downlink (DL) means a radio link on which the base station transmits data or a control signal to the terminal. The DCI defines various formats, and the DCI format, which is determined depending on whether the DCI is scheduling information on uplink data (UL grant) or scheduling information on downlink data (DL grant), whether the DCI is a compact DCI having a small size of control information, whether spatial multiplexing using multiple antennas is applied, and whether the DCI is a DCI for power control, is applied and operated. For example, DCI format 1 that is the scheduling control information on the downlink data (DL grant) is configured to include at least the following control information.

- Resource allocation type 0/1 flag: This notifies of whether a resource allocation scheme is of type 0 or type 1. The type 0 allocates resources in the unit of a resource block group (RBG) through application of a bitmap scheme. In the LTE system, the basic unit of scheduling is a resource block (RB) that is expressed as time and frequency domain resource, and the RBG is composed of a plurality of RBs, and becomes the basic unit of scheduling in the type 0 scheme. The type 1 allocates a specific RB in the RBG.
- Resource block assignment: This notifies of an RB that is allocated for data transmission. An expressed resource is determined in accordance with the system bandwidth and the resource allocation scheme.
- Modulation and coding scheme (MCS): This notifies of a modulation scheme that is used for data transmission and the size of a transport block that is data intended to be transmitted.
- HARQ process number: This notifies of a process number of HARQ.
- New data indicator: This notifies of whether data transmission is HARQ initial transmission or retransmission.
- Redundancy version: This notifies of a redundancy version of HARQ.
- Transmission power control (TCP) command for a physical uplink control channel (PUCCH): This notifies of a transmission power control command for a PUCCH that is an uplink control channel.

The DCI passes through a channel coding and modulation process, and is transmitted on a physical downlink control channel (PDCCH) that is a downlink physical control channel or enhanced PDCCH (EPDCCH).

In general, the DCI is independently channel-coded with respect to each terminal, and is configured as an independent PDCCH to be transmitted. In the time domain, the PDCCH is mapped and transmitted during the control channel transmission interval, and the frequency domain mapping location of the PDCCH is determined by an Identifier (ID) of each terminal, and is spread over the whole system transmission band.

The downlink data is transmitted on a physical downlink shared channel (PDSCH) that is a physical channel for transmitting the downlink data. The PDSCH is transmitted after the control channel transmission interval, and scheduling information, such as a detailed mapping location in the frequency domain and the modulation scheme, is notified by the DCI being transmitted through the PDCCH.

Through an MCS composed of 5 bits in the control information constituting the DCI, the base station notifies the terminal of the modulation scheme applied to the PDSCH intended to be transmitted to the terminal and a transport block size (TBS) intended to be transmitted. The TBS corresponds to the data size before channel coding for error correction is applied to a transport block that the base station intends to transmit.

The modulation scheme supported in the LTE system is quadrature phase shift keying (QPSK), 16 quadrature amplitude modulation (16QAM), or 64QAM, and respective modulation orders $Q_m$ correspond to 2, 4, and 6. That is, in case of the QPSK modulation, 2 bits per symbol may be transmitted, and in case of the 16QAM modulation, 4 bits per symbol may be transmitted. Further, in case of the 64QAM modulation, 6 bits per symbol may be transmitted.

In 3GPP LTE Rel-10, as compared with LTE Rel-8, bandwidth extension technology has been adopted to support higher data transmission rate. The above-described technology called bandwidth extension or carrier aggregation (CA) can increase the data transmission rate as much as the extended band in comparison to an LTE Rel-8 terminal that transmits data in one band. Each of the respective bands is called a component carrier (CC), and the LTE Rel-8 terminal is prescribed to have one component carrier with respect to a downlink and un uplink. Further, the downlink component carrier and the uplink component carrier connected through SIB-2 are tied to be called a cell. The SIB-2 connection relationship between the downlink component carrier and the uplink component carrier may be transmitted as a system signal or a higher layer signal. The terminal supporting the CA can receive the downlink data and can transmit the uplink data through a plurality of serving cells.

In Rel-10, if the base station is in a situation where it is difficult for the base station to transmit the PDCCH to a specific terminal in a specific serving cell, it may transmit the PDCCH in another serving cell, and may configure a carrier indicator field (CIF) as a field notifying that the corresponding PDCCH indicates a physical downlink shared channel (PDSCH) or a physical uplink shared channel (PUSCH) of another serving cell. The CIF may be configured to the terminal supporting the CA. The CIF is determined to indicate another serving cell through addition of 3 bits to PDCCH information in the specific serving cell, and the CIF is included in the information only in case where cross carrier scheduling is performed. If the CIF is not included, the cross carrier scheduling is not performed. If the CIF is included in downlink assignment information (DL assignment), the CIF is defined to indicate a serving cell to which the PDSCH that is scheduled by the DL assignment is to be transmitted, and if the CIF is included in uplink resource assignment information (UL grant), the CIF is defined to indicate a serving cell to which the PUSCH that is scheduled by the UL grant is to be transmitted.

As described above, in LTE Rel-10, the carrier aggregation (CA) that is the bandwidth extension technology is defined, and a plurality of serving cells can be configured to the terminal. Further, the terminal periodically or aperiodically transmits channel information on the plurality of serving cells to the base station for data scheduling of the base station. The base station schedules and transmits data for each carrier, and the terminal transmits an A/N feedback for the data transmitted for each carrier. In LTE Rel-10, it is designed to transmit the A/N feedback of 21 bits at maximum, and if the transmission of the A/N feedback overlaps the transmission of the channel information in one subframe, it is designed to transmit the A/N feedback and to drop the channel information. In LTE Rel-11, it is designed to transmit the A/N feedback of 22 bits at maximum and channel information of one cell according to PUCCH format 3 on the transmission resource of the PUCCH format 3 through multiplexing of the A/N feedback and the channel information of one cell.

In LTE Rel-13, maximally 32 serving cell configuration scenarios are assumed, and the concept of extending the number of serving cells up to 32 at maximum using not only licensed bands but also unlicensed bands has been completed. Further, considering that the number of licensed bands, such as LTE frequencies, is limited, providing of an LTE service in an unlicensed band, such as 5 GHz band, has been completed, and this is called a licensed assisted access (LAA). In the LAA, it is supported that an LTE cell corresponding to a licensed band operates as a P cell and an LAA cell corresponding to an unlicensed band operates as an S cell through application of the carrier aggregation technology in the LTE. Accordingly, like the LTE, feedback generated in the LAA cell that is the S cell should be transmitted only in the P cell, and in the LAA cell, downlink subframes and uplink subframes can be freely applied. Unless separately described in the description, the LTE is called to include all the LTE evolved technology, such as LTE-A and LAA.

On the other hand, new radio access technology (NR) that is a beyond LTE communication system, that is, a 5G wireless cellular communication system (hereinafter, called as "5G" in the description), is required to freely reflect various requirements of users and service providers, and thus services that satisfy various requirements can be supported.

Accordingly, in the 5G, various 5G-oriented services, such as enhanced mobile broadband (hereinafter, called as "eMBB" in the description), massive machine type communication (hereinafter, called as "mMTC" in the description), and ultra-reliable and low-latency communications (hereinafter, called as "URLLC"), can be defined as technology to satisfy the requirements selected for respective 5G-oriented services, among requirements, such as 20 Gbps of the terminal maximum transmission speed, 500 km/h of the terminal maximum speed, 0.5 ms of the maximum delay time, and 1,000,000 terminals/km$^2$ of the terminal connection density.

For example, in order to provide eMBB in 5G, it is required to provide 20 Gbps of the terminal maximum transmission speed on a downlink and to provide 10 Gbps of the terminal maximum transmission speed on an uplink from the viewpoint of one base station. At the same time, it is also required to increase the bodily sensed terminal average transmission speed. In order to satisfy the requirements as described above, there is a need for improvement of transmission/reception technology including more improved multiple-input multiple-output transmission technology.

At the same time, in order to support an application service, such as Internet of things (IoT) in 5G, mMTC is under consideration. In order to efficiently provide the Internet of things, the mMTC requires massive terminal connection support, terminal coverage improvement, improved battery time, and terminal cost reduction in a cell. Since the Internet of things is attached to various sensors and machines to provide communication functions, it is necessary to support a large number of terminals (e.g., 1,000,000 terminals/km$^2$) in the cell. Further, since there is high possibility that due to the service characteristics, the terminal is located in a shaded area, such as underground of a building or an area that the cell is unable to cover, a wider coverage than the coverage provided by the eMBB is required. There is a high possibility that the mMTC is configured as a cheap terminal, and since it is difficult to frequently exchange the battery of the terminal, a very long battery life time is required.

Last, as cellular-based wireless communication used for specific purposes, URLLC is a service used for remote control by a robot or machine device, industry automation, unmanned aerial vehicle, remote health care, and emergency situation alarm, and thus it is necessary for the URLLC to provide communication having low latency and ultra-reliability. For example, the URLLC should satisfy the maximum delay time that is shorter than 0.5 ms, and also should satisfy a packet error rate that is equal to or lower than $10^{-5}$. Accordingly, for the URLLC, it is required to provide a transmission time interval (TTI) that is shorter than that of a 5G service, such as eMBB, and there are design requirements in which wide resources should be allocated in the frequency band as well.

Services considered in the 5G wireless cellular communication system as described above should be provided as one framework. That is, for efficient resource management and control, it is preferable that respective services are not independently operated, but are integrally controlled and transmitted as one system.

Figure 2B:
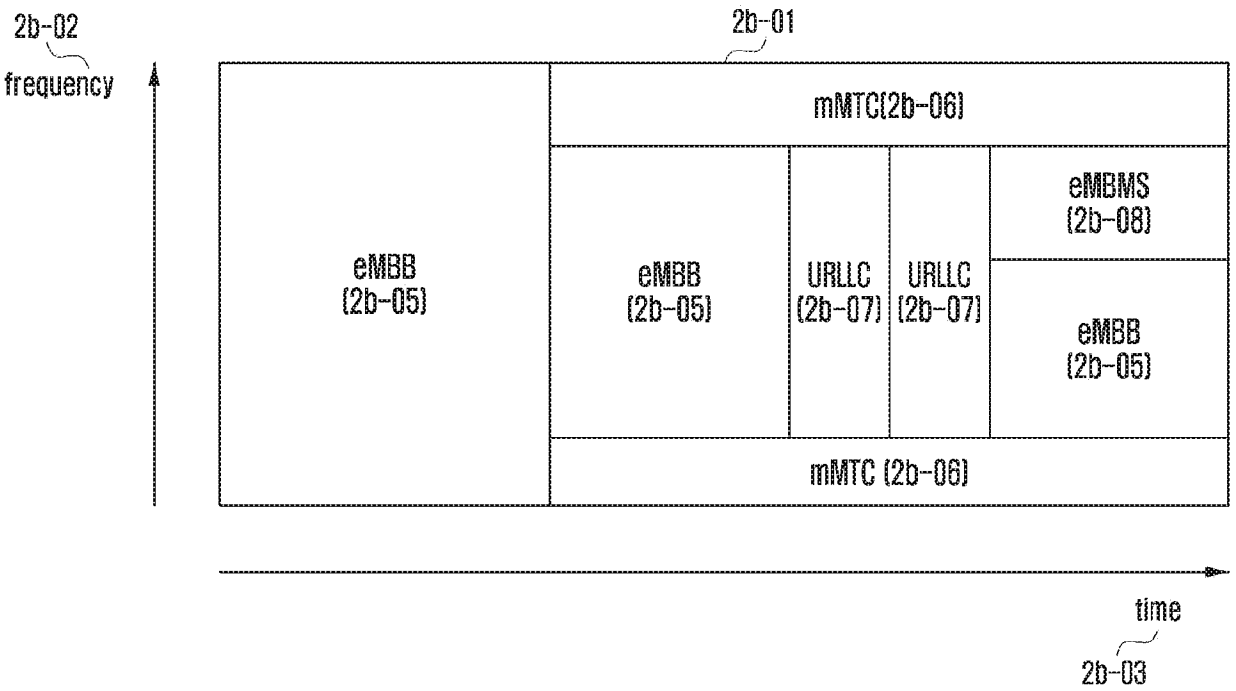
FIG. 2B is a diagram illustrating an example in which services that are considered in a 5G system are multiplexed and transmitted to one system.

FIG. 2B is a diagram illustrating an example in which services being considered in 5G are multiplexed and transmitted through one system.

In FIG. 2B, a frequency-time resource 2b-01 used by 5G may be composed of a frequency axis 2b-02 and a time axis 2b-03. In FIG. 2B, it is exemplified that in 5G, eMBB 2b-05, mMTC 2b-06, and URLLC 2b-07 are operated by a 5G base station in one framework. Further, as a service that can be additionally considered in 5G, an enhanced mobile broadcast/multicast service (eMBMS) 2b-08 for providing cellular-based broadcasting services may be considered. The services being considered in 5G, such as eMBB 2b-05, mMTC 2b-06, URLLC 2b-07, and eMBMS 2b-08, can be multiplexed and transmitted through time-division multiplexing (TDM) or frequency division multiplexing (FDM) in one system frequency bandwidth operated by 5G, and spatial division multiplexing can also be considered. In case of eMBB 2b-05, it is preferable to occupy and transmit the maximum frequency bandwidth at a certain specific time to provide the increased data transmission speed as described above. Accordingly, in case of the service of eMBB 2b-05, it is preferable that the service is TDM-multiplexed with other services in the system transmission bandwidth 2b-01 to be transmitted, and it is also preferable that the service is FDM-multiplexed with other services in the system transmission bandwidth in accordance with the necessity of other services.

In case of mMTC 2b-06, in order to secure a wide coverage in contrast with other services, an increased transmission interval is required, and the coverage can be secured through repeated transmission of the same packet in the transmission interval. At the same time, in order to reduce terminal complexity and terminal costs, the transmission bandwidth capable of being received by the terminal is limited. In consideration of such requirements, it is preferable that mMTC 2b-06 is FDM-multiplexed with other services to be transmitted in the transmission system bandwidth 2b-01 of 5G.

In order to satisfy ultra-low latency requirements requested by the service, it is preferable that URLLC 2b-07 has a short transmission time interval (TTI) as compared with other services. At the same time, in order to satisfy ultra-reliability requirements, it is necessary to have a low coding rate, and thus it is preferable to have a wide bandwidth on the frequency side. In consideration of the requirements of the URLLC 2b-07, it is preferable that the URLLC 2b-07 is TDM-multiplexed with other services in the transmission system bandwidth 2b-01 of 5G.

In order to satisfy the requirements required by the respective services, the respective services as described above may have different transmission/reception techniques and transmission/reception parameters. For example, the respective services may have different numerologies in accordance with the respective service requirements. Here, the numerology includes a cyclic prefix (CP) length, subcarrier spacing, OFDM symbol length, and transmission time interval (or transmit time interval) (TTI) in a communication system based on orthogonal frequency division multiplexing (OFDM) or orthogonal frequency division multiple access (OFDMA). As an example in which the services have different numerologies, eMBMS 2b-08 may have a long CP length as compared with other services. Since eMBMS 2b-08 transmits a broadcasting-based higher traffic, the same data can be transmitted in all cells. In this case, as seen from the terminal, if signals received from a plurality of cells arrive within the CP length, the terminal can receive and decode all the signals, and thus a single frequency network (SFN) diversity gain can be obtained. Accordingly, even the terminal located on a cell boundary can receive broadcasting information without coverage limits. However, if the CP length is relatively long as compared with that of other services having different CP lengths, waste due to a CP overhead occurs. Accordingly, a long OFDM symbol length as compared with that of other services is required, and thus a narrower subcarrier interval than that of other services is required.

Further, as an example in which different numerologies are used between services in 5G, in case of the URLLC, since a short TTI is required as compared with that of other services, a shorter OFDM symbol length may be required, and at the same time, wider subcarrier spacing may be required.

As described above, in order to satisfy various requirements in 5G, necessity of various services has been described, and requirements for services being representatively considered have been described.

The frequency in which the 5G system is considered to operate reaches several GHz to several tens of GHz, and in the several GHz band having low frequency, a frequency division duplex (FDD) is preferred rather than a time division duplex (TDD), and in the several tens of GHz band having high frequency, it is considered that the TDD is more suitable than the FDD. However, in contrast with the FDD in which a separate frequency is prepared for UL/DL transmission, and UL/DL transmission resources are seamlessly provided, in the TDD, both UL transmission and DL transmission should be supported in one frequency, and only the UL resource or DL resource is provided in accordance with the time. If it is assumed that URLLC UL transmission or DL transmission is necessary in the TDD, it becomes difficult to satisfy the ultra-low latency requirements required by the URLLC due to a delay up to the time when the UL or DL resource appears. Accordingly, in case of the TDD, there is a need for a method for dynamically changing subframes upward or downward depending on whether the URLLC data is upward or downward in order to satisfy the ultra-low latency requirements of the URLLC.

On the other hand, even in case of multiplexing services and technologies for forward 5G phase 2 or beyond 5G into 5G operating frequencies in 5G, there are requirements to provide the 5G phase 2 or beyond 5G technology and services so that there is no backward compatibility problem in operating the previous 5G technologies. The requirements are called forward compatibility, and technologies to satisfy the forward compatibility should be considered in case of designing the initial 5G system. In the initial LTE standardization stage, consideration of the forward compatibility is unprepared, and thus there may be a limit in providing a new service in the LTE framework. For example, in case of the enhanced machine type communication (eMTC) applied in LTE Rel-13, communication becomes possible only in the frequency corresponding to 1.4 MHz regardless of the system bandwidth provided by a serving cell in order to reduce the terminal costs through reduction of the terminal complexity. Accordingly, the terminal that supports the eMTC is unable to receive the physical downlink control channel (PDCCH) transmitted over the full band of the existing system bandwidth, and thus it is unable to receive a signal at the time interval when the PDCCH is transmitted. Accordingly, the 5G communication system should be designed so that services being considered after the 5G communication system efficiently coexist with the 5G communication system. In the 5G communication system, for forward compatibility, resources should be able to be freely allocated and transmitted so that services to be considered forward can be freely transmitted in the time-frequency resource region supported in the 5G communication system. Accordingly, there is a need for a method for freely allocating the time-frequency resources so that the 5G communication system can support the forward compatibility.

Hereinafter, preferred embodiments of the disclosure will be described in detail with reference to the accompanying drawings. In the accompanying drawings, it is to be noted that the same reference numerals are used for the same constituent elements. Further, a detailed description of known functions and configurations will be omitted if it obscures the subject matter of the disclosure.

Further, in describing embodiments of the disclosure in detail, LTE and 5G systems will be the main subject. However, the main subject of the disclosure may also be applied to other communication systems having similar technical backgrounds or channel types through slight modifications thereof in a range that does not greatly deviate from the scope of the disclosure by the judgment of those skilled in the art to which the disclosure pertains.

Hereinafter, a 5G communication system in which 5G cells operate in a standalone manner or a 5G communication system in which 5G cells are combined with other standalone 5G cells through dual connectivity or carrier aggregation to operate in a non-standalone manner will be described.

FIGS. 2C and 2D are diagrams illustrating embodiments of a communication system to which the disclosure is applied. Schemes proposed in the disclosure can be applied to both the system of FIG. 2C and the system of FIG. 2D.

Referring to FIG. 2C, an upper drawing of FIG. 2C shows a case where a 5G cell 2c-02 operates in a standalone manner in one base station 2c-01 in a network. A terminal 2c-04 is a 5G capable terminal having a 5G transmission/reception module. The terminal 2c-04 acquires synchronization through a synchronization signal transmitted from a 5G standalone cell 2c-01, receives system information, and then attempts a random access to the 5G base station 2c-01. The terminal 2c-04 transmits and receives data through the 5G cell 2c-02 after completing an RRC connection with the 5G base station 2c-01. In this case, the duplex type of the 5G cell 2c-02 is not limited. In the system of the upper drawing of FIG. 2C, the 5G cell may be provided with a plurality of serving cells.

Next, a lower drawing of FIG. 2C shows a case where a 5G standalone base station 2c-11 and a 5G non-standalone base station 2c-12 for increasing the data rate are installed. A terminal 2c-14 is a 5G capable terminal having a 5G transmission/reception module for performing 5G communication with a plurality of base stations. The terminal 2c-14 acquires synchronization through a synchronization signal transmitted from the 5G standalone base station 2c-11, receives system information, and then attempts a random access to the 5G standalone base station 2c-11. The terminal 2c-14 additionally configures a 5G non-standalone cell 2c-15 after completion of an RRC connection with the 5G standalone base station 2c-11, and transmits and receives data through the 5G standalone base station 2c-11 or the 5G non-standalone base station 2c-12. In this case, the duplex type of the 5G standalone base station 2c-11 or the 5G non-standalone base station 2c-12 is not limited, and it is assumed that the 5G standalone base station 2c-11 and the 5G non-standalone base station 2c-12 are connected through an ideal backhaul network or a non-ideal backhaul network. Accordingly, in case of having the ideal backhaul network 2c-13, rapid X2 communication 2c-13 between base stations becomes possible. In the system illustrated in the lower drawing of FIG. 2C, a 5G cell may be provided with a plurality of serving cells.

Next, referring to FIG. 2D, the upper drawing of FIG. 2D illustrates a case where an LTE cell 2d-02 and a 5G cell 2d-03 coexist in one base station 2d-01 in a network. A terminal 2d-04 may be an LTE capable terminal having an LTE transmission/reception module, a 5G capable terminal having a 5G transmission/reception module, or a terminal having both the LTE transmission/reception module and the 5G transmission/reception module. The terminal 2d-04 acquires synchronization through a synchronization signal transmitted from the LTE cell 2d-02 or the 5G cell 2d-03, receives system information, and then transmits and receives data through the base station 2d-01, the LTE cell 2d-02, or the 5G cell 2d-03. In this case, the duplex type of the LTE cell 2d-02 or the 5G cell 2d-03 is not limited. If the LTE cell is a P cell, uplink control transmission is performed through the LTE cell 2d-02, whereas if the 5G cell is a P cell, the uplink control transmission is performed through the 5G cell 2d-03. In the system illustrated in the upper drawing of FIG. 2D, the LTE cell and the 5G cell may be provided with a plurality of serving cells, and may support 32 serving cells in all. On the assumption that the base station 2d-01 is provided with both the LTE transmission/reception module (system) and the 5G transmission/reception module (system) in the network, the base station 2d-01 can manage and operate in real time the LTE system and the 5G system. For example, if resources are divided in terms of time, and the LTE system and the 5G system are operated at different times, it is possible to dynamically select time resource allocation of the LTE system and the 5G system. The terminal 2d-04 receives from the LTE cell 2d-02 or the 5G cell 2d-03 a signal indicating allocation of resources (time resources, frequency resources, antenna resources, or spatial resources) dividedly operated by the LTE cell and the 5G cell, and thus can be aware of what resources data reception from the LTE cell 2d-02 and the 5G cell 2d-03 is performed through.

Next, the lower drawing of FIG. 2D illustrates a case where an LTE macro base station 2d-11 for a wide coverage and a 5G small base station 2d-12 for the data rate increase are installed in a network. A terminal 2d-14 may be an LTE capable terminal having an LTE transmission/reception module, a 5G capable terminal having a 5G transmission/reception module, or a terminal having both the LTE transmission/reception module and the 5G transmission/reception module. The terminal 2d-14 acquires synchronization through a synchronization signal transmitted from the LTE base station 2d-11 or the 5G base station 2d-12, receives system information, and then transmits and receives data through the LTE base station 2d-11 and the 5G base station 2d-12. In this case, the duplex type of the LTE macro base station 2d-11 or the 5G small base station 2d-12 is not limited. If the LTE cell is a P cell, uplink control transmission is performed through the LTE cell 2d-11, and if the 5G cell is a P cell, the uplink control transmission is performed through the 5G cell 2d-12. In this case, it is assumed that the LTE base station 2d-11 and the 5G base station 2d-12 have an ideal backhaul network or a non-ideal backhaul network. Accordingly, in case of having the ideal backhaul network 2d-13, rapid X2 communication 2d-13 between base stations becomes possible, and thus it is possible for the 5G base station 2d-12 to receive in real time related control information from the LTE base station 2d-11 through the X2 communication 2d-13 even if the uplink transmission is performed only with respect to the LTE base station 2d-11. In the system illustrated in the lower drawing of FIG. 2D, the LTE cell and the 5G cell can be provided with a plurality of serving cells, and can support 32 serving cells in all. The base station 2d-11 or 2d-12 can manage and operate in real time the LTE system and the 5G system. For example, if resources are divided in terms of time and the LTE system and the 5G system are operated at different times, the base station 2d-11 can dynamically select allocation of time resources of the LTE system and the 5G system, and can transmit the signal to another base station 42d-12 through the X2. The terminal 2d-14 receives from the LTE base station 2d-11 or the 5G base station 2d-12 a signal indicating allocation of resources (time resources, frequency resources, antenna resources, or spatial resources) dividedly operated through the LTE cell and the 5G cell, and thus can be aware of what resources data transmission and reception on the LTE cell 2d-11 and the 5G cell 2d-12 is performed through.

On the other hand, if the LTE base station 2d-11 and the 5G base station 2d-12 have the non-ideal backhaul network 2d-13, the rapid X2 communication 2d-13 between early base stations becomes impossible. Accordingly, it is possible for the base station 2d-11 or 2d-12 to semi-statically operate the LTE system and the 5G system. For example, if the base station 2d-11 divides resources in terms of time and operates the LTE system and the 5G system at different times, it is possible to discriminate the resources of the LTE system and the 5G system by selecting the allocation of time resources of the LTE system and the 5G system and pre-transmitting the signal to another base station 2d-12 through the X2. The terminal 2d-14 receives a signal indicating allocation of the resources (time resources, frequency resources, antenna resources, or spatial resources) for dividedly operating the LTE cell and the 5G cell from the LTE base station 2d-11 or the 5G base station 2d-12, and thus can be aware of what resources data transmission and reception on the LTE cell 2d-11 and the 5G cell 2d-12 is performed through.

In order to explain the method and the device proposed in the embodiment, the terms "physical channel" and "signal" may be used in the LTE or LTE-A system in the related art. However, the contents of the disclosure can also be applied to any wireless communication system that is not the LTE or LTE-A system.

Further, technology proposed in the disclosure can be applied to not only FDD or TDD system but also a new type duplex mode (e.g., LTE frame structure type 3).

Hereinafter, higher layer signaling (hereinafter, higher signaling) or a higher layer signal (hereinafter, higher signal) is related to a method for transferring a signal that is transferred from the base station to the terminal using the downlink data channel of the physical layer or transferred from the terminal to the base station using the uplink data channel of the physical layer, and thus it means signal transferring between the base station and the terminal through at least one method of RRC signaling, PDCP signaling, and MAC control element (MAC CE).

Figure 2E:
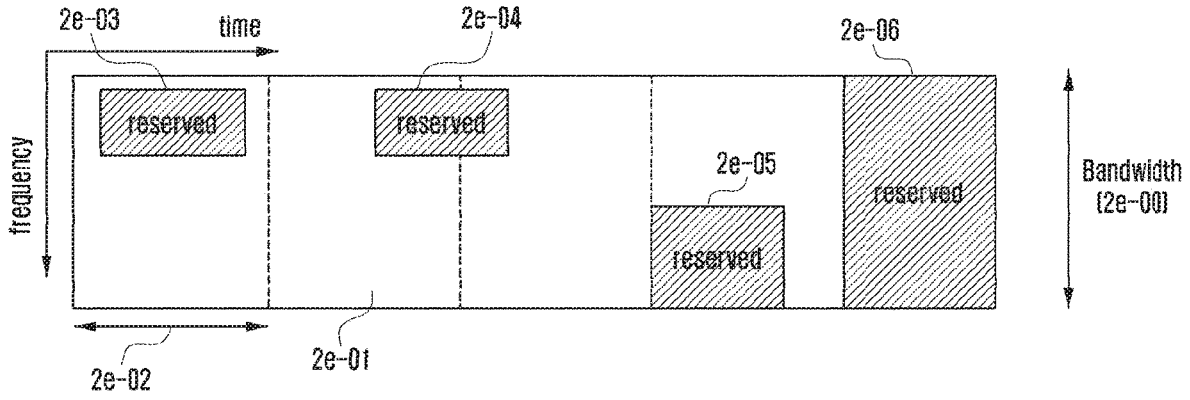
FIG. 2E is a diagram illustrating a situation intended to be solved through an embodiment of the disclosure.

FIG. 2E is a diagram illustrating a situation intended to be solved by the disclosure. A network or a base station (hereinafter, base station) may be used to divide a downlink or uplink frequency band 2e-00 configured to perform communication with a terminal into one or more radio resource regions and to provide different communication systems, different communication services, or control and data signal transmission/reception using one or more different numerologies to the divided radio resource regions. Hereinafter, in an embodiment of the disclosure, for convenience in explanation, explanation will be made generally on the assumption of downlink or uplink communication for performing communication between the base station and the terminal, but it is apparent that the contents of the disclosure is applicable even in case of performing communication between the base station and the terminal and between the terminals using a side link.

More specifically, the base station may divide the downlink or uplink frequency band configured to perform communication with the terminal into one or more time-frequency radio resource regions, and the base station and the terminal may perform communication using different systems in the divided radio resource regions. For example, it is possible for the base station to communicate with an LTE terminal or a terminal supporting both LTE and 5G using an LTE system in one region 2e-03, 2e-04, 2e-05, or 2e-06 among the divided radio resource regions and to communicate with a 5G terminal using a 5G system in another region 2e-01 among the divided radio resource regions. As another example, the base station may divide the downlink or uplink frequency band configured to perform communication with the terminal into one or more time-frequency radio resource regions, and the base station and the terminal may perform communication or provide different services with each other in the divided radio resource regions. For example, it is possible for the base station to provide an eMBB service in one region 2e-03, 2e-04, 2e-05, or 2e-06 among the divided radio resource regions and to provide mMTC or URLLC service or multimedia broadcast multicast service (MBMS, or broadcast service) in another region 2e-01 among the divided radio resource regions. As still another example, the base station may divide the downlink or uplink frequency band configured to perform communication with the terminal into one or more time-frequency radio resource regions, and the base station and the terminal may perform communication using numerologies (e.g., different carrier spacing) in the divided radio resource regions. For example, it is possible for the base station to perform communication using Yk Hz (e.g., 60 KHz) subcarrier spacing in one region 2e-03, 2e-04, 2e-05, or 2e-06 among the divided radio resource regions and to perform communication using Xk Hz (e.g., 15 KHz) subcarrier spacing in another region 2e-01 among the divided radio resource regions.

Accordingly, the base station may not transmit at least one of downlink control signal, downlink control channel, downlink data channel, uplink control signal, uplink control channel, and uplink data channel to a specific terminal in at least one of the divided radio resource regions (e.g., PRB unit, subband unit composed of a plurality of PRB groups, and one or more symbols of the PRB and subband) among the divided radio resource regions. More specifically, for example, in case where the base station divides the downlink or uplink frequency band configured to perform communication with the terminal into one or more time-frequency radio resource regions, performs communication with an LTE terminal or a terminal supporting both LTE and 5G using one region 2e-03, 2e-04, 2e-05, or 2e-06 among the divided radio resource regions, and performs communication with the 5G terminal using the 5G system in another region 2e-01 among the divided ration resource regions, the 5G terminal is unable to properly receive at least one signal or channel among downlink signals and downlink channels transmitted through the LTE system in the resource regions 2e-03, 2e-04, 2e-05, and 2e-06 in which the base station communicates with the LTE terminal using the LTE system. Accordingly, it should be known that the 5G terminal receives, from the base station, information on at least the resource region 2e-03, 2e-04, 2e-05, or 2e-06 (or time-frequency resource region information) among the resource regions divided by the base station, and does not perform communication with the base station using at least one signal or channel among the downlink signals and downlink channels. In this case, in order to support compatibility with a new system (e.g., 5G system) that may be introduced in future, another system that is different from the system in use, or a new service (e.g., URLLC), the base station can divide the radio resource regions to empty or secure a part or the whole of the time-frequency resource region used for a specific system or a specific service for the new system or new service. In this embodiment, a time-frequency resource that is emptied or reserved, without being used for separate signal transmission, signal transmission for a specific system, specific service providing, or signal transmission for signal transmission using a specific numerology, in the downlink or uplink frequency band configured for the base station to perform communication with the terminal, can be expressed as a blank resource or a reserved resource, and the blank resource is a blank resource or a reserved resource from the viewpoint of the terminal. In this case, the blank resource or the reserved resource may be composed of a partial time domain, a partial frequency domain, or a partial time and frequency domain in the whole time and frequency domain used by the system. Further, from the viewpoint of one terminal, the blank resource or the reserved resource may be composed of a partial time domain, a partial frequency domain, or a partial time and frequency domain in the whole time and frequency domain of the downlink or uplink frequency band configured for the base station to perform communication with the terminal. Further, the unit of the blank resource or the reserved resource may be a PRB, one or more symbols in the PRB, a subband, or one or more symbols in the subband.

Hereinafter, in all embodiments of the disclosure, from the viewpoint of one terminal, in time-frequency resource regions of the downlink or uplink frequency band configured for the base station to perform communication with the terminal, the time-frequency resource region in which the base station and the terminal can transmit and receive at least one of a control signal, a control channel, and a data channel with each other is specified as a first resource region, and from the viewpoint of the terminal, the time-frequency resource region in which the base station and the terminal cannot transmit and receive the control signal, the control channel, and the data channel with each other is specified as a second resource region. In embodiments of the disclosure, the second resource region will call the time-frequency resource region in which the base station and the terminal cannot transmit and receive all the control signal, the control channel, and the data channel with each other, but it does not exclude a case where the base station and the terminal can transmit and receive at least one of the control signal, the control channel, and the data channel with each other in the second resource region.

In this case, by adding the first resource region and the second resource region to each other, the whole time and frequency resource for performing communication between the base station and the terminal can be obtained. In this case, frequency resource region information of the first resource region is specified as a first frequency resource region, and frequency resource region information of the second resource region is specified as a second frequency resource region. Similarly, time resource region information of the first resource region is specified as a first time resource region, and time resource region information of the second resource region is specified as a second time resource region. Although the first resource region and the second resource region call the resource region including all the time-frequency resource regions, it is also possible to mixedly use the specifications of the resource regions within a range that does not deviate from the subject matter intended to be proposed in the disclosure.

Next, signaling for notifying of the second resource region proposed in the disclosure will be described.

The signaling for notifying of the second resource region may include at least a frequency or time domain. In particular, downlink frequency domain and time domain and uplink frequency domain and time domain can be separately defined. Further, the time domain of the second resource region may be composed of one slot that is a time unit used for transmission/reception of data or more than one slot. If the slot includes 60 KHz or less, it may be composed of 7 or 14 OFDM symbols, or may be configured as a higher signal among 7 or 14 symbols. If the slot exceeds 60 KHz, it may be composed of 14 OFDM symbols. Further, the time domain of the second resource region may be composed of one mini-slot that is a time unit used for transmission/reception of data or more than one mini-slot. The mini-slot may be composed of OFDM symbols the number of which is smaller than 7. Further, the time domain of the second resource region may be composed of OFDM symbols the number of which is smaller than that of the slot or the mini-slot. Further, the uplink or downlink frequency domain of the second resource region may be composed in the unit of a physical resource block (PRB) that is composed of 12 subcarriers. Further, the frequency domain of the second resource region may be composed in the unit of subcarriers the number of which is smaller than the number of PRBs. The signaling for notifying of the second resource region may mean that the second resource region is actually used by the base station, and the signaling for notifying of the second resource region and signaling for notifying of whether the second resource region is actually used by the base station may separately exist. The signaling for notifying of the second resource region and the signaling for notifying of whether the second resource region is actually used by the base station may be signals for a specific terminal, signals for a specific service (e.g., eMBB, URLLC, or mMTC), cell common signals, or signals for 5G releases.

The signaling for notifying of the second resource region and the signaling for notifying of whether the second resource region is actually used by the base station may be transmitted from the base station to the terminal as higher signals or physical signals, and the terminal may acquire the signals, determine whether the second resource region is actually used by the base station, and perform a predefined proper procedure if the second resource region collides with the 5G service region or the 5G signal.

Referring to FIG. 2E, this will be described in more detail. The base station and the terminal can perform downlink and uplink wireless communication through a specific frequency band 2e-01. In this case, the frequency band in which the base station and the terminal perform communication with each other may be configured to the terminal through a higher signal transferred in at least one of a cell access process of the terminal and a cell configuration information reconfiguration process. If the frequency band in which the base station and the terminal perform wireless communication with each other and the time resource are divided into the first resource region and the second resource region, the base station can transfer information on the first resource region to the terminal, and can perform communication with the terminal through the first resource region. In this case, the base station may use the second resource region configured by the base station to provide another terminal, another system, or another service. In other words, from the viewpoint of a specific terminal, the second resource region configured by the base station does not mean that the base station does not actually use the second resource region. In this case, it is also possible that the base station configures the second resource region as a blank or reserved resource from the viewpoint of the base station, terminal, system, or service. Further, as for the first resource region and the second resource region, the first resource region and the second resource region of a downlink transmission region, downlink band, downlink channel, or downlink carrier may be different from the first resource region and the second resource region of an uplink transmission region, uplink transmission band, uplink transmission channel, or uplink transmission carrier.

In other words, the second resource region may be used for the base station to provide communications using a specific system that is different from the terminal, another service that is not serviced to the terminal, or numerology that is not supported by the terminal and that is not configured from the base station. Accordingly, the terminal that is unable to perform communication through the second resource region (e.g., 5G terminal in case where the base station performs LTE communication through the second resource region) can receive information on the second resource region (time and frequency resource region information) transferred from the base station. In this case, the unit for the second resource region may be composed of at least one subcarrier on frequency axis and at least one symbol on time axis. For example, 12 subcarriers and 7 symbols (hereinafter, slot) may be configured as a basic configuration unit of the second resource region. In this case, it is also possible to express 12 subcarriers and 7 symbols (hereinafter, slot) as a physical resource block (PRB). As another example, it is also possible to define a subband composed of one or more PRBs as a basic configuration unit or basic configuration unit for the second resource region. In this case, the basic configuration or the configuration unit for the second resource region can be predefined, can be predefined in accordance with the corresponding frequency band, or can be configured or transferred from the base station to the terminal through a higher signal. For example, the base station can configure or transfer at least one piece of information among the number of subcarriers included in the basic unit of the second resource region, the number of symbols, and a distance between subcarriers to the terminal through the higher signal. In this case, it is also possible for the base station to configure or transfer the basic units of the second resource region, such as predefined mini-slot, slot, subframe, and subband, to the terminal.

Further, although the basic configuration unit of the second resource region may be differently configured in accordance with a distance between subcarriers or a symbol length, the technology proposed in the disclosure can be applied regardless of the configuration unit of the second resource region.

In general, the base station can configure or transfer a part or the whole of configuration information on downlink and uplink transmission to the terminal through a downlink control channel. For example, the base station can transfer, to a specific terminal through the downlink control channel, configuration information on downlink signal reception (hereinafter, downlink scheduling information) including time and frequency resource information through which the terminal should receive a downlink control signal (or control information) or a downlink data signal. The terminal that has received the downlink scheduling information from the base station through the control channel can receive the downlink data signal in the time and frequency resource regions configured or transferred by the base station through the downlink control channel, and can transmit the result of reception (e.g., ACK/NACK information) to the base station through the uplink control channel. Similarly, the base station can transfer, to a specific terminal through the downlink control channel, configuration information on uplink transmission (hereinafter, uplink scheduling information) including time and frequency resource information through which the terminal can transmit an uplink control signal, an uplink control channel, or an uplink data channel. The terminal that has received the uplink scheduling information through the control channel transmits an uplink signal in the time and frequency resource regions configured by the base station. In this case, the base station can transmit the result of reception of the uplink signal (e.g., ACK/NACK information) to the terminal through the downlink control channel.

The base station can transmit the downlink scheduling information or uplink scheduling information to the terminal through the downlink control channel. In this case, the downlink scheduling information or the uplink scheduling information may have different transmission formats, or may be transmitted in the same transmission format. In this case, however, a discriminator or a flag bit for discriminating the downlink scheduling information and the uplink scheduling information from each other is included in the scheduling information, and thus the terminal that has received the scheduling information can discriminate whether the scheduling is the downlink scheduling information or the uplink scheduling information. In this case, bit numbers of respective scheduling transmission formats may be predefined, or may be transferred from the base station to the terminal through the higher signal. In other words, in general, the scheduling transmission format transmitted by the base station should be transmitted with the bit number defined or configured between the base station and the terminal. The bit number (or information length or bit string length) of the frequency resource region information (hereinafter, frequency resource allocation information) in the downlink scheduling information or uplink scheduling information may be differently configured in accordance with the size of the downlink or uplink transmission frequency domain configured for communication between the base station and the terminal. For example, if the base station and the terminal perform downlink and uplink communication with each other through 20 MHz frequency domain in a state where the frequency domain is composed of 100 PRBs at maximum, and the minimum unit of the frequency resource allocation is configured or defined in the unit of PRB in performing the downlink and uplink communication, the number of bits required for the base station to notify the terminal of the frequency resource allocation information is 100 at maximum in case of transferring the frequency resource allocation information in the form of a bitmap. In this case, transfer of the frequency resource allocation information in the form of a bitmap corresponding to each PRB is merely exemplary, and the disclosure can be applied even in case of transferring the frequency resource allocation information in the unit of a subband including a plurality of PRBs or in case of notifying of the frequency resource allocation information through a successive PRB frequency resource allocation scheme.

Accordingly, if the base station configures a specific time-frequency domain with the second transmission resource (e.g., configures 20 PRB regions as the second frequency resource region at specific time n), and configures the first frequency resource region with 80 remaining PRBs excluding the second frequency resource region in the frequency resource region, the base station and the terminal should perform communication with the base station through only the resource region excluding the second transmission resource region, that is, only the first transmission resource region, in the downlink and uplink transmission bands that are configured by the base station or determined by the terminal. Accordingly, in case of the base station for which the second resource region is configured in at least one resource region of the downlink transmission resource region and the uplink transmission resource region and the terminal that has received configuration information of the second resource region from the base station, it is possible to determine the number of bits that is necessary to transmit the frequency resource allocation information included in the downlink or uplink control information transferred to the terminal or the frequency resource allocation information field value in consideration of only the remaining frequency resource region excluding the second frequency resource region from the whole frequency resource (e.g., first frequency resource region) without considering the configured second resource region. In other words, the terminal receives the second resource region information from the base station for which the second resource region is configured in at least one resource region of the downlink transmission resource region or the uplink transmission resource region, and it is possible for the terminal to configure or define the number of bits of the frequency resource allocation information, the size of allocation information, or the size of a bit string (hereinafter, the number of bits), which is necessary to transmit or share scheduling information or frequency resource allocation information for the downlink or uplink transmission region in which the second resource region is configured between the base station and the terminal, based on both the first frequency domain and the second frequency domain, based on the first frequency domain only, or based on the remaining frequency domain excluding the second frequency domain. In this case, the number of bits that is necessary for the downlink and uplink frequency resource allocation information in accordance with the second transmission resource region configuration may differ between the downlink and the uplink.

In other words, in the base station and the terminal for which the second resource domain is configured, the number of bits used to transmit information on at least the frequency resource region information transmission region of the downlink scheduling information or the uplink scheduling information transferred from the base station to the terminal may be determined through at least one of the following methods.

Method 1: This method determines the number of bits that is necessary to transmit logical or virtual frequency domain allocation information based on the remaining domain excluding the second frequency domain configured in the whole downlink or uplink frequency transmittable region configured between the base station and the terminal (or based on the first frequency domain).

Method 2: This method determines the number of bits that is necessary to transmit frequency domain allocation information based on the whole frequency domain capable of transmitting the downlink or uplink frequency (or based on both the first frequency domain and the second frequency domain) without considering whether the second frequency domain is configured in the whole downlink or uplink frequency transmittable region configured between the base station and the terminal.

Based on FIG. 2F, the method 1 will be described in more detail. The base station and the terminal perform downlink and uplink communication through a frequency domain 2f-00. For convenience, explanation will be made on the assumption of downlink communication. It is assumed that the basic unit of the downlink data signal transmission is frequency and time unit 2f-20. For example, the basic unit of the data signal transmission may be one PRB composed of 12 subcarriers and 7 OFDM symbols. In this case, for convenience, explanation will be made on the assumption that the above-described unit 2f-20 is the basic unit of the data signal reception and transmission and second resource region information transmitted from the base station to the terminal. In other words, the base station notifies the terminal of information on the configured second resource region in the unit of a PRB.

Figure 2F:
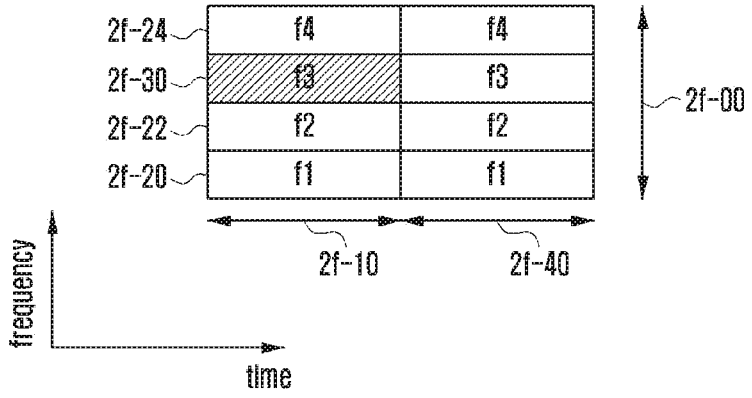
FIGS. 2F and 2G are diagrams illustrating a method according to an embodiment of the disclosure.

As for a specific time 2f-10 and a specific frequency domain 2f-30 illustrated in FIG. 2F, the base station may configure the time-frequency resource region as the second resource region 2f-30, and may transfer the information on the configured second resource region to the terminal through a higher signal or a downlink control channel at or before the time 2f-10 when the second resource region is configured. In this case, the terminal that has received the second resource region configuration information can recognize that the frequency domain 2f-30 of the time 2f-10 is the second resource region, and can determine the number of bits of the frequency allocation information transmitted from the base station to the terminal at the time when the second resource region is configured. In case of the method 1 as described above, the base station and the terminal can determine the number of bits of the frequency resource allocation information in the uplink or downlink scheduling information based on the remaining domain 2f-20, 2f-22, and 2f-24 excluding the second frequency domain in the whole frequency domain 2f-00 configured at the time 2f-10 or the first resource region. For example, if the frequency resource allocation information in the form of a bitmap in the unit of a PRB is transferred from the base station to the terminal, 4 bits at maximum are necessary in an example of FIG. 2F. However, at time 2f-10, the terminal can determine that the resource region in which communication with the base station is performed, that is, the first resource region, is composed of three frequency resource regions f1(2f-20), f2(2f-22), and f4(2f-24), and thus it is possible to define the number of bits required to transmit the frequency resource allocation information based on only the resource region excluding the second resource region or only the first resource region. In the above-described example, because the base station can transfer the frequency resource allocation information at the time 2f-10 to the terminal using only 3 bits, unnecessary information transfer is minimized, and thus frequency efficiency can be improved. In this case, the frequency resource allocation information configured based on the first resource region may be logical or virtual frequency resource allocation information that is different from the actual frequency resource allocation information. For example, it is also possible to indicate virtual frequency resource information based on only the region excluding the second resource region or the first resource region. In this case, as the frequency resource allocation information transmitted with 3 bits, it is also possible to directly indicate the frequency resource allocation information for f1(2f-20), f2(2f-22), and f4(2f-24) that is the actual frequency resource information for the first resource region.

In case of time 2f-40 of FIG. 2F, the base station does not configure the second resource region, and thus the configured frequency resource region and the first resource region are equal to each other. Accordingly, in this case, 4-bit frequency resource allocation information can be transmitted. As described above, in case where all the frequency resources are the first frequency resources, or in case of the time when the second frequency resource is not configured, the actual frequency resource allocation information and the virtual frequency resource allocation information may be equal to each other.

In case of configuring downlink reception and uplink transmission operations in one or more time domains through one piece of downlink scheduling information or one piece of uplink scheduling information, for example, in case of configuring the downlink or uplink transmission at time 2f-10 and at time 2f-40 of FIG. 2F through one control channel, it is also possible to determine the number of bits that is necessary to transmit the frequency resource allocation information based on the first resource region at the time (e.g., time 2f-10) when the first resource region is the smallest or at the time (e.g., time 2f-40) when the first resource region is the largest among the times when the downlink reception or uplink transmission is configured.

Based on FIG. 2F, the method 2 will be described in more detail.

As for a specific time 2f-10 and a specific frequency domain 2f-30 illustrated in FIG. 2F, the base station may configure the time-frequency resource region as the second resource region 2f-30, and may transfer the information on the configured second resource region to the terminal through a higher signal or a downlink control channel (e.g., terminal common control channel or terminal inherent control channel) at or before the time 2f-10 when the second resource region is configured. In this case, the terminal that has received the second resource region configuration information can recognize that the frequency domain 2f-30 of the time 2f-10 is the second resource region, and can determine the number of bits of the frequency allocation information transmitted from the base station to the terminal at the time when the second resource region is configured. In case of the method 1 as described above, the base station and the terminal can determine the number of bits of the frequency resource allocation information in the uplink or downlink scheduling information based on the remaining domain 2f-20, 2f-22, and 2f-24 excluding the second frequency domain in the whole frequency domain 2f-00 configured at the time 2f-10 or the first resource region. However, if the second resource region is differently configured in accordance with the time, for example, if the frequency domain of the second resource region is changed together with existence/nonexistence of the second resource region in accordance with the time, if the number of bits of the frequency resource allocation information is determined based on only the first resource region as described above, the reception performance of the terminal may deteriorate or reception complexity may be increased due to frequent changes of the number of bits of the scheduling transmission format. Accordingly, as in the method 2, the base station and the terminal can determine the number of bits that is necessary to transmit the frequency resource allocation information based on the whole downlink and uplink frequency domains configured between the base station and the terminal regardless of whether to configure the second frequency domain for the frequency domain in which the communication is configured. In other words, it is possible to determine the number of bits that is necessary to transmit the frequency resource allocation information based on both the first frequency domain and the second frequency domain. For example, in case of using the method 2 of FIG. 2F, the base station can configure the frequency resource region 2f-00 used to perform downlink or uplink communication to the terminal. In this case, it is assumed that the base station and the terminal transfer scheduling information on the whole frequency resource region 2f-00, that is, scheduling information on the frequency resource region 2f-20, 2f-22, 2f-30, and 2f-24 through the bitmap. That is, through the 4-bit bitmap, the base station and the terminal can share the scheduling information on the region 2f-20, 2f-22, 2f-30, and 2f-24. In this case, in case of the method 2, by transferring the frequency resource allocation information both at the time 2f-10 when the second resource region is configured and at the time 2f-40 when the second resource region is not configured, the base station can transmit the frequency resource allocation information to the terminal with the same number of bits of the frequency resource allocation information or the same field size (e.g., 4 bits) regardless of whether to configure the second resource region.

In this case, it is possible that the base station selects one of the method 1 and the method 2 and transfers the selected method to the terminal through a channel for transferring a higher signal or system information or a downlink control channel, or one of the method 1 and the method 2 can be determined in accordance with a predefined method.

Figure 2G:
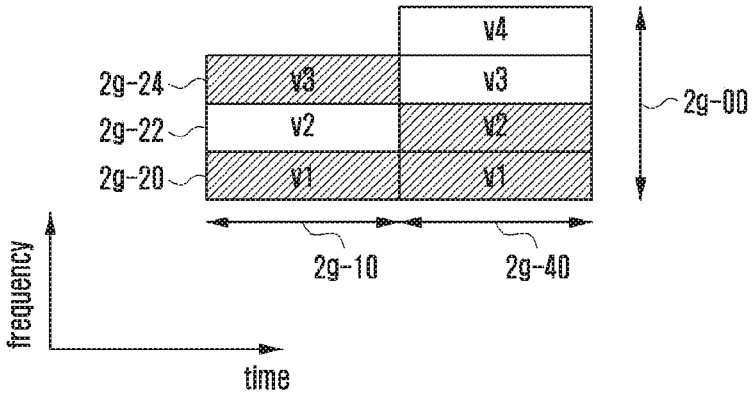

In case of determining the number of bits of the frequency resource allocation information through the method 1, a method for mapping the transmitted or received frequency allocation resource information to the resource actually transmitted to the downlink or uplink will now be described. According to the method 1 as described above, in case where the base station transfers the frequency resource region allocation information in the uplink or downlink scheduling information to the terminal, the base station configures (2g-20, 2g-22, and 2g-24) information for transferring a virtual frequency resource allocation information region as illustrated in FIG. 2G based on the region excluding the second frequency resource region in the whole frequency resource region or the first frequency resource region, and transfers allocation information on resources 2g-20 and 2g-24 used for downlink or uplink transmission to the terminal in the first frequency resource region. In case where the base station and the terminal are configured or defined to transmit and receive the frequency resource allocation information with each other through the virtual frequency resource information as shown in FIG. 2G, the terminal that has received the virtual frequency resource allocation information can determine the actual downlink or uplink frequency resource allocation location using the received virtual frequency resource allocation information and the pre-received second resource region information, and can receive the downlink signal or transmit the uplink signal through the determined actual frequency resource.

Referring to FIG. 2G, a method for mapping the frequency resource using the method 1 will be described in more detail. The terminal, which is configured to receive a downlink data channel in the virtual frequency resources v1(2g-20) and v3(2g-24) from the base station through the downlink scheduling information, can determine the transmission frequency region of the downlink signal actually transmitted from the base station to the terminal by successively mapping bits (i.e., starting from the first bit) of the virtual frequency resource allocation information bit string to resource regions (i.e., from the region in which the index of the actual frequency resource region is lowest to the region in which the index is the highest) in order. In this case, the mapping is performed in a state where the frequency resource region configured as the second resource region is excluded from the actual frequency resource region. Thereafter, the downlink signal can be received and the uplink signal can be transmitted in the actual frequency resource region mapped from the resource allocation information 2g-20 and 2g-24 scheduled to the terminal among the virtual frequency resource allocation information bit string. In other words, in case where the base station transfers the downlink scheduling information to the terminal through the virtual frequency resource allocation information with respect to the first frequency domain excluding the second frequency domain through the method 1 of FIG. 2G, according to the method for matching the frequency resource on which the actual signal is transmitted to the frequency domain allocation information scheduled by the base station, the base station can enable the terminal that has received the second resource region information (time 2f-10 and frequency 2f-30 of FIG. 2F) to receive the downlink data channel through the downlink control channel. In this case, the terminal that has received the virtual frequency resource allocation information bit string configured through the method 1 from the downlink scheduling information can determine that the downlink data channel reception time and the virtual frequency domain are resource regions v1(2g-20) and v3(2g-24) through the received bit string. In this case, the terminal can determine the actual transmission frequency domain in which the downlink data channel transmitted by the base station is transmitted using the received virtual frequency resource region information and the predetermined second resource region information. In other words, successive mapping is performed from the first bit of the received virtual frequency resource region information in ascending order of indexes of the actual transmission frequency domain, and the second resource region is not mapped, but the scheduled virtual frequency resource information is mapped to the next frequency domain index. That is, mapping is performed in the manner of v1(2g-20)=f1(2f-20), v2(2g-22)=f2(2f-22), and v3(2g-24)=f4(2f-24), and among them, a downlink data reception operation is performed in the actual frequency domain f1(2f-22) and f4(2f-24) for the virtual frequency resource v1(2g-20) and v3(2g-24) configured to be received from the base station. In this case, the successive mapping of the virtual frequency resource region information to the actual frequency resource region in ascending order of indexes of the actual frequency resource region is merely exemplary, and it is also possible to perform the successive mapping in descending order of indexes of the actual frequency resource region or to perform the mapping in accordance with a predefined method.

A method for mapping resources of the actually transmitted downlink or uplink data channel with respect to a case in which the number of bits of the frequency resource allocation information is determined through the method 2 will now be described. As described above, since the method 2 defines the number of bits or a field value that is necessary to transmit the frequency resource allocation information included in the scheduling information that the base station transmits to the terminal based on the whole frequency resource region configured to be used for the downlink or uplink communication between the base station and the terminal or both the first frequency resource region and the second frequency resource region, and transmits the frequency resource allocation information to the terminal in accordance with the defined bits, mapping of the virtual scheduling information to the actual resource may not be considered. However, in the method 2, since the frequency resource allocation information that the terminal receives from the base station includes even the resource region that is not used by the terminal for actual downlink reception or uplink transmission, in other words, even the second resource region information that the base station has configured to the terminal, the frequency resource region in which the downlink reception or uplink transmission included in the scheduling information may be different from the frequency resource region in which the terminal actually performs the downlink reception or uplink transmission.

In general, the base station and the terminal determine a transport block size used for the downlink or uplink transmission based on the configured downlink or uplink transmission frequency and time resource regions. For example, if the base station that performs the downlink transmission through 100 PRBs transmits downlink data using the 100 PRBs in all, it may select and transmit the transport block size based on the 100 PRBs. However, in the above-described example, if the base station configures parts of the 100 PRBs as the second transmission region, for example, if the base station configures 20 PRBs in the 100 PRBs as the second transmission region, and if the base station transfers the scheduling information to the terminal through the method 2, the frequency resource allocation information included in the scheduling information is the resource allocation information for 100 PRBs. Accordingly, in the above-described case, since the terminal has received the resource allocation information on the 100 PRBs from the base station, it can perform downlink data signal reception or uplink data signal transmission based on the 100 PRBs. However, in this case, since the resource that the base station can actually use for communication with the terminal, that is, the first resource region, is composed of 80 PRBs excluding the second resource region, the base station selects and transmits a TBS corresponding to the 80 PRBs or receives an uplink signal on the assumption that the terminal is to select the TBS corresponding to the 80 PRBs, but the terminal may receive the TBS corresponding to 100 PRBs received from the base station through the scheduling information or may transmit the TBS corresponding to the 100 PRBs. Accordingly, in the above-described case, the downlink and uplink data transmission/reception becomes impossible or too high code rate or wrong code rate is configured, and thus the base station and the terminal may not properly transmit or receive the downlink and the downlink signal.

According to the method 2, in case where the base station defines the number of bits that is necessary to transmit the frequency resource allocation information included in the scheduling information based on the whole frequency resource region or both the first frequency resource region and the second frequency resource region, and transmits the frequency resource allocation information to the terminal in accordance with the defined bits, the time-frequency domain in which the downlink and uplink signals are actually transmitted and the signal size transmitted to the downlink and the uplink (hereinafter, TBS) can be selected based on the resource region that can be actually used by the base station or the terminal at the time (method 2-1), for example, can be determined as the first transmission resource region, or based on the frequency resource allocation information that the base station includes in the scheduling information to be transmitted (method 2-2), as the actual downlink and uplink transmission resource region and the TBS.

According to the method 2-1, in case where the base station defines the number of bits that is necessary to transmit the frequency resource allocation information included in the scheduling information based on the whole frequency resource region or both the first frequency resource region and the second frequency resource region, and transmits the frequency resource allocation information to the terminal in accordance with the defined bits, if the time-frequency resource on which the base station has scheduled the downlink or uplink transmission belongs to the preconfigured or determined second resource region, the terminal can determine the actual downlink or uplink transmission/reception resource region by taking precedence of information on the second resource region rather than the scheduling information. For example, if the base station transfers to the terminal that the downlink data signal is transmitted on all the frequency resource regions 2f-20, 2f-22, 2f-30, and 2f-24 at time 2f-10 through the downlink scheduling information with respect to the time 2f-10, the terminal can receive the downlink signal on the remaining frequency resource regions 2f-20, 2f-22, and 2f-24 excluding the preconfigured or determined second resource region 2f-30. Accordingly, the terminal can select the transport block size (TBS) transmitted through the downlink based on the remaining frequency resource regions 2f-20, 2f-22, and 2f-24 excluding the second resource region 2f-30 preconfigured or determined by the base station among the received frequency resource regions 2f-20, 2f-22, 2f-30, and 2f-24 on which the downlink signal transmission is configured.

According to the method 2-2, in case where the base station defines the number of bits that is necessary to transmit the frequency resource allocation information included in the scheduling information based on the whole frequency resource region or both the first frequency resource region and the second frequency resource region, and transmits the frequency resource allocation information to the terminal in accordance with the defined bits, if the time-frequency resource on which the base station has scheduled the downlink or uplink transmission belongs to the preconfigured or determined second resource region, the terminal can also determine the actual downlink or uplink transmission/reception resource region by taking precedence of the scheduling information rather than the information on the second resource region. For example, if the base station transfers to the terminal that the downlink data signal is transmitted on all the frequency resource regions 2f-20, 2f-22, 2f-30, and 2f-24 at time 2f-10 through the downlink scheduling information with respect to the time 2f-10, the terminal can receive the downlink signal on the frequency resource regions 2f-20, 2f-22, 2f-30, and 2f-24 in accordance with the frequency resource allocation information that the base station has transmitted through the scheduling information including the second resource region even if the preconfigured or determined second resource region 2f-30 exists at the time 2f-10. In this case, the terminal can determine that the transport block size (TBS) transmitted through the downlink has been selected based on the frequency resource regions 2f-20, 2f-22, 2f-30, and 2f-24 on which the downlink signal transmission is configured among the frequency resource region information received from the base station.

In general, as in the method 2-1, it is preferable that the second resource region configuration information takes precedence of the scheduling information, but in case of the service giving importance to delay and reliability, such as URLLC, it is possible that the scheduling information takes precedence of the second resource region configuration information, and it is also possible to apply the method 2-2.

In this case, the base station and the terminal can determine the transport block size intended to be transmitted on the region on which the transmission has been configured based on at least one of resource regions that can be used for the actual data transmission, for example, the total number of PRBs, subbands, or subcarriers that can be used for the data transmission, and the number of symbols. If the TBS is predefined in a table determined by at least the amount of transmission resource, the base station and the terminal can find a table value closest to the amount of data transmission/reception resource determined according to the method 2-1 or the method 2-2, and can perform transmission/reception of the same using the transport block size. In this case, the amount of the data transmission/reception resource can be selected through roundup, round, rounddown, the maximum integer value that does not exceed the amount, and the minimum integer value that exceeds the amount. If the TBS is predefined as a function that is determined by at least the amount of the transmission resource, the base station and the terminal can transmit and receive transmittable TBS value among TBSs determined by the amount of data transmission/reception resource that is determined according to the method 2-1 or the method 2-2. In this case, the amount of the data transmission/reception resource can be selected through roundup, round, rounddown, the maximum integer value that does not exceed the amount, and the minimum integer value that exceeds the amount.

Further, in determining the transport block size in the unit of PRB or subband, if at least one PRB being one or more subcarriers short (e.g., PRB composed of 10 subcarriers, hereinafter, partial PRB) exists, or if at least one subband being one or more subcarriers short (e.g., subcarrier composed of 3 PRBs in case where 4 PRBs constitute one subband, hereinafter, partial subband) exists, it is possible to select the TBS in accordance with the number of PRBs or subbands by determining that the PRB, the partial PRB, or the partial subband is equal to a general PRB or subband, and it is also possible to select the TBS through proportional adjustment as many as the number of subcarriers or PRBs included in the partial PRB or the partial subband, or the number of symbols. Further, it is also possible to determine that the partial PRB and the partial subband are equal to a general PRB and a general subband and to select the TBS through proportional adjustment as many as the number of symbols.

In other words, the transport block size can be selected based on the amount of resources that can be used for the actual data channel transmission among the time and frequency resource regions on which the downlink or uplink transmission is configured, that is, based on the amount of resources configured to be used for the downlink or uplink transmission among the resource regions excluding the resources configured as the second resource region (at least one of the total numbers PRBs, subbands, and subcarriers). In this case, if at least one of the number of subcarriers and the number of OFDM symbols included in a specific PRB or subband is smaller than the predefined number of PRBs or subbands, for example, if the PRB is defined to be composed of 12 subcarriers and 7 OFDM symbols, but the number of specific PRBs is smaller than the number of subcarriers or symbols of the predefined PRB or subband, it is possible to use the same for the transport block size selection using the ratio as many as the number of subcarriers or symbols included in the PRB or subband. In this case, it is also possible to select the transport block size through consideration of the partial PRB or partial subband as one PRB or one subband even if the number of subcarriers or symbols of the partial PRB or partial subband is smaller than the number of subcarriers or symbols of the defined PRB or subband as described above.

In this case, the actual transport block size can be selected by not only the size of the resource regions that can be used for the actual data channel transmission as described above but also other variables including MCS used for the downlink or uplink transmission. In the disclosure, explanation has been made based on the amount of resources among the variables that are necessary to select the transport block size, but the disclosure is not limited thereto.

In case of configuring the downlink reception and uplink transmission operations in one or more time domains through one piece of downlink scheduling information or one piece of uplink scheduling information, for example, in case of configuring the downlink or uplink transmission at time 2f-10 and time 2f-40 through one piece of downlink control information, such configuration can be determined based on at least one of the total numbers of PRBs, subbands, and subcarriers that can be used for data transmission in the whole or partial region of the time when the transmission is configured. If the downlink transmission at time 2f-10 and time 2f-40 is configured through one piece of downlink scheduling information as shown in FIG. 2F, different data (or transport block) transmission can be respectively performed at time 2f-10 and at time 2f-40. In this case, as in the method 2-1, it is possible to determine the resource region and the transport block size transmitted or received at time 2f-10 in consideration of only resources on which the data channel transmission at time 2f-10, that is, only the resources on which the downlink transmission is configured among the remaining resources f1(2f-20), f2(2f-22), and f4(2f-24) excluding the second transmission resource region, or it is possible to determine the resource region and the transport block size transmitted or received at time 2f-10 in consideration of the resource region configured through the frequency resource allocation information included in the scheduling information without considering the second resource region at time 2f-10 as in the method 2-2. Similarly, it is possible to determine the transport block size transmitted at time 2f-40 in consideration of the resource on which the downlink transmission is configured among all the resources. In this case, the second resource region is not configured at time 2f-40, the method 2-1 and the method 2-2 have the same operations.

In case where the downlink transmission is configured at time 2f-10 and time 2f-40 through one piece of downlink scheduling information of FIG. 2F, that is, in case where transmission of one piece of data (or transport block) is performed through both time 2f-10 and time 2f-40, according to the method 2-1, it is possible to determine the resource region and the transport block size transmitted or received at time 2f-10 and time 2f-40 in consideration of the resources on which the data channel transmission is possible at time 2f-10 and time 2f-40, that is, the resources f1(2f-20), f2(2f-22), and f4(2f-24) at the remaining resource time 2f-10 excluding the second transmission resource region, and the resources f1(2f-20), f2(2f-22), f3(2f-30), and f4(2f-24) at time 2f-40. According to the method 2-2, it is possible to determine the resource region and the transport block size transmitted or received at time 2f-10 and time 2f-40 based on the resources on which the data channel transmission is configured at time 2f-10 and time 2f-40, that is, based on the resource regions configured through the frequency resource allocation information included in the scheduling information (e.g., the resources f1(2f-20), f2(2f-22), f3(2f-30), and f4(2f-24) at time 2f-10 and the resources f1(2f-20), f2(2f-22), f3(2f-30), and f4(2f-24) at time 2f-40) regardless of the second transmission resource region information.

Although the disclosure has been described around the method for selecting the frequency resource allocation information of the data channel and the transport block size, the method proposed in the disclosure can also be applied to generation of a reference signal (e.g., DMRS) used for data decoding or channel estimation) or a sequence (or signal string) of a signal used for channel quality measurement (e.g., CSI-RS) (hereinafter, reference signal (RS)). For example, if the base station or the terminal use the frequency domain information in which the RS is transmitted in generating the RS signal, as in the method 2, the RS signal is generated based on the frequency resource allocation information included in the downlink or uplink scheduling information, and only the signal for the region in which the actual RS is transmitted can be transmitted.

Figure 2H:
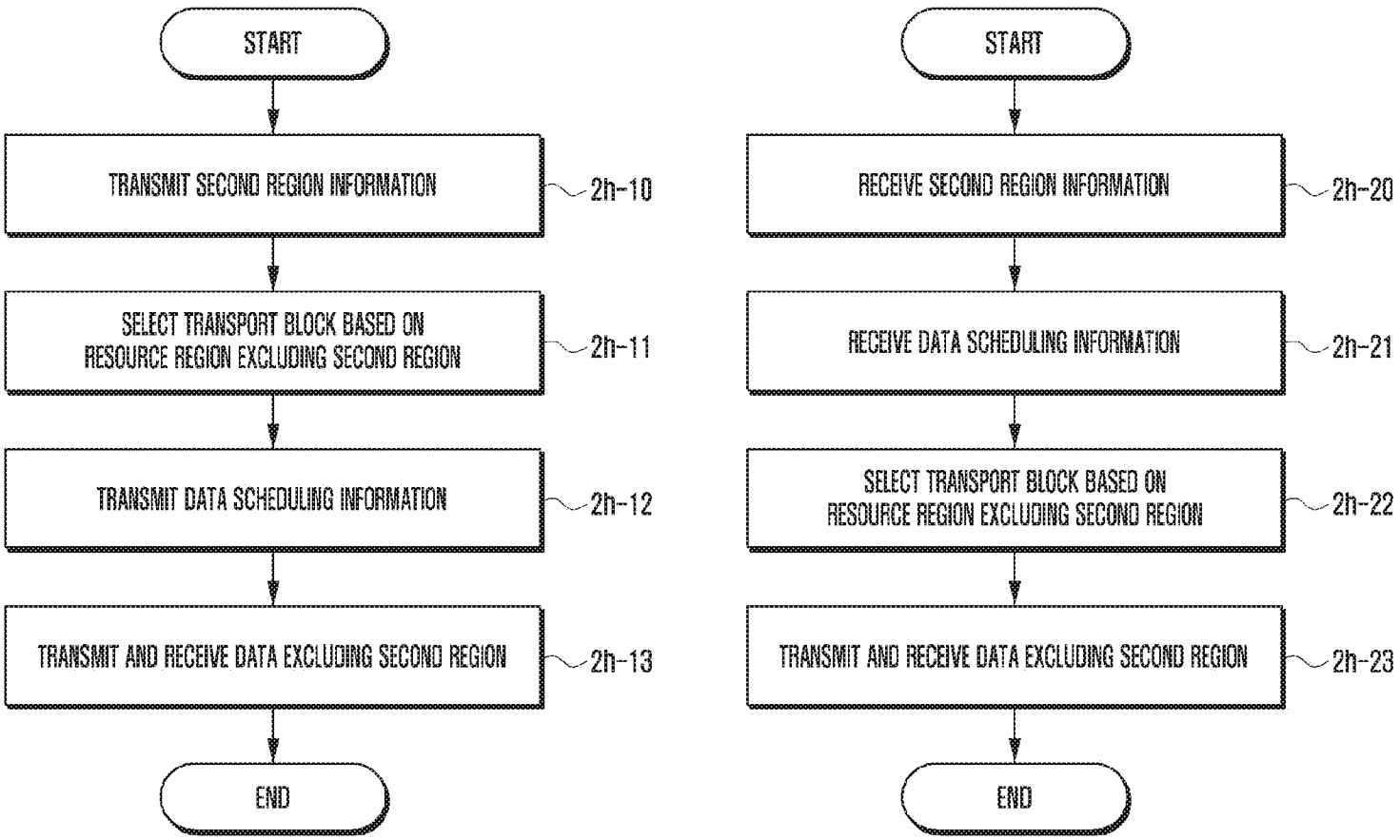
FIG. 2H is a flowchart illustrating operations of a base station and a terminal for a method according to an embodiment of the disclosure.

Next, through FIG. 2H, the base station and terminal operations whereby the second resource region is configured will be described.

At operation 2h-10, the base station configures the second resource region, and transmits information related to the configured second region to the terminal. As described above in the disclosure, the information related to the second resource region includes signaling for notifying of the second resource region, and is transmitted in the method as described in the disclosure.

At operation 2h-11, the base station can determine the data size (or transport block size) used to transmit the downlink or uplink data in consideration of the amount of resources configured to be used for the downlink or uplink data transmission among the remaining regions excluding the second resource region configured at operation 2h-10. In this case, the amount of resources is merely one variable for determining the data size, and the data size may not be determined only by the amount of resources as described above.

At operation 2h-12, the base station transmits downlink or uplink data scheduling information to the terminal. The data scheduling information may include at least one of frequency resources and time resources for the data transmission and the data size selected at operation 2h-11. The data scheduling information can be transmitted by a higher signal or a physical signal (e.g., downlink control channel).

At operation 2h-12, the base station transmits or receives data excluding the second transmission region in accordance with data scheduling information transmitted to the terminal. In case of the downlink, the base station can map the data to the resource excluding the second transmission region among the scheduled data resources to be transmitted. In case of the uplink, the base station may receive the data from the resource excluding the second region among the scheduled data resources.

At operation 2h-20, the terminal receives the second resource region information from the base station. As described above according to the disclosure, the second resource region information includes signaling for notifying of the second resource region, and is transmitted according to the method as described above according to the disclosure.

At operation 2h-21, the terminal receives the data scheduling information from the base station. The data scheduling information includes frequency resources or time resources for data transmission. The data scheduling information can be transmitted by the higher signal or the physical signal.

At operation 2h-22, the terminal selects the size of the data used for the data transmission/reception through the second resource region information and the data scheduling information received at operations 2h-20 and 2h-21.

At operation 2h-23, the terminal transmits or receives the data excluding the second resource region in accordance with the data scheduling information of the base station. In case of the downlink, the terminal receives the data from the resource excluding the second resource region among the scheduled data resources. In case of the uplink, the base station maps the data to the resource excluding the second resource region among the scheduled data resources.

Figure 2I:
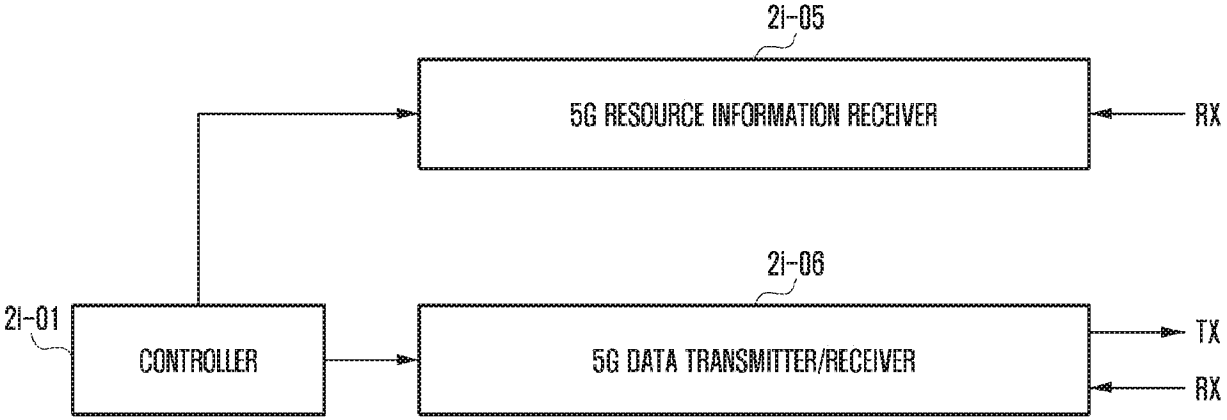
FIG. 2I is a diagram illustrating the configuration of a terminal device according to an embodiment of the disclosure.
Figure 2J:
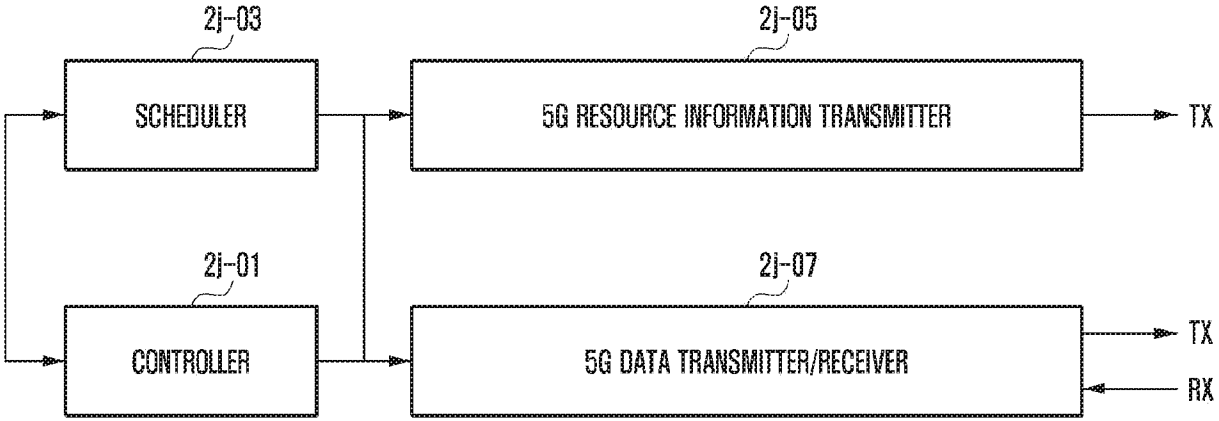
FIG. 2J is a diagram illustrating the configuration of a base station device according to the disclosure.

Next, FIG. 2J is a diagram illustrating the configuration of a base station device according to the disclosure.

A controller 2j-01 controls resource allocation for base station and terminal procedures, corresponding second resource region configuration, and data transmission/reception, and transmits data scheduling information configured to the terminal through a resource allocation information transmitter 2j-05. A scheduler 2j-03 schedules 5G data on 5G resources and transmits or receives the 5G data with a 5G terminal through a 5G data transmitter/receiver 2j-07.

Next, FIG. 2I is a diagram illustrating the configuration of a terminal device according to the disclosure.

A receiver 2i-05 receives base station and terminal procedures, second resource region configuration information and data scheduling information transmitted by the corresponding base station, and a controller 2i-01 transmits or receives 5G data scheduled on an allocated 5G resource with a 5G base station through a 5G data transmitter/receiver 2i-06.

Embodiment 3

In order for a terminal to estimate a channel in a wireless communication system, a base station should transmit a reference signal for this. The terminal can perform channel estimation using the reference signal, and can demodulate the received signal. Further, the terminal can grasp a channel state through the reference signal, and can feed this back to the base station. In general, when the reference signal is transmitted, a frequency-time transmission interval of the reference signal is determined in consideration of maximum delay spread and maximum Doppler spread of the channel. As the frequency-time transmission interval of the reference signal becomes narrower, the channel estimation performance is improved, and thus the demodulation performance of the signal can be improved. However, this causes an overhead of the reference signal to be increased, and a data rate becomes restricted.

In a 4G LTE system operating in 2 GHz frequency band in the related art, a downlink uses reference signals, such as a cell-specific reference signal (CRS) and a demodulation reference signal (DMRS). If a reference signal interval on frequency is expressed as a subcarrier spacing m of an orthogonal frequency division multiplexing (OFDM) signal, and a reference signal interval on time is expressed as a symbol spacing n of the OFDM signal, in case of the CRS assuming a normal CP, the frequency-time transmission interval of the reference signal corresponding to antenna port 1 and antenna port 2 becomes (m,n)=(3,4). Further, in case of the DMRS assuming a normal CP, the frequency-time transmission interval of the reference signal becomes (m,n)=(5,7).

In contrast with an LTE system, in a 5G wireless communication, a system that operates in not only a frequency band of 6 GHz or less but also a high frequency band beyond 6 GHz is under consideration. Further, in the 5G system, low latency support and high mobility support are considered to be important. Accordingly, in the 5G system, it is necessary to newly design a reference signal in consideration of this. Further, in the 5G system, DMRS can be used on not only a data channel but also a control channel. Specifically, in the LTE system, channel estimation for a PDCCH that is a control channel is performed using the transmitted CRS without multiplying the reference signal by an additional signal in a region in which the PDCCH is transmitted, whereas in the 5G system, the channel estimation can be performed by multiplying the reference signal by the same signal as the signal that is additionally multiplied to the signal of the PDCCH region that is a control channel, in other words, using the DMRS. In this case, if a reference signal of another channel, such as a PDSCH, is multiplied by the same signal as the signal multiplied to the signal of the PDCCH region, the terminal can perform the channel estimation using both the reference signals of the two channels. Accordingly, in the third embodiment of the disclosure, a configuration method for the terminal to use reference signals of different channels in such a case is provided.

Figure 3A:
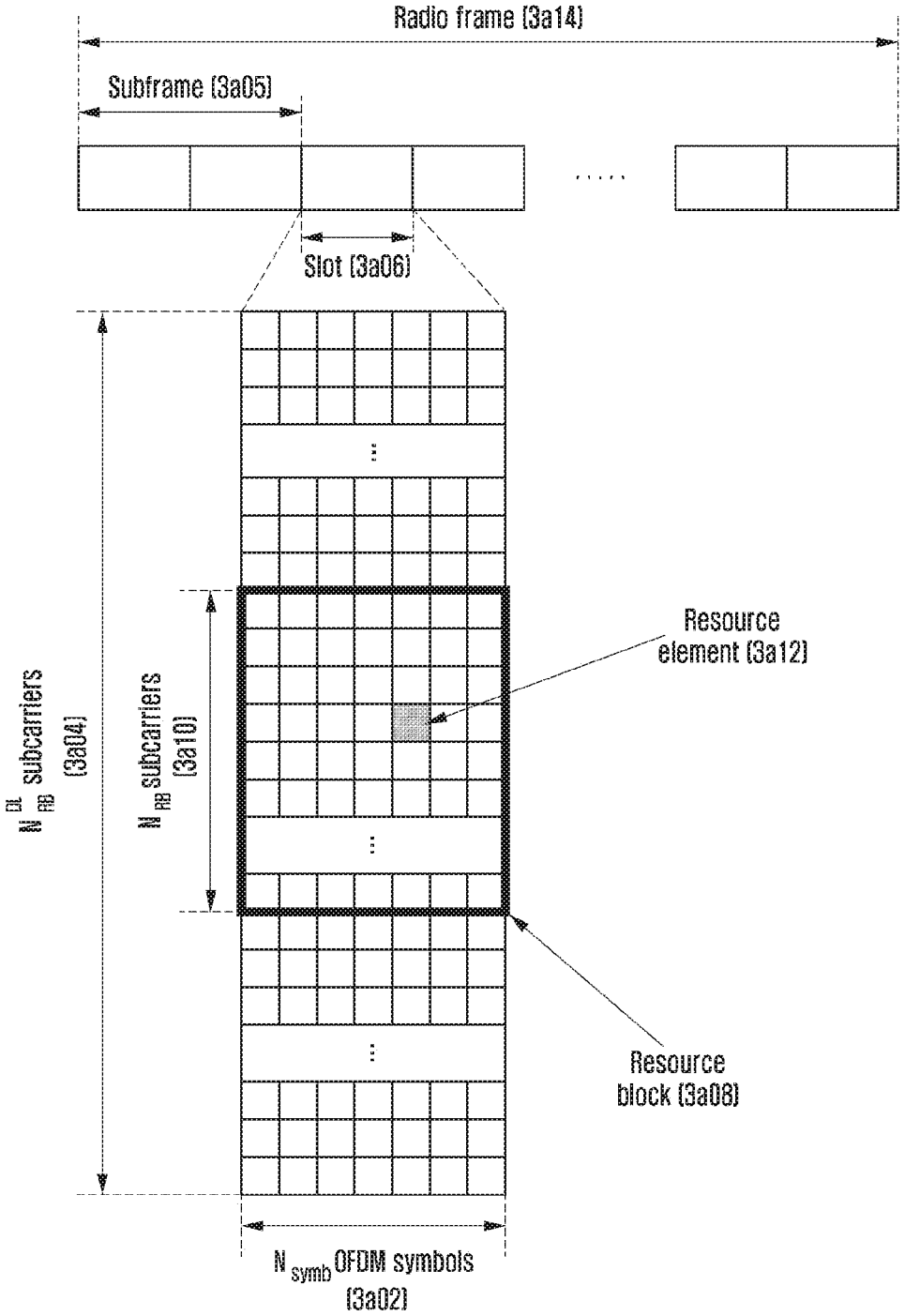
FIG. 3A is a diagram illustrating a downlink time-frequency domain transmission structure of an LTE or LTE-A system.

FIG. 3A is a diagram illustrating the basic structure of a time-frequency domain that is a radio resource region in which data or a control channel is transmitted on a downlink in an LTE/LTE-A system.

Referring to FIG. 3A, a horizontal axis represents a time domain, and a vertical axis represents a frequency domain. In the time domain, the minimum transmission unit is an OFDM symbol, and $N_{symb}$ OFDM symbols 3a02 constitute one slot 3a06, and two slots constitute one subframe 3a05. The length of the slot is 0.5 ms, and the length of the subframe is 1.0 ms. Further, a radio frame 3a14 is a time domain region that is composed of 10 subframes. In the frequency domain, the minimum transmission unit is a subcarrier, and the transmission bandwidth of the whole system is composed of $N_{BW}$ subcarriers 3a04 in total.

In the time-frequency domain, the basic unit of resources is a resource element (RE) 3a12 that may be expressed by an OFDM symbol index and a subcarrier index. A resource block (RB) (or physical resource block (PRB)) 3a08 is defined by $N_{symb}$ successive OFDM symbols 3a02 in the time domain and $N_{RB}$ successive subcarriers 3a10 in the frequency domain. Accordingly, one RB 3a08 includes $N_{symb}N_{RB}$ REs 3a12. In general, the minimum allocation unit of data is the RB, and in the LTE system, $N_{symb}=7$, $N_{PB}=12$, and $N_{BW}$ and $N_{RB}$ is in proportion to the bandwidth of the system transmission band. The data rate is increased in proportion to the number of RBs that are scheduled to the terminal. The LTE system defines and operates 6 transmission bandwidths. In case of an FDD system that operates to discriminate a downlink and an uplink from each other by means of frequency, the downlink transmission bandwidth and the uplink transmission bandwidth differ from each other. A channel bandwidth represents an RF bandwidth corresponding to the system transmission bandwidth. Table 3-1 presents the corresponding relationship between the system transmission bandwidth defined by the LTE system and the channel bandwidth. For example, the LTE system having 10 MHz channel bandwidth has the transmission bandwidth that is composed of 50 RBs.

TABLE 3-1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Figure 3B:
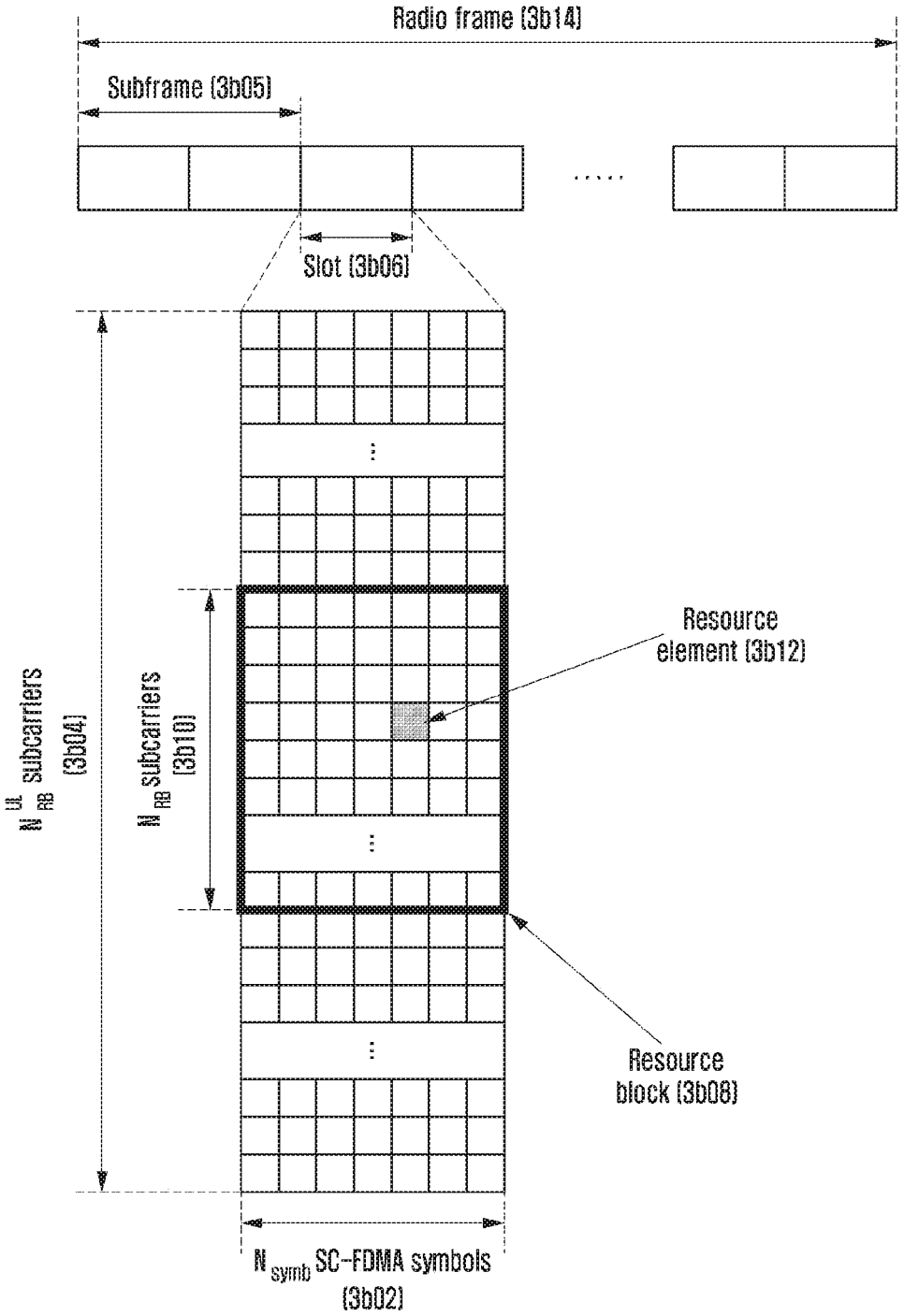
FIG. 3B is a diagram illustrating an uplink time-frequency domain transmission structure of an LTE or LTE-A system.

FIG. 3B is a diagram illustrating the basic structure of a time-frequency domain that is a radio resource region in which data or a control channel is transmitted on an uplink in an LTE/LTE-A system.

Referring to FIG. 3B, a horizontal axis represents a time domain, and a vertical axis represents a frequency domain.

In the time domain, the minimum transmission unit is an SC-FDMA symbol 3b02, and $N_{symb}^{UL}$ SC-FDMA symbols constitute one slot 3b06. Further, two slots constitute one subframe 3b05. In the frequency domain, the minimum transmission unit is a subcarrier, and the transmission bandwidth of the whole system is composed of $N_{BW}$ subcarriers 3a04 in total. $N_{BW}$ has a value that is in proportion to the system transmission bandwidth.

In the time-frequency domain, the basic unit of resources is a resource element (RE) 3b12 that may be defined by an SC-FDMA symbol index and a subcarrier index. A resource block pair (RB pair) 3b08 is defined by $N_{symb}^{UL}$ successive SC-FDMA symbols in the time domain and $N_{sc}^{RB}$ successive subcarriers in the frequency domain. Accordingly, one RB is composed of $N_{symb}^{UL} \times N_{sc}^{RB}$ REs. In general, the minimum transmission unit of data or control information is an RB unit. The PUCCH is mapped to the frequency domain corresponding to 1 RB, and is transmitted for one subframe.

Figure 3C:
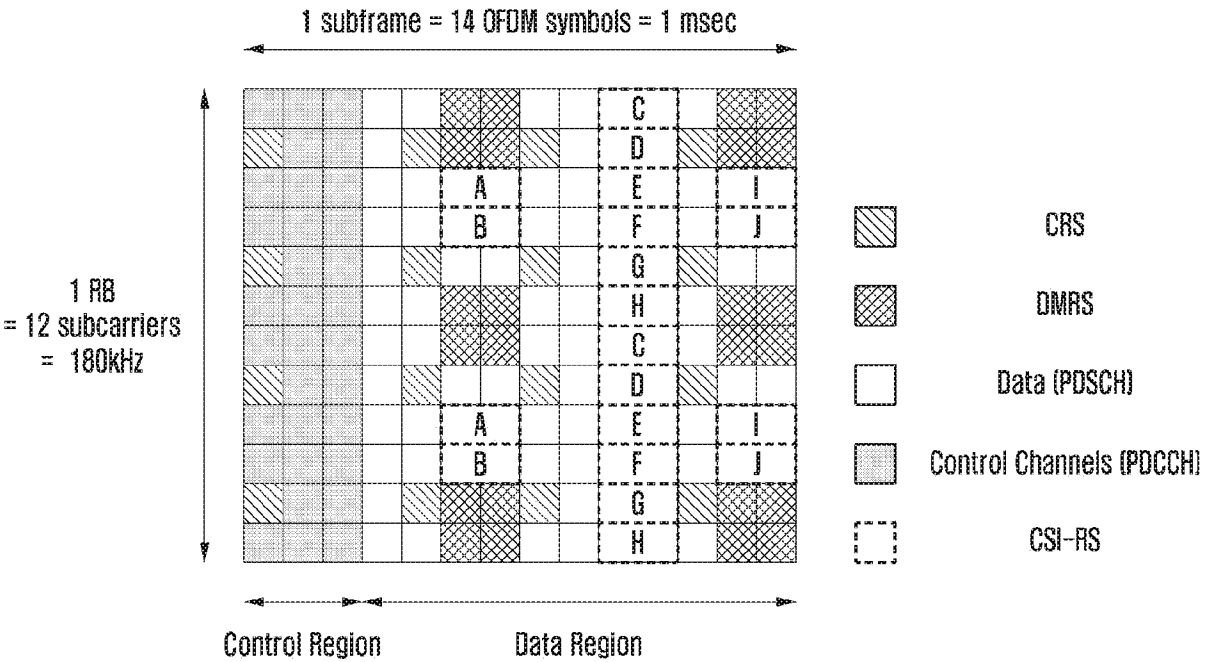
FIG. 3C is a diagram illustrating radio resources of one RB that is the minimum unit capable of being scheduled to a downlink in an LTE or LTE-A system.

FIG. 3C is a diagram illustrating a radio resource of one RB that is the minimum unit capable of being scheduled to a downlink in LTE/LTE-A system. On the radio resource illustrated in FIG. 3C, different kinds of plural signals as follows can be transmitted.

1. Cell specific RS (CRS): This is a reference signal periodically transmitted for all terminals belonging to one cell, and a plurality of terminals can commonly use the CRS.

2. Demodulation reference signal (DMRS): This is a reference signal transmitted for a specific terminal, and it is transmitted only in case where data is transmitted to the corresponding terminal. The DMRS may be composed of 8 DMRS ports in total. In the LTE/LTE-A, ports 7 to 14 correspond to DMRS ports, and the ports maintain orthogonality so that no interference occurs between them using CDM or FDM.

3. Physical downlink shared channel (PDSCH): This is a data channel transmitted to a downlink, and it is used by a base station to transmit traffic to a terminal. The PDSCH is transmitted using an RE in which a reference signal is not transmitted in a data region of FIG. 3B.

4. Channel status information reference signal (CSI-RS): This is a reference signal transmitted for terminals belonging to one cell, and it is used to measure a channel state. A plurality of CSI-RSs can be transmitted to one cell.

5. Other control channels (PHICH, PCFICH, and PDCCH): These control channels are used to provide control information that is necessary for a terminal to receive PDSCH or to transmit ACK/NACK for operating an HARQ for uplink data transmission.

Among the above-described signals, the CRS and the DMRS are reference signals used to demodulate the signal received through the channel estimation, and because the channel estimation performance exerts a direct influence on the demodulation performance, the frequency-time transmission interval of the reference signal is maintained. Specifically, the CRS is transmitted without multiplying the reference signal by an additional signal, and thus a terminal can use the CRS to measure the channel state through the channel estimation and to demodulate the received signal. If the CRS is used to demodulate the signal of the PDSCH region, and is transmitted through multiplication of the signal of the PDSCH region by specific precoding, the terminal should additionally know the precoding information multiplied to demodulate the PDSCH signal. However, the DMRS is transmitted in a state where the reference signal is multiplied by the same signal as the signal multiplied to the signal of the PDSCH region, and thus it is not necessary for the terminal to additionally know the precoding information to demodulate the PDSCH signal in case where the signal of the PDSCH region is multiplied by the specific precoding to be transmitted. In the LTE system, in case of performing the channel estimation for the control channel of FIG. 3C, the channel estimation is performed using the CRS. More specifically, UE-specific precoding is not applied to the PDCCH region located on a forward symbol of the subframe. In contrast, the EPDCCH defined in the LTE system is transmitted to the PDSCH region, and thus the UE-specific precoding can be applied. Since the EPDCCH is transmitted to the PDSCH region, the channel estimation can be performed using the DMRS of the PDSCH region. In the disclosure, it is to be noted that the EPDCCH uses the DMRS differently from the DMRS use of the PDSCH region on the point that the disclosure presents a method for using reference signals transmitted on different channels, in other words, reference signals transmitted from different transmission regions.

Figure 3D:
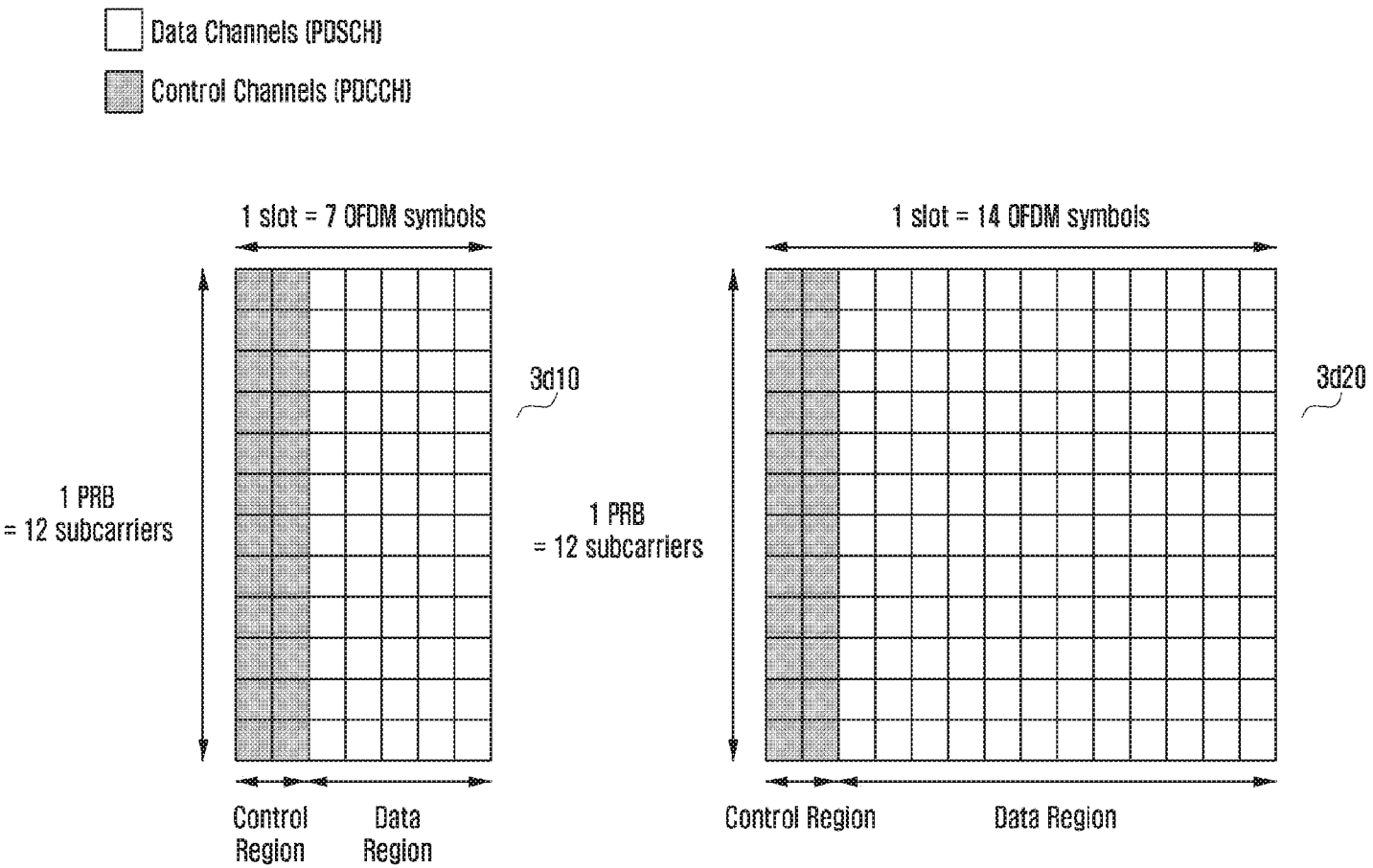
FIG. 3D is a diagram illustrating radio resources of one RB that is the minimum unit capable of being scheduled to a downlink in a 5G communication system.

FIG. 3D is a diagram illustrating a radio resource of one RB that is the minimum unit capable of being scheduled to a downlink in a 5G communication system.

According to the current discussion of a 5G communication system, the RB is different from the PRB that is the minimum transmission unit of the proposed LTE system as follows. Referring to FIG. 3D, in the same manner as the LTE system, a PRB is composed of 12 successive subcarriers on frequency, but the transmission unit on time is based on a slot. According to the current discussion for the length of a slot, if the subcarrier spacing is equal to or lower than 60 kHz, one slot may be composed of 7 OFDM symbols as denoted by identification number 3d10, or may be composed of 14 OFDM symbols as denoted by identification number 3d20. Further, if the subcarrier spacing is higher than 60 kHz, one slot is composed of 14 OFDM symbols as denoted by identification number 3d20. In FIG. 3D, the region of the control channel is illustrated with 2 OFDM symbols, but in an embodiment of the disclosure, the number of OFDM symbols of the control channel is not limited to 2. In other words, the number of OFDM symbols of the control channel may be one or 2 or more. Further, in contrast with the LTE system, in the 5G wireless communication, UE-specific precoding may be applied and transmitted even on the control channel of FIG. 3D, and for this, DMRS may be used on not only a data channel but also a control channel.

Figure 3E:
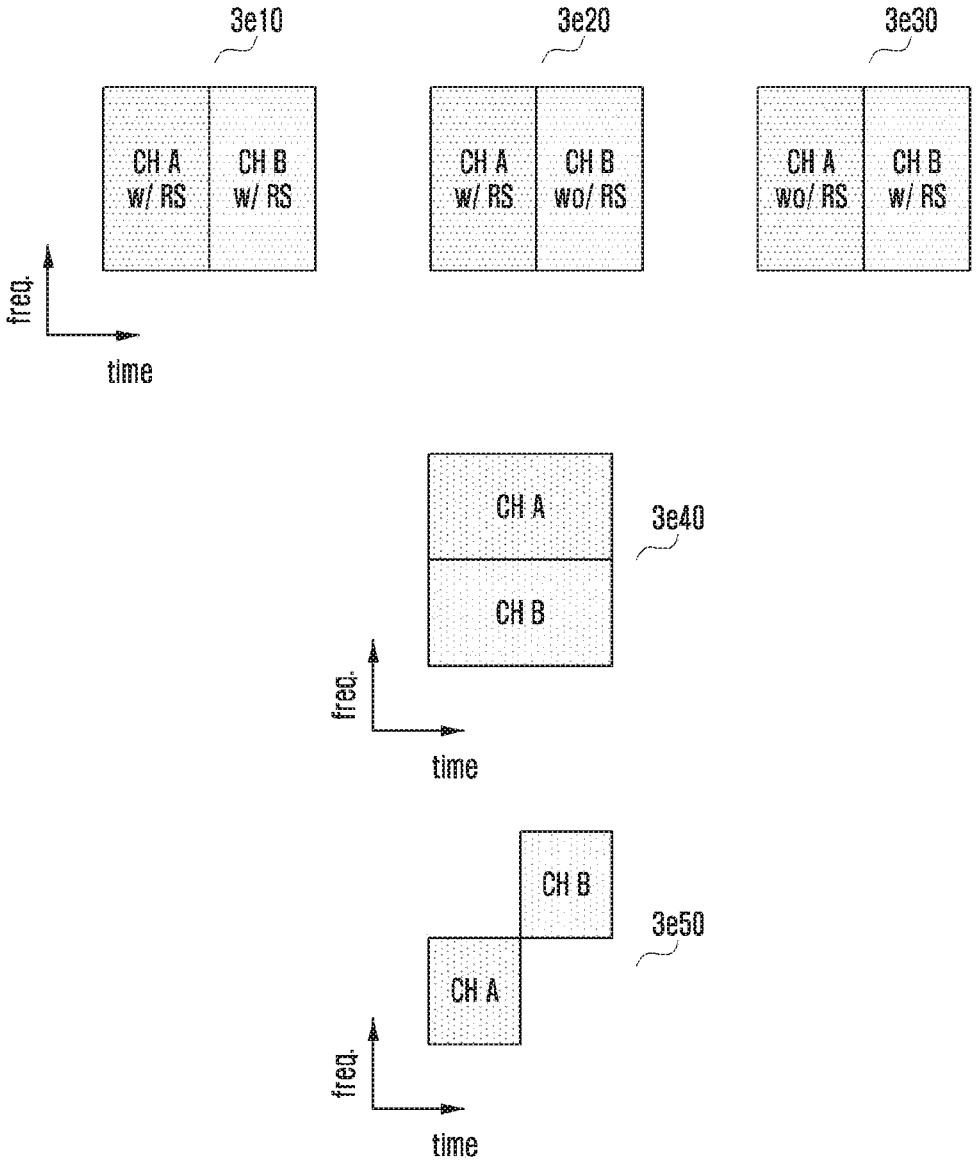
FIG. 3E is a diagram illustrating a use case in which different channels share a reference signal.

FIG. 3E is a diagram illustrating a use case in which different channels can share a reference signal.

Referring to FIG. 3E, a use case in which different channels can share a reference signal is illustrated. As described above, if the same signal is additionally multiplied to a signal of different channels, and if the additionally multiplied signal is equally multiplied to the reference signal of the different channels, it is possible for the different channels to share the reference signal. For example, the additionally multiplied signal may be a signal that is multiplied for beamforming in a specific direction. Specifically, identification numbers 3e10, 3e20, and 3e30 indicate a case where channel is divided on time and the same frequency region is used. The identification number 3e10 indicates a case where both channels A and B include a reference signal. In case where the reference signal can be shared as indicated by identification number 3e10, the terminal can improve the channel estimation performance using all the reference signals included in the two channels. The identification number 3e20 indicates a case where channel A includes a reference signal, but channel B does not include a reference signal. In case where the reference signal can be shared as indicated by identification number 3e20, channel B can perform the channel estimation using the reference signal existing in channel A. The identification number 3e30 indicates a case where channel A does not include a reference signal, but channel B includes a reference signal. In case where the reference signal can be shared as indicated by identification number 3e30, channel A can perform the channel estimation using the reference signal existing in channel B. As denoted by identification number 3e20 and identification number 3e30, in case where a reference signal is not transmitted on one of two channels, and a reference signal of another channel is used, it is possible to reduce an overhead of the reference signal. Although as denoted by identification numbers 3e10, 3e20, and 3e30, the case where the channel is divided on time has been described, the channel estimation becomes possible through sharing of the reference signal even in case where different channels use the same time region as indicated by identification number 3e40 and the channel is divided on frequency. Further, in the disclosure, it is not excluded to share the reference signal even with respect to different channels on which the same region is not used on time and frequency as indicated by identification number 3e50. In the disclosure, as described above through FIG. 3E, in case where the reference signal transmitted from different channels, that is, different transmission regions, can be shared as described above through FIG. 3E, a method for using the same is provided.

Hereinafter, although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technology (5G, new radio, or NR) that is developed after LTE-A may be included therein. More specifically, the basic structure of the time-frequency domain in which the signal is transmitted from the downlink and the uplink may be different from that as illustrated in FIGS. 3A and 3B. Further, the kind of the signal transmitted to the downlink and uplink may also differ. Accordingly, the embodiment of the disclosure may also be applied to other communication systems through partial modifications thereof in a range that does not greatly deviate from the scope of the disclosure by the judgment of those skilled in the art.

Further, in describing the disclosure, a detailed description of related functions or configurations will be omitted if it is determined that it obscures the disclosure in unnecessary detail. Further, all terms used in the description are general terms that are widely used in consideration of their functions in the disclosure, but may differ depending on intentions of a person skilled in the art to which the disclosure belongs, customs, or appearance of new technology. Accordingly, they should be defined based on the contents of the whole description of the disclosure. Hereinafter, the base station is the subject that performs resource allocation to the terminal, and may be at least one of an eNode B, Node B, base station (BS), radio connection unit, base station controller, and node on a network. The terminal may include user equipment (UE), mobile station (MS), cellular phone, smart phone, computer, or a multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station.

A demodulation reference signal (DMRS) to be described hereinafter means a reference signal having a feature that the terminal can perform demodulation without additionally receiving precoding information through UE-specific precoding of the reference signal, and its title that is used in the LTE system is used as it is. However, the term "DMRS" may be expressed by another term by user's intention and for the use purpose of the reference signal. More specifically, the term "DMRS" merely presents a specific example to easily explain the technical contents of the disclosure and to help understanding of the disclosure, but does not intend to limit the scope of the disclosure. That is, it will be apparent to those of ordinary skill in the art to which the disclosure pertains that the technical idea of the disclosure can be embodied even in the reference signal.

Embodiment 3-1 of the disclosure to be described hereinafter proposes a DMRS structure configurable in the 5G communication system. Further, a method in which the DMRS structure is used for a control channel and a data channel will be described. Embodiment 3-2 of the disclosure proposes a method by a base station for implicitly indicating DMRS sharing of different channels. Embodiment 303 of the disclosure proposes a method by a base station for explicitly indicating DMRS sharing of different channels. Further, embodiment 3-4 of the disclosure proposes a method for performing channel measurement in case where a terminal performs or does not perform DMRS sharing.

(3-1)-th Embodiment

The (3-1)-th embodiment proposes a method for configuring the structure of a DMRS that is a reference signal of the disclosure. As described above, it is necessary to design the structure of the DMRS in the 5G system differently from the structure of the DMRS in the LTE system. In the 5G system, the system operates in various frequency bands, and low latency support and high mobility support are considered to be important. Further, the DMRS can be transmitted on not only a data channel but also a control channel. Accordingly, a DMRS structure considering this is required. According to the current discussion, it has been agreed that the DMRS in the 5G communication system supports a variable/configurable DMRS pattern. Accordingly, in the disclosure, a pool of a plurality of DMRS patterns is defined, and some patterns in the DMRS pattern pool is proposed to be used as DMRSs of various channels. For example, the DMRS patterns proposed in the disclosure can be used on not only a data channel but also a control channel. Further, in case of the LTE system, the DMRS structures are differently designed in case of using a normal CP and an extended CP. However, in the disclosure, the DMRS structures for the normal CP and the extended CP are not separately designed, but partial DMRS patterns in the DMRS pattern pool can be used for the normal CP and the extended CP. Further, in case of the LTE system, the reference signals used for MBSFN transmission are separately designed, but in the disclosure, partial DMRS patterns in the proposed DMRS pattern pool can be used for not only the MBSFN transmission but also other channels. The operation of the common RS pool as described above has the advantages that design of different reference signals with respect to different channels is minimized, a channel estimator for the structure of the minimum reference signals can be implemented, and thus terminal implementation burden can be minimized.

Figure 3F:
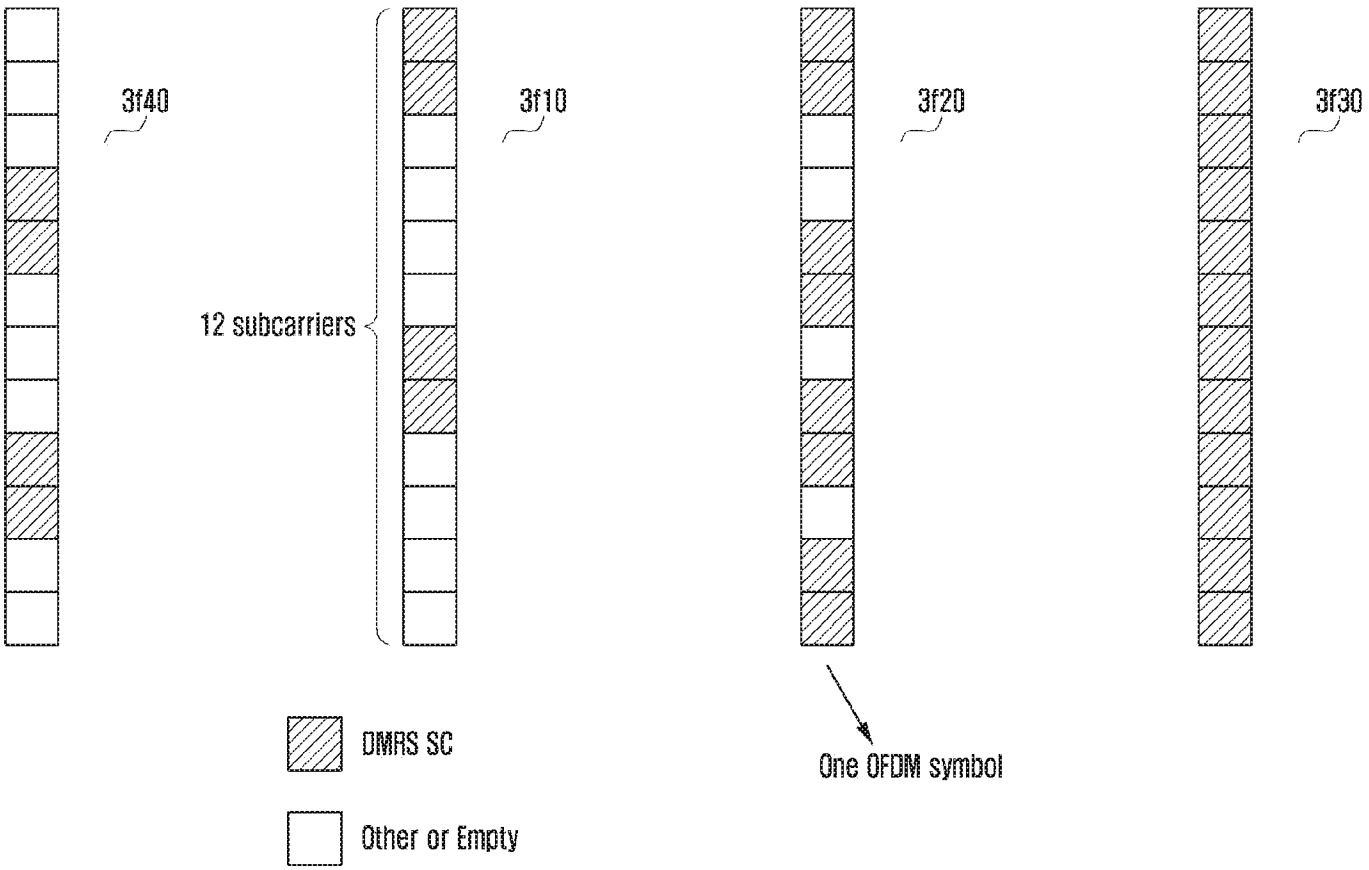
FIG. 3F is a diagram illustrating the structure of a DMRS according to a (3-1)-th embodiment of the disclosure.

Specifically, through FIG. 3F, a DMRS structure proposed in the disclosure will be described. The disclosure proposes a unit DMRS structure configured based on one OFDM symbol. The unit DMRS structure configured based on one OFDM symbol as described above is advantageous not only in configuring the location of the reference signal with respect to various transmission time intervals (TTIs) but also in configuring the location of the reference signal for low latency support and URLLC. Further, the unit DMRS structure may be advantageous on the side of scalability, such as antenna port extension. As illustrated in FIG. 3F, 12 subcarriers can be included in one OFDM symbol based on the PRB that is the minimum transmission unit. As indicated by identification numbers 3f10, 3120, and 3f30, the density of a DMRS subcarrier (SC) in one OFDM symbol is configurable. The identification numbers 3f10 and 3120 denote DMRS structures in case where 12 subcarriers have 4 and 8 DMRS SCs therein, and the identification number 3f30 denotes a DMRS structure in which all subcarriers are composed of DMRS SCs. As indicated by the identification numbers 3f10 and 3120, configuration of even-numbered DMRS SCs may have advantage that an orphan RD does not occur in case where SFBC is considered in a transmit diversity technique. As indicated by the identification numbers 3f10 and 3120, it is possible to make another signal, such as data or another reference signal, enter into the SC that is not used as the DMRS SC or to empty the SC for DMRS power boosting. Emptying of the SC that is not used as the DMRS SC for the DMRS power boosting may be used for the purpose of improving the performance of the DMRS channel estimation in a low SNR region. The DMRS structure of FIG. 3F can be used on not only a data channel but also another channel, such as a control channel. The DMRS structure indicated by the identification numbers 3f10 and 320 has subcarriers that have not been DMRS-transmitted, and parts of them can be used as direct current (DC) subcarriers. However, according to the DMRS structure indicated by the identification number 3f30, the DMRS is transmitted from all subcarriers, and thus it is necessary to puncture parts of them so as to transmit the DC. Further, the DMRS structure indicated by the identification number 3f10 can be replaced by the structure indicated by the identification number 3f40 in consideration of the DC subcarriers. The DMRS SCs indicated by 3f10 to 3f40 may be generated based on a pseudo-random (PN) sequence or may be generated based on a Zadoff-Chu (ZC) sequence. As an example of more detailed use method, the DMRS structure indicated by the identification numbers 3f10 (or 3f40) and 3120 can be used in a CP-OFDM system. Further, the DMRS structure can be configured in time-frequency location, such as uplink/downlink, to be used. If the uplink/downlink has the same DMRS structure, the DMRS ports of the uplink/downlink are orthogonally released, and thus the channel estimation can be better performed in an environment, such as a TDD to cause the interference removal ability to be improved. In contrast, the DMRS structure indicated by the identification number 3f30 is based on the Zadoff-Chu (ZC) sequence in a similar manner to the LTE, and can be used on the uplink in a DFT-s-OFDM system. Accordingly, it may be possible to operate the DMRS structure for low peak-to-average power ratio (PAPR) in a similar manner to the LTE. However, the disclosure is not limited to the proposed use method indicated by the identification numbers 3f10 to 3f40. For example, the DMRS structure indicated by the identification number 3f30 can be used for both the CP-OFDM/DFT-s-OFDM and uplink/downlink.

Figure 3G:
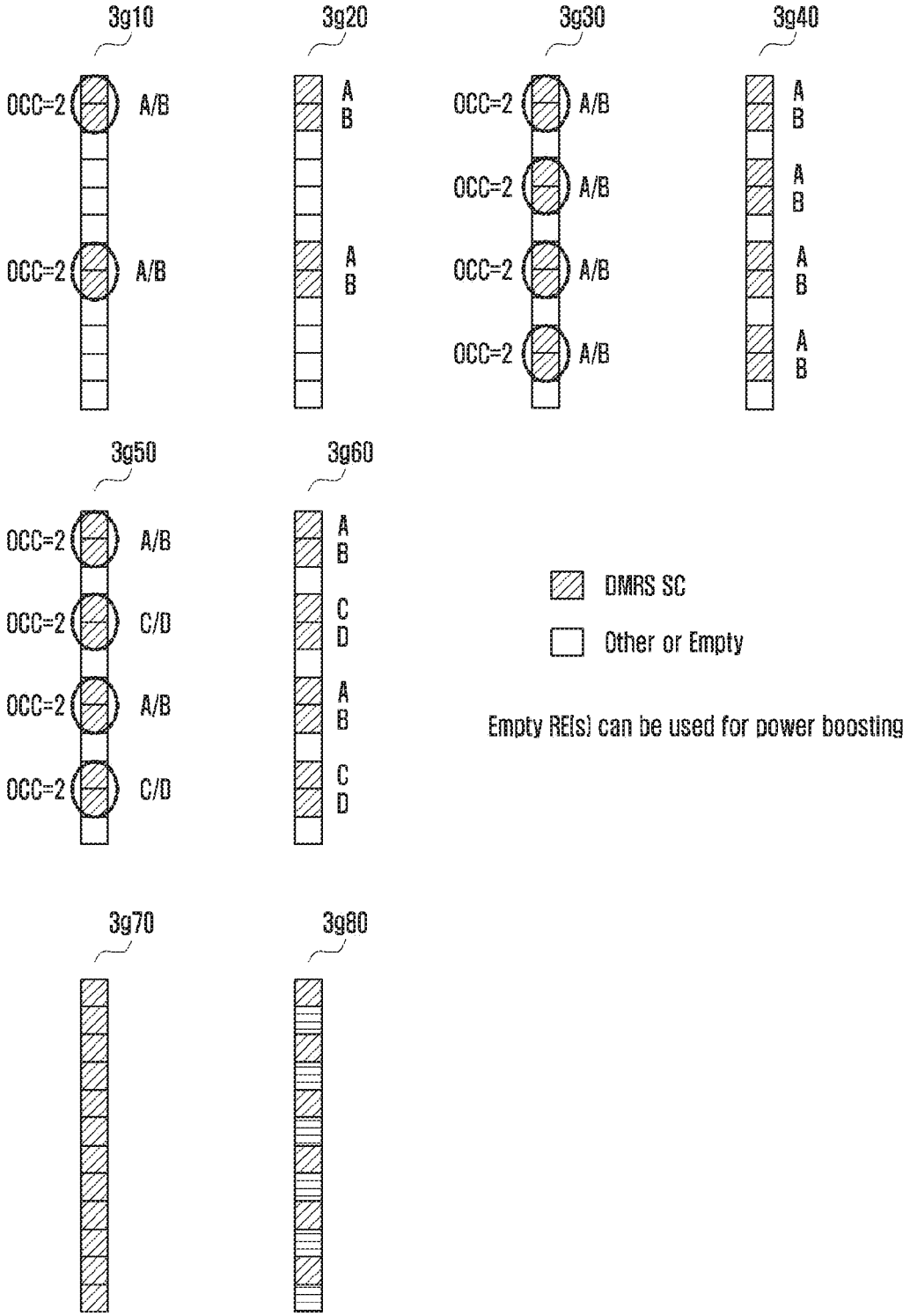
FIG. 3G is a diagram illustrating an example in which an antenna port is applied to a DMRS according to a (3-1)-th embodiment of the disclosure.

Referring to FIG. 3G, a method in which antenna ports are mapped to the unit DMRS structure proposed in FIG. 3F. For convenience, the antenna ports are indicated as p=A, B, C, D, and so on in FIG. 3G. However, it is to be noted that the antenna port numbers may be denoted by different numerals. Here, mapping of the antenna ports is to support plural layer transmission and rank support. Accordingly, the antenna port matching specified hereinafter can be replaced by a term "layer transmission" or "rank support". Specifically, identification numbers 3g10 and 3g20 indicate a case where two antenna ports are mapped to the DMRS structure indicated by the identification number 3f10. The identification number 3g10 indicates a method in which two antenna ports p=A, B are mapped through FDM/CDM by applying an orthogonal cover code (OCC) having length 2, and the identification number 3g10 indicates a method for mapping two antenna ports p=A, B in FDM method without applying the OCC. Next, the identification numbers 3g30 and 3g40 indicate a case where two antenna ports are mapped to the DMRS structure indicated by the identification number 3120. The DMRS indicated by the identification number 3120 can improve the channel estimation performance by heightening the density of a reference signal through comparison with the identification number 3f10. The identification number 3g30 indicates a method in which two antenna ports p=A, B are mapped through FDM/CDM by applying the OCC having length 2, and the identification number 3g40 indicates a method in which two antenna ports p=A, B are mapped in FDM method without applying the OCC. Next, identification numbers 3g10 and 3g20 indicate a case where two antenna ports are mapped to the DMRS structure indicated by the identification number 3f10. The identification number 3g10 indicates a method in which two antenna ports p=A, B are mapped through FDM/CDM by applying an orthogonal cover code (OCC) having length 2, and the identification number 3g10 indicates a method for mapping two antenna ports p=A, B in FDM method without applying the OCC. Next, the identification numbers 3g50 and 3g60 indicate a case where four antenna ports are mapped to the DMRS structure indicated by the identification number 3120. In particular, in case of supporting four antenna ports, in order to improve the channel estimation performance, subcarriers in which the DMRS is not transmitted are emptied and can be used for the purpose of DMRS power boosting in the DMRS structure indicated by the identification number 320. The identification number 3g50 indicates a method in which four antenna ports p=A, B, C, D are mapped through FDM/CDM by applying the OCC having length 2 and FDM, and the identification number 3g60 indicates a method in which four antenna ports p=A, B, C, D are mapped in the FDM method without applying the OCC. The application of the OCC on frequency indicated by the identification numbers 3g10, 3g30, and 3g50 has the advantage that a power imbalance problem does not occur. If the OCC is applied on time in the LTE system, the power imbalance problem occurs, and the OCC is differently applied for each PRB in two PRBs. Last, the identification number 3g70 indicates the DMRS structure indicated by the identification number 3f30, and as indicated by the identification number 3g30, 12 subcarriers are all used as the DMRS, and thus a method for supporting orthogonal DMRS antenna ports using Zadoff-Chu (ZC) can be considered. In this case, like the LTE, up to 8 antenna ports can be supported by applying 8 cyclic shift (CS) field on the assumption that the subcarrier spacing is 15 kHz. As another method for using the DMRS structure indicated by 3f30, 4 orthogonal antenna ports can be supported through the FDM with 4-subcarrier spacing. The disclosure is not limited to the method for mapping the antenna ports to the proposed DMRS structure indicated by 3g10 to 3g70. For example, in case of the identification number 3f30, in the same manner as 3g80, the DMRS SC is FDM-multiplexed, and up to 8 orthogonal antenna ports can be supported through application of 4 cyclic shift fields. In case of supporting a high rank, the operation method as indicated by 3g80 uses all subcarriers, whereas in an environment in which low ranks are used, only partial subcarriers are used as the reference signal, and the remainder can be used for data transmission. For example, in case of transmission of rank 4 or less indicated by 3g80, orthogonality can be supported by 4 CS using only the reference signals of odd-numbered subcarriers, and the 6 remaining even-numbered subcarriers can be used for the data transmission.

Figure 3H:
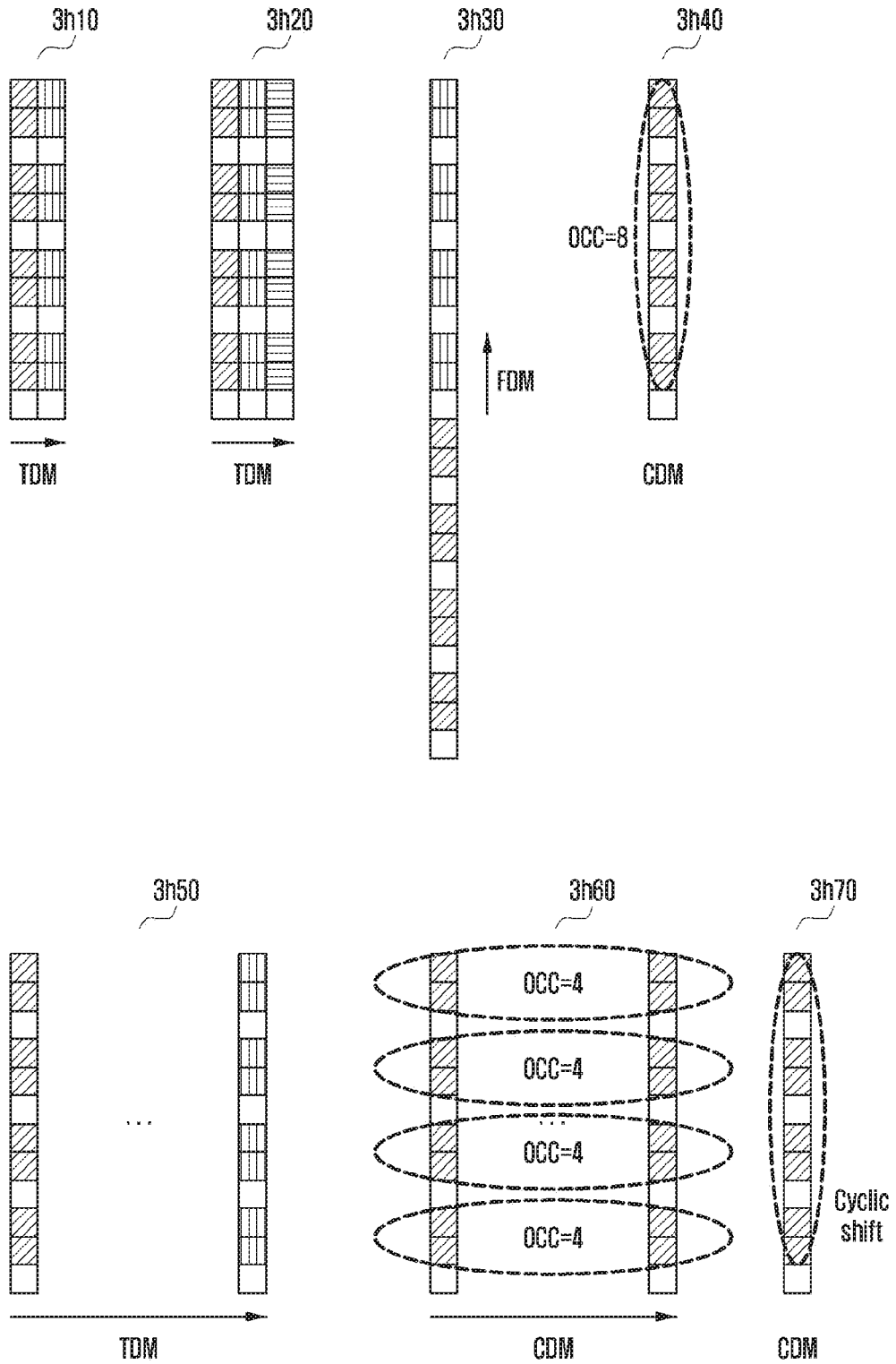
FIG. 3H is a diagram illustrating another example in which an antenna port is mapped to a DMRS structure according to a (3-1)-th embodiment of the disclosure.

Referring to FIG. 3H, a method for mapping a larger number of antenna ports to the proposed unit DMRS structure in comparison to the antenna ports illustrated in FIG. 3G is proposed. For mapping of a larger number of antenna ports in comparison to that illustrated in FIG. 3G, the unit DMRS structure can be configured through additional TDM, FDM, and CDM. First, based on 3f20, it is possible to map 8 antenna ports at maximum through DM of 3f20 on time as indicated by 3h10. The identification number 3h20 indicates a case where 16 antenna port mapping extension at maximum is possible through TDM by 3 OFDM symbols on time. In case of extending the orthogonal antenna ports using TDM, it is advantageous that the RS density on frequency is maintained as it is, but it is disadvantageous that the DMRS density is heightened in a transmission unit. In order to maintain low DMRS density in the transmission unit, a method for extending orthogonal antenna ports using FDM or CDM can be considered in consideration of the point that higher rank can be supported in an environment in which the channel situation is very well and the channel selectivity on frequency is low. The identification number 3h30 indicates a method for mapping 8 antenna ports at maximum in a state where 3f20 is FDM-multiplexed on frequency. Further, as indicated by 3h40, it is possible to map 8 antenna ports at maximum by applying an OCC length 8 to 3f20. Next, in case where all subcarriers indicated by 3f30 are configured through DMRS SC, various types of antenna port extension may be possible in accordance with the antenna port mapping method applied to 3f30 as described above. If 8 orthogonal antenna ports are supported through CS of the ZC sequence on the assumption that the subcarrier spacing indicated by 3f30 is 15 kHz, it is possible to extend 16 orthogonal antenna ports by applying the TDM indicated by 3g30. In case of using the FDM with 4 subcarrier spacing indicated by 3f30, it is possible to support 4 orthogonal antenna ports at maximum, but in case of considering additional FDM indicated by 3h30, it is possible to support 8 orthogonal antenna ports at maximum by using the FDM with 8 subcarrier spacing. The disclosure is not limited to the proposed antenna port extension method in FIG. 3H. The TDM, FDM, and CDM can be combined to be applied, and it is possible to extend the orthogonal antenna ports in various methods. For example, in case of extending the number of antenna ports using only the TDM indicated by 3h10 or 3h20 as described above, it is disadvantageous that the DMRS density is heightened in the transmission unit. As a method for supplementing such drawbacks, TDM can be performed based on two successive slots indicated by 3h50, or CDM of OCC length 4 can be applied based on two successive slots indicated by 3h50 and 3h60. Although explanation has been made based on the two slots indicated by 3h50 and 3h60, the time unit in which the TDM or CDM indicated by 3h50 and 3h60 is applied is not limited to the slots. Further, in contrast with the method for mapping 8 antenna ports at maximum by applying the OCC length 8 indicated by 3h40, if the DMRS is generated in ZC sequence, it is possible to support additional antenna ports using the CS indicated by 3h70. In case of using the CS instead of the OCC indicated by 3h70, it is advantageous that the RS density on frequency is maintained as it is.

Figure 3I:
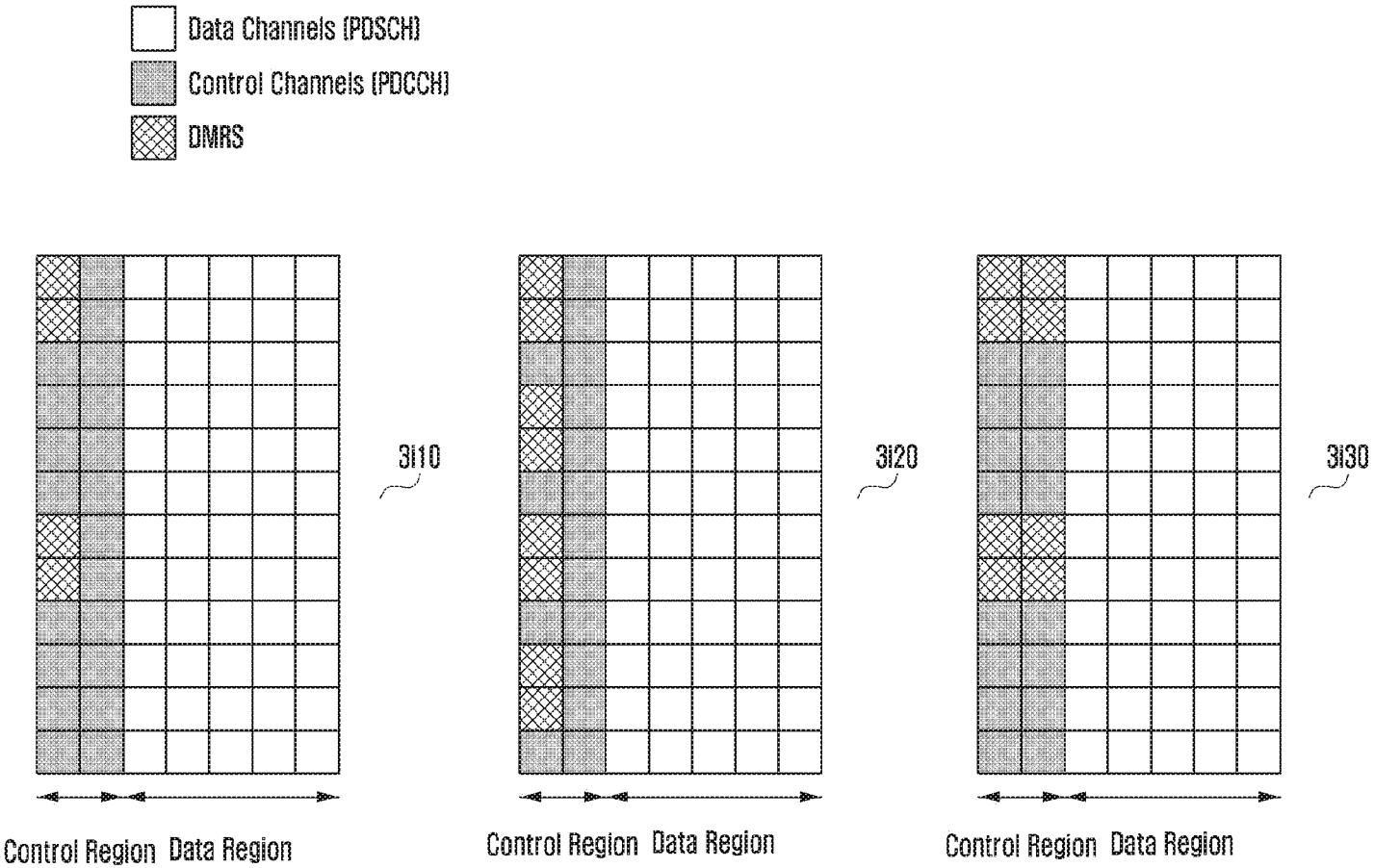
FIG. 3I is a diagram illustrating a method for mapping a DMRS to a control channel according to a (3-1)-th embodiment of the disclosure.

Referring to FIG. 3I, a method for mapping a unit DMRS structure proposed in FIG. 3F to a control channel will be described. According to the current discussion of a 5G communication system, a reference signal for a control channel may be divided into a UE-specific RS and a shared/common RS. The UE-specific RS can be replaced by the term "DMRS", and the unit DMRS structure proposed in FIG. 3F or a part thereof can be applied. Specifically, the DMRS structure of FIG. 3F may be differently configured on the control channel according to the number of antenna ports or the control channel mapping method. More specifically, referring to FIG. 3I, the identification number 3i10 indicates an example in which the DMRS structure indicated by the identification number 3f10 is applied. If four antenna port support is necessary, the DMRS structure indicated by the identification number 3f20 can be configured as indicated by the identification number 3i20. Further, according to the control channel mapping method, it may be necessary to configure the DMRS structure indicated by the identification number 3f10 to successive OFDM symbols as indicated by the identification number 3i30. Unlike this, in case of the shared/common RS, different from the UE-specific RS, it may be difficult to configure the reference signal according to the situation, and it may be profitable to perform operations with a fixed reference signal pattern. Here, the UE-specific RS and the shared/common RS can be discriminated in accordance with a DCI format, search space type (common search space or UE-specific search space), and information type. Further, the unit DMRS structure proposed in FIG. 3F can be used for not only data and a control channel but also other cases. For example, the DMRS structure indicated by 3f20 can be used as a reference signal of MBSFN transmission in which channel delay is important or a reference signal of an extended CP mode. For example, as described above, by introducing the concept of a common RS pattern pool, the DMRS structure indicated by 3f10 and 320 having the density of another reference signal on frequency can be applied to match the situation.

Figure 3J:
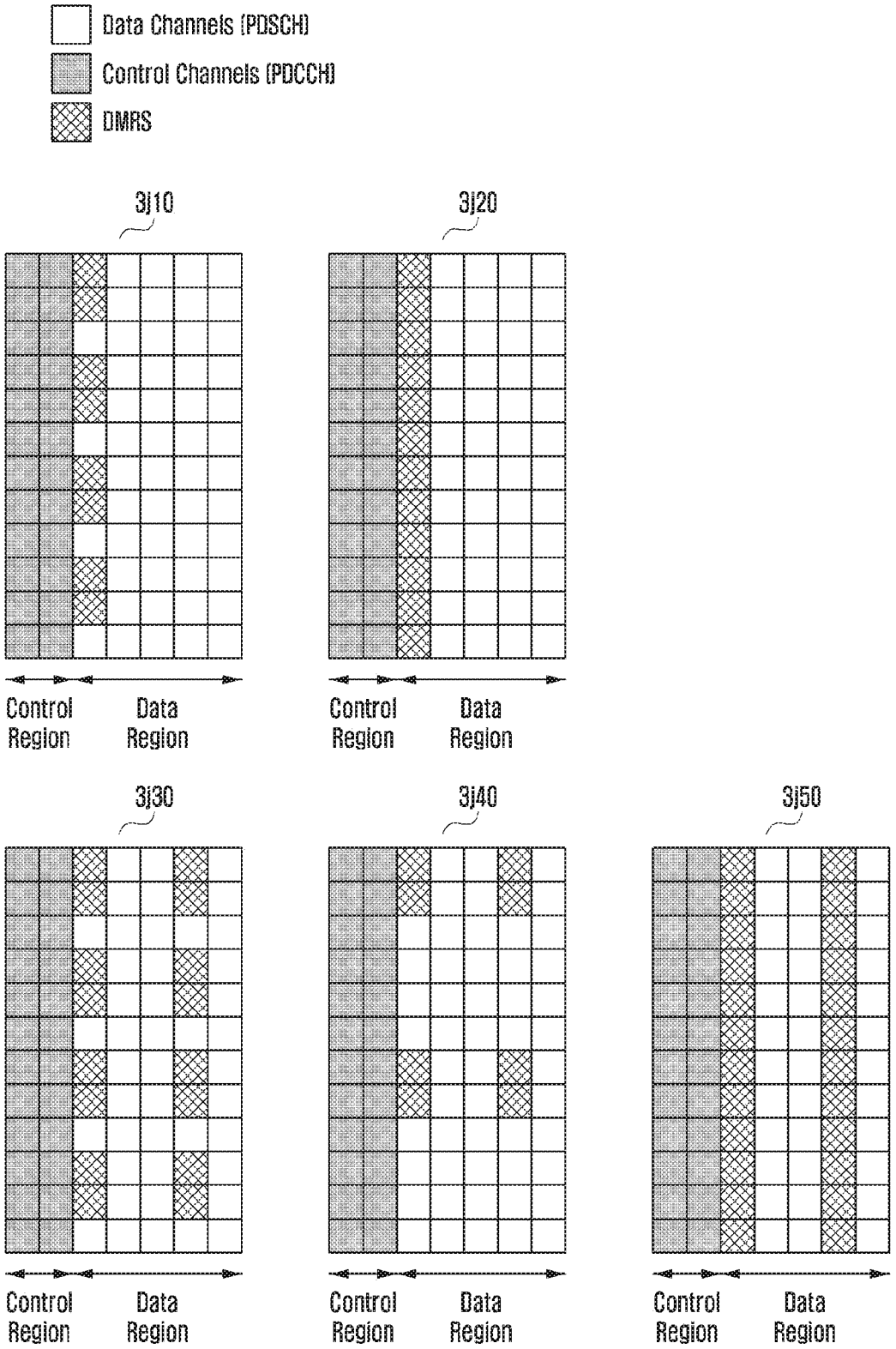
FIG. 3J is a diagram illustrating a method for mapping a DMRS to a slot according to a (3-1)-th embodiment of the disclosure.
Figure 3K:
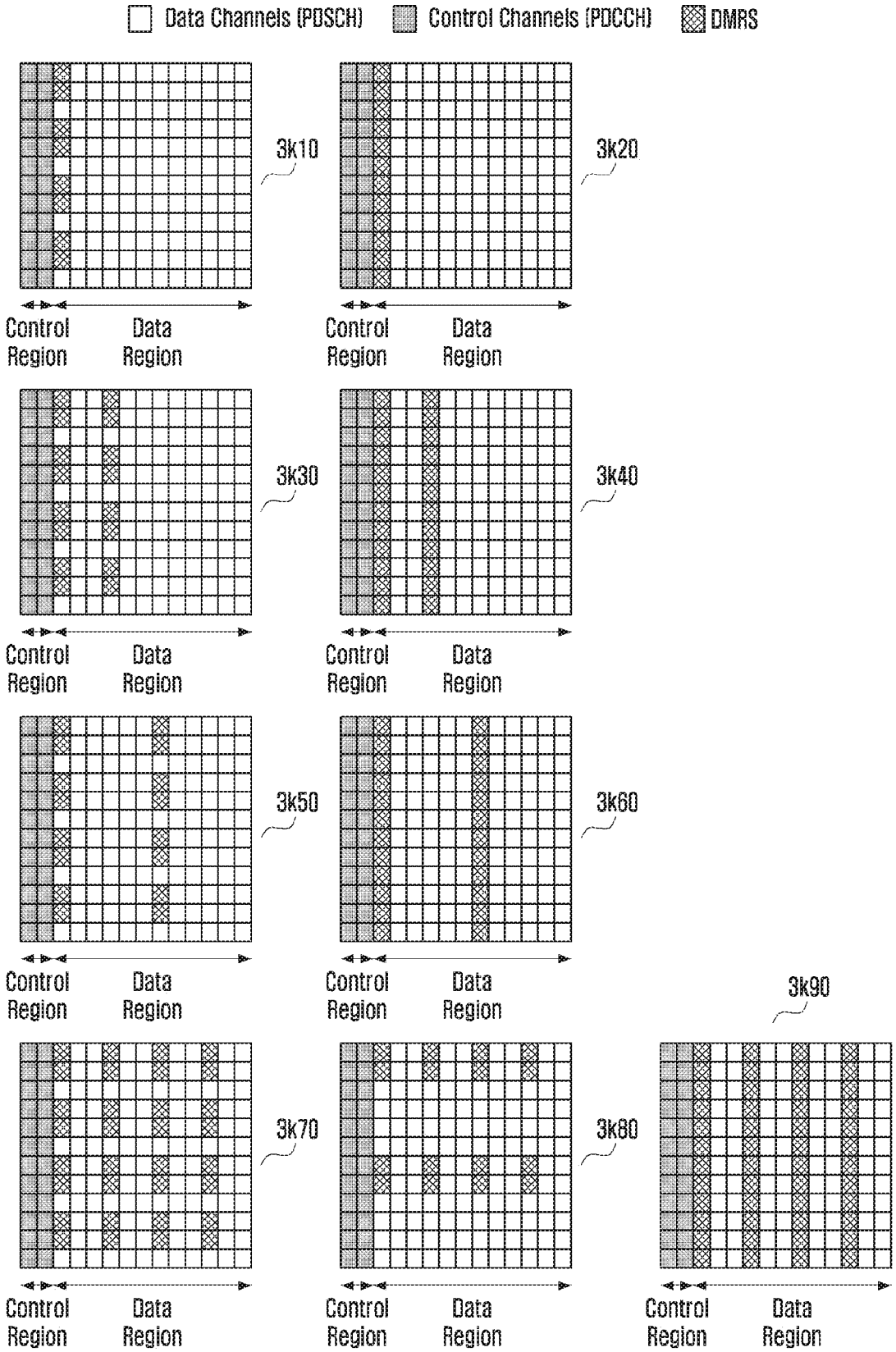
FIG. 3K is a diagram illustrating a method for mapping a DMRS to a data channel according to a (3-1)-th embodiment of the disclosure.

Referring to FIG. 3J, a method for mapping a unit DMRS structure proposed in FIG. 3F to a slot that is a transmission unit of a 5G communication system will be described. One or several unit DMRS structures can be located in a slot that is the transmission unit of the 5G communication system, and can be used for the purpose of Doppler tracking. Specifically, a method for mapping the unit DMRS structure proposed in FIG. 3F on time-frequency of a data channel in case where a slot is composed of 7 OFDM symbols will be described. Further, referring to FIG. 3K, a method for mapping a unit DMRS structure proposed in FIG. 3F on time-frequency of a data channel in case where a slot is composed of 14 OFDM symbols will be described. In case of a data channel rather than a control channel, it may be possible to configure more various DMRS structures according to channel situations. The terminal should be aware of the DMRS structure configured by the base station, and in case where various DMRS structures can be configured, a method for mapping the DMRS to the data channel may be very important in order to transfer information on the DMRS structure to the terminal with a small piece of information. The disclosure proposes a method capable of configuring a DMRS structure having a small amount of information (1 to 3 bits). First, in the 5G communication system, low latency support is important, and the DMRS should be located in front of the data channel. Further, in an environment in which the channel is not quickly charged on time, the channel estimation for all data channels can be effectively performed only by the DMRS located in front of the data channel. Accordingly, a baseline (front-loaded) DMRS pattern for the data channel can be defined as an OFDM symbol located in front of the data channel based on the slot that is the transmission unit of the 5G communication system. In this case, in case of supporting only a small number of antenna ports, one symbol can be configured, whereas in case of supporting a large number of antenna ports, one or more symbols can be configured according to the method proposed in FIG. 3H. More specifically, the DMRS structure proposed in FIG. 3F can be located on the first OFDM symbol on which the data channel starts. The identification number 3j 10 indicates that the DMRS structure indicated by the identification number 3f20 is mapped to the first OFDM symbol on which the data channel starts. The identification number 3j20 indicates that the DMRS structure indicated by the identification number 3f30 is mapped to the first OFDM symbol on which the data channel starts. However, if there is no other reference signal on the remaining OFDM symbol only through the baseline pattern, it is not possible to get a frequency offset. If the slot is composed of 14 OFDM symbols, the problem that it is not possible to get the frequency offset only through the baseline pattern indicated by 3k10 or 3k20 may become severer. Here, 3k10 indicates a case where the DMRS structure indicated by the identification number 3f20 is applied, and 3k20 indicates a case where the DMRS structure indicated by the identification number 3f30 is applied. In this case, it is possible to estimate the frequency offset through configuration of an additional (extended) DMRS pattern. Specifically, the additional (extended) DMRS pattern can be defined by the baseline DMRS pattern and an OFDM symbol additionally located in the back of the baseline DMRS pattern based on the slot that is the transmission unit of the 5G communication system. Accordingly, the identification number 3k30 indicates that the DMRS structure indicated by the identification number 3f20 is mapped to the first OFDM symbol on which the data channel starts and the fourth symbol. Further, 3k40 indicates that the DMRS structure indicated by the identification number 3f30 is mapped to the first OFDM symbol on which the data channel starts and the fourth symbol. Mapping of the baseline pattern to the first OFDM symbol on which the data channel starts and the fourth symbol indicated by the identification numbers 3k30 and 3k40 is a selection in consideration of the low latency support, frequency offset support, and Doppler tracking. In addition, in an environment in which the channel is quickly changed on time, the channel change on time is unable to be tracked through the proposed baseline pattern, and thus the channel estimation performance may deteriorate. Even in this case, configuration of the additional (extended) DMRS pattern can cope with the channel being quickly changed. In case where a slot is defined by 7 symbols, two channel samples in the slot are sufficient to estimate the channel being quickly changed. The identification number 3j30 indicates that the DMRS structure indicated by the identification number 3f20 is mapped to the first OFDM symbol on which the data channel starts and the fourth symbol. If the control channel of the 5G communication system is composed of 2 OFDM symbols, the additional (extended) DMRS pattern can be profitable in securing the channel estimation performance due to its symmetric structure as indicated by the identification number 3j30. Further, if the channel delay spread is not long although the channel is quickly changed on time in consideration of an overhead of the reference signal, it may be effective to configure and support the DMRS structure indicated by the identification number 3f10 as indicated by the identification number 3j40. If the DMRS mapping for the data channel is performed through the baseline DMRS pattern and the additional (extended) DMRS pattern on time as described above in a state where a slot is defined by 7 symbols, it is possible to perform signaling of the DMRS structure using only one bit. As described above, the locations of the baseline DMRS pattern and the additional (extended) DMRS pattern can be fixedly configured. Further, in case where the DMRS pattern is configurable even on frequency, it is possible to perform signaling of the DMRS structure on frequency by adding one bit. As described above, the DMRS pattern on frequency can be operated in two types as indicated by the identification numbers 3f10 and 3f20. The DMRS structure for tracking the channel being quickly changed on time in case where a slot is composed of 14 OFDM symbols will be described with reference to 3k40 to 3k80. If it is difficult for the DMRS structure indicated by 3k30 or 3k40 to track the time-varying channel, the DMRS structure indicated by 3k50 or 3k60 can be used. Further, 3k50 indicates a case where the DMRS structure indicated by the identification number 320 is applied, and 3k60 indicates a case where the DMRS structure indicated by the identification number 3f30 is applied. In the DMRS structure indicated by 3k30 or 3k40, the symbol after the last OFDM symbol on which the reference signal is located can perform the channel estimation through extrapolation. If such extrapolation exerts a great influence on the performance deterioration, the channel estimation performance can be improved by symmetrically locating the DMRS with the data channel as indicated by 3k50 or 3k60. Further, in an environment in which Doppler is very high with a movement speed of 500 km/h, it is possible to configure the DMRS structure so as to well perform the Doppler tracking by densely locating the reference signal on time through 3k60 to 3k80. More specifically, 3k60 indicates a case where the DMRS structure indicated by the identification number 3120 is applied, and 3k70 indicates a case where the DMRS structure indicated by the identification number 3f10 is applied. Further, 3k80 indicates a case where the DMRS structure indicated by the identification number 3f30 is applied. In case where a slot is composed of 14 OFDM symbols, as compared with a case where a slot is composed of 7 OFDM symbols, it is possible to configure the location on time using 1 to 2 bits. In case where extension of the number of orthogonal DMRS ports is necessary as described above, the method proposed in FIG. 3H can be applied in FIGS. 3J and 3K. Definition of the baseline DMRS pattern and the additional (extended) DMRS pattern as described above will now be described once again.

Baseline (front-loaded) DMRS pattern: This is composed of OFDM symbols located in front of the data channel based on the slot, or may be composed of one OFDM symbol. In case of supporting a large number of antenna ports, this can be composed of one or more successive OFDM symbols.

Additional (extended) DMRS pattern: This is composed of OFDM symbols located on or in the back of the baseline DMRS pattern based on the slot. This is to track the frequency offset or high Doppler.

In the above-described embodiment, the method for mapping various DMRS structures to antenna ports has been presented. However, the DMRS structure and mapping method thereof in the disclosure are not limited to the structure presented in the (3-1)-th embodiment. Accordingly, a DMRS structure and mapping that are different from those of the above-described method may be applied to the (3-2)-th embodiment and the (3-3)-th embodiment below. Further, in the (3-1)-th embodiment, the DMRS structure has been described based on the downlink, but in the 5G system, the same DMRS structure can be configured even on the uplink. If the uplink/downlink has the same DMRS structure, the DMRS ports of the uplink/downlink are orthogonally released, and thus more flexible operation becomes possible in a TDD environment.

(3-2)-th Embodiment

The (3-2)-th embodiment proposes a method by a base station for implicitly indicating DMRS sharing between different channels. As one method by the base station for implicitly indicating the DMRS sharing between the different channels, a method for notifying of transmission modes of the different channels can be considered. Here, the transmission mode may be spatial multiplexing technique, transmit diversity technique, or semi-open-loop technique. Further, a fallback mode may call the transmission mode. Here, the transmit diversity or semi-open-loop technique may include a transmission method, such as SFBC, precoder cycling, or CDD. If the different channels are transmitted by the transmit diversity or semi-open-loop technique, it is possible to share the DMRS on the assumption that the reference signal of the different channels is multiplied by the same signal. However, in case where the transmission mode of the different channels is the spatial multiplexing, the signal multiplied to the reference signal of the different channels may differ, and thus it may be difficult to share the DMRS. Accordingly, the method for implicitly indicating the DMRS sharing based on the transmission mode of the different channels can be used only in case where the transmission mode of the different channels is transmitted through the transmit diversity or semi-open-loop technique.

Figure 3L:
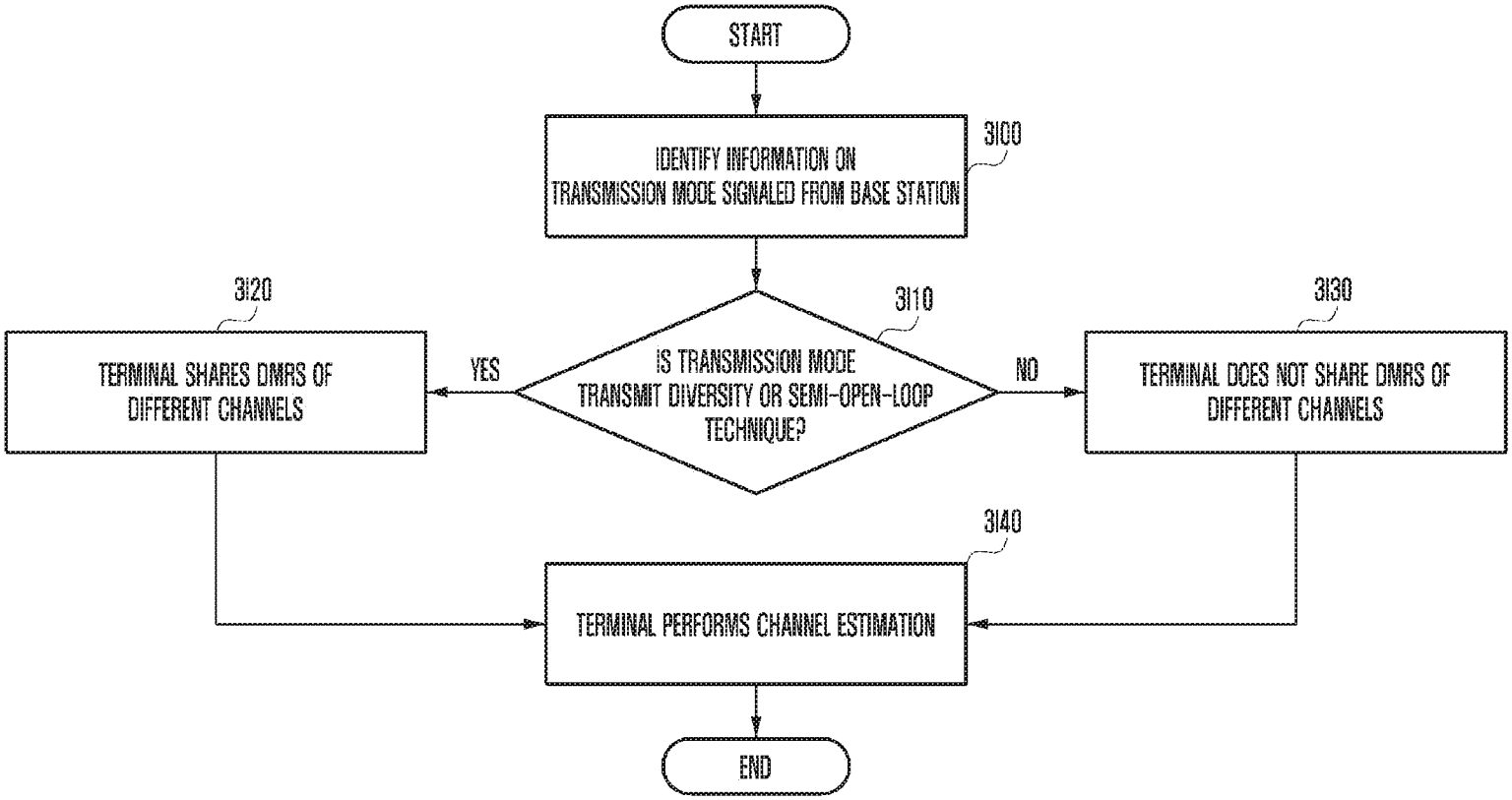
FIG. 3L is a diagram illustrating a terminal operation for a method by a DMRS for indicating sharing in an implicit manner according to a (3-2)-th embodiment of the disclosure.

Through FIG. 3L, operations proposed in the (3-2)-th embodiment will be described in more detail. At operation 3100, the terminal identifies information of the transmission mode signaled from the base station, and proceeds with operation 3110 to identify whether the transmission mode is transmit diversity or semi-open-loop technique. If the transmission mode identified at operation 3110 is the transmit diversity or semi-open-loop technique, the terminal proceeds with operation 3120, and performs channel estimation at operation 3140 by sharing the DMRS of the different channels. However, if the transmission mode identified at operation 3110 is not the transmit diversity or semi-open-loop technique, the terminal proceeds with operation 3130 and performs channel estimation at operation 3140 without sharing the DMRS of the different channels.

If it is assumed that the different channels are PDCCH and PDSCH, a method for indicating the transmission mode used on the PDCCH and the PDSCH can be transferred through higher layer signaling, such as radio resource control (RRC) or control information, such as downlink control information (DCI). In Table 3-2 below, various methods for transferring the transmission mode for the PDCCH and PDSCH to the RRC or DCI have been summarized.

TABLE 3-2

| PDCCH transmission mode | PDSCH transmission mode |
|---|---|
| RRC | RRC |
| RRC | DCI |

TABLE 3-2-continued

| PDCCH transmission mode | PDSCH transmission mode |
|---|---|
| Common DCI | DCI |
| Common DCI | RRC |

In case where the PDSCH transmission mode is configured as RRC in Table 3-2, it is possible to identify the PDSCH transmission mode before decoding the PDSCH, and thus it is possible to share the DMRS of the PDSCH for channel estimation of the PDCCH. However, in this case, it is necessary to wait for until the DMRS of the PDSCH is received, and thus latency may be disadvantageous. It is possible to share the DMRS of the PDCCH for the channel estimation of the PDSCH regardless of whether the transmission mode of the PDCCH is configured to RRC or DCI. Although not indicated in Table 3-2, it is also possible that indication of the transmission mode is composed of a combination of the RRC and DCI like the current LTE system.

The method for implicitly indicating the DMRS sharing using the transmission mode applied to the data channel and the control channel indicated by the base station has been described. As another method, a method for implicitly indicating DMRS sharing based on the transmission mode for one channel rather than using all the transmission modes for the two channels may be considered. Specifically, the base station may indicate the transmission mode for the PDSCH, and the terminal may determine the DMRS sharing based on this only. In general, the transmit diversity or semi-open-loop technique is used for robust transmission in case where the channel situation is not good. Accordingly, if the transmission mode of the PDSCH is the transmit diversity or semi-open-loop technique, the DMRS sharing can be performed on the assumption that the same transmission mode is also applied to the PDCCH.

(3-3)-th Embodiment

In contrast with the (3-2)-th embodiment, the (3-3)-th embodiment proposes a method by a base station for explicitly indicating DMRS sharing between different channels. This method has the disadvantage that information on the DMRS sharing should be additionally provided, but has the advantage that the information on the DMRS sharing can be transferred in more detail. For example, in the (3-2)-th embodiment, the DMRS sharing can be supported only with respect to all ports due to restricted information, whereas in the (3-3)-th embodiment, it is possible to perform sharing so that only partial ports can be shared for the DMRS sharing. As a result, the transmission method applied to the different channels is determined by the judgment of the base station, and thus the explicit signaling has the advantage that the base station can transfer detailed information through judgment of the situation in which the DMRS sharing is possible. As the explicit signaling for the DMRS sharing, higher layer signaling, such as radio resource control (RRC), can be used, and dynamic signaling can be used through control information, such as downlink control information (DCI). In case of signaling information on the DMRS sharing through 2-bit control information, the following information can be transferred. Table 3-3 below shows an example of 2-bit information for the DMRS sharing.

TABLE 3-3

| Indicator | Notification Contents |
|---|---|
| "00" | DMRS sharing with respect to one port |
| "01" | DMRS sharing with respect to two ports |
| "10" | DMRS sharing with respect to four ports |
| "11" | No DMRS sharing |

Control information indicated in Table 3-3 is used for the base station to notify the terminal of what DMRS is to be shared through 2 bits. That is, if the control information value is "00", the terminal can perform DMRS sharing with respect to one port, and if the control information value is "01", the terminal can perform DMRS sharing with respect to two ports. Further, if the control information value is "10", the terminal can perform DMRS sharing with respect to four ports, and if the control information value is "11", it is assumed that the DMRS is not shared. In the above-described table, the order or the contents of the notification contents indicated by respective indicators may be changed in accordance with use thereof.

Figure 3M:
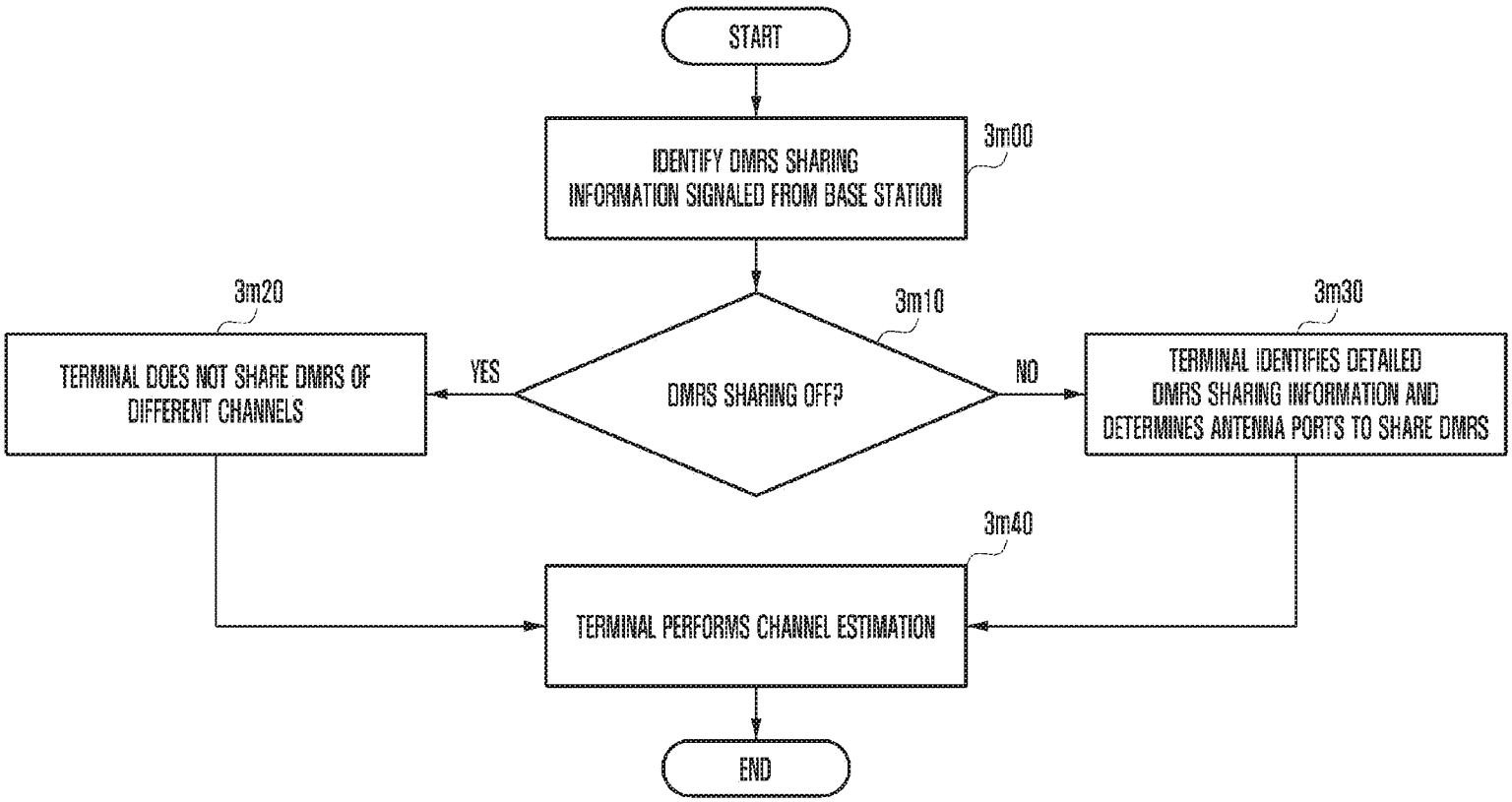
FIG. 3M is a diagram illustrating a terminal operation for a method by a DMRS for indicating sharing in an explicit manner according to a (3-3)-th embodiment of the disclosure.

Through FIG. 3M, operations proposed in the (3-3)-th embodiment will be described in more detail.

At operation 3m00, the terminal identifies information of the transmission mode signaled from the base station, and proceeds with operation 3m10 to identify whether to change the DMRS. As described above, the identification becomes possible using information within a control channel. At operation 3m10, if the DMRS sharing is identified, the terminal proceeds with operation 3m20, and determines detailed antenna ports to share the DMRS of different channels based on the information at operation 3m00. Further, at operation 3m40, the terminal performs channel estimation. However, if it is identified not to share the DMRS at operation 3m10, the terminal proceeds with operation 3m30, and performs channel estimation at operation 3m40 without sharing the DMRS of the different channels.

In Table 2, it is possible to determine the ports indicated by "00", "01", and "10" in descending order of their numbers. More specifically, if the whole number of supported ports is 4, and the port numbers are allocated as p=A, p=B, p=C, and p=D, the port indicated by "00" may be determined as p=A, and the port indicated by "01" may be determined as p=A, p=B. In case of designating partial ports as described above, determination of the whole ports in descending order of their port numbers is profitable on the point that port information can be indicated without any additional information.

(3-4)-th Embodiment

The (3-4)-th embodiment proposes a method for performing channel measurement in case where the terminal shares DMRS of different channels and in case where the terminal does not share the DMRS. Through the (3-2)-the embodiment and the (3-3)-th embodiment, the method by the base station for indicating the DMRS sharing of the different channels have been proposed. In this case, the terminal should determine whether to share the DMRS and should perform channel estimation corresponding to the determination. In case of performing the channel estimation through sharing of the DMRS of the different channels and in case of performing the channel estimation without sharing the DMRS of the different channels, it is determined that the corresponding standard support is necessary according to the standard proceeding situation of the beyond 5G system. In the LTE system, antenna ports are defined as in Table 3-4 below. According to definition in Table 3-4, the channel estimation can be performed using channel values estimated from different symbols in the same antenna port.

TABLE 3-4

| |
|---|
| An antenna port is defined such that the channel over which a symbol on the antenna port is conveyed can be inferred from the channel over which another symbol on the same antenna port is conveyed. |

If the same definition is used with respect to the antenna ports even in the 5G system, different standard supports may be necessary with respect to a case where channel estimation is performed through sharing of the DMRS of the different channel and a case where channel estimation is performed without sharing depending on how to support the antenna ports with respect to the different channels. Accordingly, the antenna ports of the different channels are divided into two cases as follows, and possible standard support will be described.

Case1: A case where different channels are supported using the same DMRS antenna port Case2: A case where different channels are supported using different DMRS antenna ports First, a case where the standard of the beyond 5G system is in progress as in Case1 is considered. In case where the data channel and the control channel are supported using the same DMRS antenna port, it can be naturally supported that the terminal performs channel estimation through sharing of the DMRS of the different channels by the definition of the antenna ports in Table 3-4. However, in case where the terminal performs the channel estimation without sharing the DMRS of the different channels, additional standard support for this may be necessary. In the disclosure, in case where the different channels use the same DMRS antenna port by applying measurement restriction (MR) in this case, the terminal can be configured not to share the DMRS in the different channel regions.

Further, a method for supporting DMRS sharing for Case 1 will be described through Table 3-5.

TABLE 3-5

| |
|---|
| If the UE is not configured with parameter DMRS sharing by higher layers or dynamic signaling, the UE shall derive the channel measurements<br>for corresponding channel using antenna ports of the associated DMRS resource in each channel |

Specifically, in describing the operation in Table 3-5, in case of configuration not to share the DMRS in different channel regions through higher layer signaling, such as radio resource control (RRC) or control information, such as downlink control information (DCI), the terminal performs channel estimation using only the DMRS existing on the respective channels during channel measurement. This corresponds to a case where MR is applied not to perform channel estimation using the DMRS of the different channels.

Next, a case where the standard of the beyond 5G system is in progress as in Case2 is considered. If the data channel and the control channel are supported using the different DMRS antenna ports, it can be naturally supported by the definition of the antenna ports in Table 3-6 that the terminal performs estimation without sharing the DMRS of the different channels. However, in case where the terminal performs the channel estimation through sharing of the DMRS of the different channels, additional standard support for this may be necessary. In the disclosure, it is assumed that the different antenna ports in the different channels are quasi co-located (QCL) so that they can be used for channel estimation. In the LTE system, the definition of QCL is as in Table 3-6 below.

TABLE 3-6

| |
|---|
| Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. A UE shall not assume that two antenna ports are quasi co-located unless specified otherwise. |

However, in the 5G communication system, in addition to the large-scale characteristics of QCL channels, as shown in Table 3-7 below, extension can be made up to the concept of sharing and using the different antenna ports. Table 3-7 below explains a method for supporting DMRS sharing for Case2.

TABLE 3-7

| |
|---|
| If the UE is configured with parameter DMRS sharing by higher layers or dynamic signaling, the channels on antenna ports of the associated channel are inferred from the channels on antenna ports of the associated DMRS resource. |

Specifically, in describing the operation in Table 3-7, in case of configuration to share the DMRS in different channel regions through higher layer signaling, such as radio resource control (RRC) or control information, such as downlink control information (DCI), the terminal can perform channel estimation through sharing of the DMRS existing in the different channels during channel measurement. More specifically, if ports A and B allocated to the data channel and ports C and D allocated to the control channel are quasi co-located, the terminal can operate as in Table 3-8. Hereinafter, QCL example 1 will be described.

TABLE 3-8

| |
|---|
| The channels on antenna ports p = A, p = B are inferred from the channels on antenna ports p = C, p = D of the associated DMRS resource respectively. |

Through QCL in Table 3-8, it is possible for the data channel to share DMRS of the control channel. Similarly, if ports C and D allocated to the control channel and port A and B allocated to the data channel are quasi co-located, the terminal can operate as in Table 3-8.

Further, another example of QCL may be as follows.

TABLE 3-9

| |
|---|
| The channels on antenna ports p = C, p = D are inferred from the channels on antenna ports p = A, p = B of the associated DMRS resource respectively. |

It is possible for the control channel to share DMRS of the data channel. In the disclosure, it is to be noted that the term "QCL" can be replaced by another term in the 5G communication system.

Figure 3N:
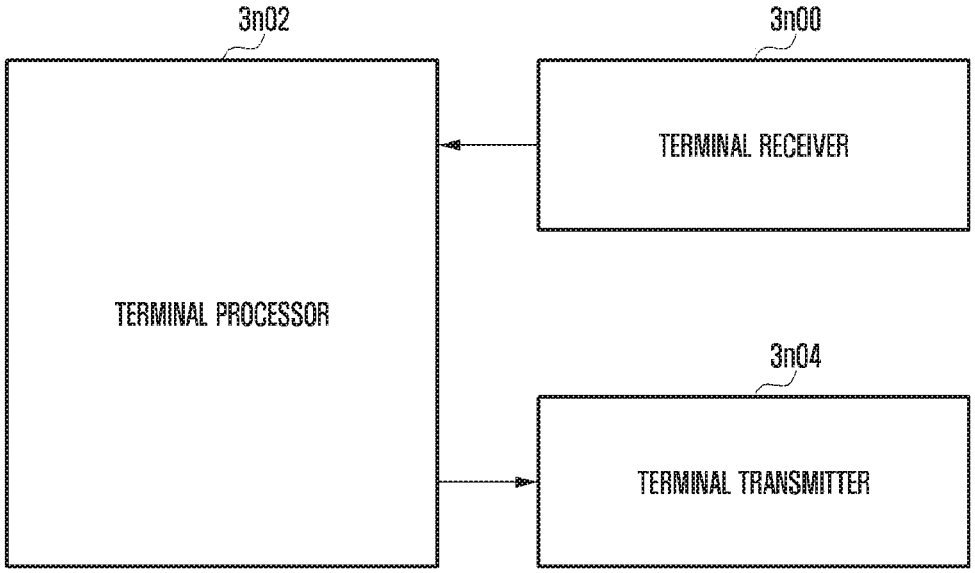
FIG. 3N is a block diagram illustrating the structure of a terminal according to (3-1)-th to (3-3)-th embodiments of the disclosure.
Figure 30:
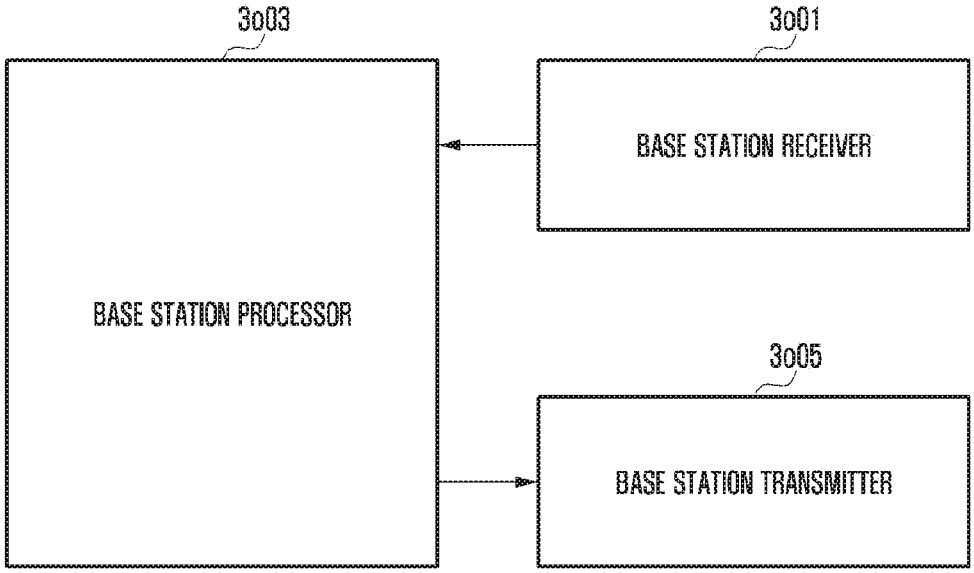

In order to perform the above-described embodiments of the disclosure, transmitters, receivers, and processors of a terminal and a base station are illustrated in FIGS. 3N and 3O. In the (3-1)-th embodiment to the (3-4)-th embodiment, transmission/reception methods by a base station and a terminal for providing methods by the base station for configuring and sharing plural DMRS structures have been described, and in order perform this, the transmitters, receivers, and processors of the base station and the terminal should operate in accordance with the respective embodiments.

Specifically, FIG. 3N is a block diagram illustrating the internal structure of a terminal according to an embodiments of the disclosure. As illustrated in FIG. 3N, a terminal according to the disclosure may include a terminal receiver 3n00, a terminal transmitter 3n04, and a terminal processor 3n02. In an embodiment of the disclosure, the terminal receiver 3n00 and the terminal transmitter 3n04 may be commonly called a transceiver. The transceiver may transmit and receive signals with a base station. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the terminal processor 3n02, and transmit the signal output from the terminal processor 3n02 through the radio channel. The terminal processor 3n02 may control a series of processes so that the terminal can operate according to the embodiments of the disclosure as described above. For example, the terminal receiver 3n00 receives a reference signal from the base station, and the terminal processor 3n02 may control to analyze an application method of the reference signal. Further, the terminal transmitter 3n04 may transmit the reference signal.

FIG. 3O is a block diagram illustrating the internal configuration of a base station according to an embodiment of the disclosure. As illustrated in FIG. 3O, a base station according to the disclosure may include a base station receiver 3o01, a base station transmitter 3o05, and a base station processor 3o03. In an embodiment of the disclosure, the base station receiver 3o01 and the base station transmitter 3o05 may be commonly called a transceiver. The transceiver may transmit and receive signals with a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station processor 3o03, and transmit the signal output from the base station processor 3o03 through the radio channel. The base station processor 3o03 may control a series of processes so that the base station can operate according to the above-described embodiments of the disclosure. For example, the base station processor 3o03 may determine the structure of the reference signal, and control to generate sharing information of the reference signal to be transferred to the terminal. Thereafter, the base station transmitter 3o05 may transfer the reference signal and sharing information to the terminal, and the base station receiver 3o01 may receive the reference signal.

On the other hand, embodiments of the disclosure have been presented to assist those of ordinary skill in the art to gain a comprehensive understanding of the disclosure, and do not limit the scope of the disclosure. It will be apparent to those of ordinary skill in the art to which the disclosure pertains that various modifications are possible based on the technical concept of the disclosure in addition to the embodiments disclosed herein. Further, the respective embodiments may be combined with each other to be operated.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure.

The invention claimed is:

1. A method performed by a terminal for receiving a reference signal (RS) in a wireless communication system, the method comprising:

receiving, from a base station, a control message including first information indicating that a first channel and a second channel share [an] *a first* RS on the first channel, and second information configuring a *first* transmission mode for the first channel and *a second transmission mode for* the second channel;

receiving the *first* RS on the first channel;

identifying whether [a] *the* first transmission mode for the first channel and [a] *the* second transmission mode for the second channel support a sharing of the [received] *first* RS *received on the first channel*; [and]

receiving, in case that the first transmission mode *for the first channel* and the second transmission mode *for the second channel* support the sharing of the [received] *first* RS *received on the first channel*, data on the second channel based on the *first* RS received on the first channel*; and*

*receiving, in case that the first transmission mode for the first channel and the second transmission mode for the second channel do not support the sharing of the first RS received on the first channel, the data on the second channel based on a second RS received on the second channel.*

2. The method of claim 1, wherein the control message comprises a radio resource control (RRC) signaling, and wherein the control message further includes information on a number of antenna ports to share the *first* RS *received on the first channel*.

3. The method of claim 2, *wherein the first RS is received on the first channel based on a first antenna port, and the second RS is received on the second channel based on a second antenna port,* wherein [a] *the* first antenna port for the first channel and [ a] *the* second antenna port for the second channel are different from each other, and wherein the first antenna port and the second antenna port are quasi co-located.

4. The method of claim 3, wherein the first channel is a control channel, and the second channel is a data channel, and wherein the first channel and the second channel are received in a slot.

5. A terminal for receiving a reference signal (RS) in a wireless communication system, the terminal comprising:

a transceiver configured to transmit and receive signals; and a controller configured to:

receive, from a base station, a control message including first information indicating that a first channel and a second channel share [an] *a first* RS on the first channel and second information configuring a *first* transmission mode for the first channel and *a second transmission mode for* the second channel, receive the *first* RS on the first channel, identify whether [a] *the* first transmission mode for the first channel and [a] *the* second transmission mode for the second channel support a sharing of the [received] *first* RS *received on the first channel*, [and]

receive, in case that the first transmission mode *for the first channel* and the second transmission mode *for the second channel* support the sharing of the [received] *first* RS *received on the first channel*, data on the second channel based on the *first* RS received on the first channel*, and*

*receive, in case that the first transmission mode for the first channel and the second transmission mode for the second channel do not support the sharing of the first RS received on the first channel, the data on the second channel based on a second RS received on the second channel.*

6. The terminal of claim 5, wherein the control message comprises a radio resource control (RRC) signaling, and wherein the control message further includes information on a number of antenna ports to share the *first* RS *received on the first channel*.

7. The terminal of claim 6, *wherein the first RS is received on the first channel based on a first antenna port, and the second RS is received on the second channel based on a second antenna port,* wherein [a] *the* first antenna port for the first channel and [ a] *the* second antenna port for the second channel are different from each other, and wherein the first antenna port and the second antenna port are quasi co-located.

8. The terminal of claim 7, wherein the first channel is a control channel, and the second channel is a data channel, and wherein the first channel and the second channel are received in a slot.

9. A method performed by a base station for transmitting a reference signal (RS) in a wireless communication system, the method comprising:

transmitting, to a terminal, a control message including first information indicating that a first channel and a second channel share [an] *a first* RS on the first channel and second information configuring a *first* transmission mode for the first channel and *a second transmission mode for* the second channel; and transmitting the *first* RS to the terminal on the first channel, wherein, in case that [a] *the* first transmission mode for the first channel and [a] *the* second transmission mode for the second channel support [are identified to support] a sharing of the [transmitted] *first* RS *transmitted on the first channel*, the *first* RS transmitted on the first channel is used for receiving [of] data on the second channel*, and*

*wherein, in case that the first transmission mode for the first channel and the second tranmission mode for the second channel do not support the sharing of the first RS transmitted on the first channel, a second RS transmitted on the second channel is used for receiving the data on the second channel.*

10. The method of claim 9, wherein the control message comprises a radio resource control (RRC) signaling, and wherein the control message further includes information on a number of antenna ports to share the *first* RS *transmitted on the first channel*.

11. The method of claim 10, *wherein the first RS is transmitted on the first channel based on a first channel based on a first antenna port, and the second RS is transmitted on the second channel based on a second antenna port,* wherein [a] *the* first antenna port for the first channel and [ a] *the* second antenna port for the second channel are different from each other, and wherein the first antenna port and the second antenna port are quasi co-located.

12. The method of claim 11, wherein the first channel is a control channel, and the second channel is a data channel, and wherein the first channel and the second channel are transmitted in a slot.

13. A base station for transmitting a reference signal (RS) in a wireless communication system, the base station comprising:

a transceiver configured to transmit and receive signals; and a controller configured to:

transmit, to a terminal, a control message including first information indicating that a first channel and a second channel share [an] *a first* RS on the first channel and second information configuring a *first* transmission mode for the first channel and *a second transmission mode for* the second channel, and transmit the *first* RS to the terminal on the first channel, wherein in case that [a] *the* first transmission mode for the first channel and [a] *the* second transmission mode for the second channel support [are identified to support] a sharing of the [transmitted] *first* RS *transmitted on the first channel*, the *first* RS transmitted on the first channel is used for receiving [ of] data on the second channel, *and*

*wherein, in case that the first transmission mode for the first channel and the second transmission mode for the second channel do not support the sharing of the first RS transmitted on the first channel, a second RS transmitted on the second channel is used for receiving the data on the second channel*.

14. The base station of claim 13, wherein the control message comprises a radio resource control (RRC) signaling, and wherein the control message further includes information on a number of antenna ports to share the *first* RS *transmitted on the first channel*.

15. The base station of claim 14, *wherein the first RS is transmitted on the first channel based on a first antenna port, and the second RS is transmitted on the second channel based on a second antenna port,* wherein [a] *the* first antenna port for the first channel and [ a] *the* second antenna port for the second channel are different from each other, and wherein the first antenna port and the second antenna port are quasi co-located.

16. The base station of claim 15, wherein the first channel is a control channel, and the second channel is a data channel, and wherein the first channel and the second channel are transmitted in a slot.

* * * * *